(12) United States Patent
Yamakawa et al.

(10) Patent No.: US 12,091,588 B2
(45) Date of Patent: Sep. 17, 2024

(54) CURABLE COMPOSITION FOR ADHESIVE AGENTS, ADHESIVE SHEET, CURED ARTICLE, LAMINATE, AND DEVICE

(71) Applicant: DAICEL CORPORATION, Osaka (JP)

(72) Inventors: Akira Yamakawa, Himeji (JP); Naoko Tsuji, Himeji (JP)

(73) Assignee: DAICEL CORPORATION, Osaka (JP)

( * ) Notice: Subject to any disclaimer, the term of this patent is extended or adjusted under 35 U.S.C. 154(b) by 408 days.

(21) Appl. No.: 16/614,146

(22) PCT Filed: May 16, 2018

(86) PCT No.: PCT/JP2018/018908
§ 371 (c)(1),
(2) Date: Nov. 15, 2019

(87) PCT Pub. No.: WO2018/212233
PCT Pub. Date: Nov. 22, 2018

(65) Prior Publication Data
US 2020/0148926 A1 May 14, 2020

(30) Foreign Application Priority Data

May 17, 2017 (JP) ................. 2017-098513

(51) Int. Cl.
*B32B 7/12* (2006.01)
*B32B 27/28* (2006.01)
(Continued)

(52) U.S. Cl.
CPC .............. *C09J 183/04* (2013.01); *B32B 7/12* (2013.01); *B32B 27/283* (2013.01);
(Continued)

(58) Field of Classification Search
CPC ... C09J 183/04; C09J 5/06; C09J 11/06; C09J 2301/408; C09J 2203/326; C09J 2463/00;
(Continued)

(56) References Cited

U.S. PATENT DOCUMENTS 6,037,008 A * 3/2000 Huang .................... C09J 11/06
427/408
9,202,752 B2 12/2015 Kitada
(Continued)

FOREIGN PATENT DOCUMENTS

CN 103172803 A 6/2013
JP 4-178411 A 6/1992
(Continued)

OTHER PUBLICATIONS

Office Action issued Jul. 28, 2021, in Taiwan Patent Application No. 107116788.
(Continued)

*Primary Examiner* — Michael B Nelson
(74) *Attorney, Agent, or Firm* — Birch, Stewart, Kolasch & Birch, LLP

(57) ABSTRACT

The present invention is to provide a curable composition for adhesive agents that cures at a low temperature and that can form a cured article having excellent heat resistance, crack resistance, and adhesive properties and tight bonding properties for adhereds. The present invention provides a curable composition for adhesive agents containing a polyorganosilsesquioxane (A) having a constituent unit represented by Formula (1) below; a mole ratio of a constituent unit represented by Formula (I) below to a constituent unit represented by Formula (II) below (constituent unit represented by Formula (I)/constituent unit represented by Formula (II)) being from 20 to 500; a proportion of the constituent unit represented by Formula (1) below and a
(Continued)

constituent unit represented by Formula (4) below being from 55 to 100 mol % relative to a total amount (100 mol %) of siloxane constituent units; a number average molecular weight being from 2500 to 50000; and a molecular weight dispersity (weight average molecular weight/number average molecular weight) being from 1.0 to 4.0.

17 Claims, 7 Drawing Sheets

(51) Int. Cl.
    *C08G 77/04*     (2006.01)
    *C09J 5/06*     (2006.01)
    *C09J 11/06*     (2006.01)
    *C09J 183/04*     (2006.01)
    *C08K 5/5435*     (2006.01)

(52) U.S. Cl.
    CPC ............ *C08G 77/045* (2013.01); *C09J 5/06* (2013.01); *C09J 11/06* (2013.01); *B32B 2250/03* (2013.01); *B32B 2255/26* (2013.01); *B32B 2255/28* (2013.01); *C08K 5/5435* (2013.01); *C09J 2301/408* (2020.08); *C09J 2483/00* (2013.01); *Y10T 428/31504* (2015.04); *Y10T 428/31663* (2015.04)

(58) Field of Classification Search
    CPC ............ C09J 2483/00; C09J 2483/003; C09J 183/06; C09J 7/30; C09J 163/00; C09J 7/20; B32B 7/12; B32B 27/00; C08G 77/045; C08G 59/32; C08G 77/14; C08K 5/5435

See application file for complete search history.

(56) References Cited

U.S. PATENT DOCUMENTS

| | | | |
|---|---|---|---|
| 10,308,750 B2 | 6/2019 | Ohmori et al. | |
| 10,563,091 B2 | 2/2020 | Kikuchi | |
| 2008/0249271 A1* | 10/2008 | Beppu ................. | C08F 230/085 526/279 |
| 2010/0244201 A1 | 9/2010 | Kitada | |
| 2013/0331476 A1 | 12/2013 | Bae et al. | |
| 2014/0116615 A1 | 5/2014 | Ogawa et al. | |
| 2015/0299396 A1* | 10/2015 | Matsui ................. | C08L 83/04 528/37 |
| 2016/0024348 A1 | 1/2016 | Kim et al. | |
| 2016/0215183 A1* | 7/2016 | Tanaka ................. | C08G 59/68 |
| 2016/0297933 A1* | 10/2016 | Kuwana ............... | C09D 183/06 |
| 2016/0326344 A1* | 11/2016 | Yano .................... | C09D 201/10 |
| 2016/0369029 A1 | 12/2016 | Ohmori et al. | |
| 2018/0142128 A1 | 5/2018 | Kikuchi | |
| 2018/0171193 A1 | 6/2018 | Tanaka et al. | |
| 2018/0346760 A1 | 12/2018 | Kim et al. | |

FOREIGN PATENT DOCUMENTS

| | | | |
|---|---|---|---|
| JP | 5-281415 A | | 10/1993 |
| JP | 2003-238923 A | | 8/2003 |
| JP | 2007-56146 A | | 3/2007 |
| JP | 2007-231195 A | | 9/2007 |
| JP | 2009-279840 A | | 12/2009 |
| JP | 2010-226060 A | | 10/2010 |
| JP | 2011-6610 A | | 1/2011 |
| JP | 2012-180462 A | | 9/2012 |
| JP | 2015-96559 A | | 5/2015 |
| JP | 2016-216599 A | | 12/2016 |
| JP | 2017-8148 A | | 1/2017 |
| KR | 10-2013-0061848 A | | 6/2013 |
| KR | 10-2016-0063421 A | | 6/2016 |
| TW | 201610023 A | | 3/2016 |
| TW | 201706372 A | | 2/2017 |
| WO | WO 2015/030116 A1 | | 3/2015 |
| WO | WO 2015-046333 | * | 4/2015 |
| WO | WO/2015/087686 | * | 6/2015 |
| WO | WO 2015/129818 A1 | | 9/2015 |
| WO | WO 2016/204114 A1 | | 12/2016 |
| WO | WO 2016/204115 A | | 12/2016 |

OTHER PUBLICATIONS

International Preliminary Report on Patentability and Written Opinion mailed Nov. 28, 2019, in PCT/JP2018/018908 (Forms PCT/IB/338, PCT/IB/373, and PCT/ISA/237).
International Search Report issued Jul. 24, 2018, in PCT/JP2018/018908.
Office Action issued May 19, 2021, in Chinese Patent Application No. 201880032558.4.
Extended European Search Report for European Application No. 18801411.2, dated Jan. 20, 2021.
Third Party Submission of Jun. 30, 2021, in Taiwan Patent Application No. 107116788.
Third Party Submission issued Nov. 17, 2021, in Japanese Patent Application No. 2019-518837.
Third Party Submission issued Sep. 29 2021, in Japanese Patent Application No. 2019-518849.
Extended European Search Report issued Jan. 18, 2021, in European Patent Application No. 18801781.8.
Arkles et al., Gelest, Inc., Silane Coupling Agents, 2014.
Office Action issued May 10, 2022, in Japanese Patent Application No. 2019-518849.
Office Action issued Dec. 19, 2022, in Republic of Korea Patent Application No. 10-2019-7036747.
Final Office Action issued Dec. 2, 2022, in U.S. Appl. No. 16/614,023.
Office Action issued Oct. 13, 2022 in Korean Patent Application No. 10-2019-7036746.

* cited by examiner

CURABLE COMPOSITION FOR ADHESIVE AGENTS, ADHESIVE SHEET, CURED ARTICLE, LAMINATE, AND DEVICE

TECHNICAL FIELD

The present invention relates to a curable composition for adhesive agents, an adhesive sheet having an adhesive layer formed by using the curable composition for adhesive agents, a cured article of the curable composition for adhesive agents, a laminate obtained by adhering an adhered by using the curable composition for adhesive agents, and a device. The present application claims priority to JP 2017-098513 filed to Japan on May 17, 2017, the content of which is incorporated herein.

BACKGROUND ART

Thermosetting adhesive agents containing benzocyclobutene (BCB), a novolac-based epoxy resin, or polyorganosilsesquioxane are known as adhesive agents used to laminate semiconductors or to adhere electronic components (for example, see Patent Documents 1 and 2).

However, to cure a thermosetting adhesive agent containing BCB, heating at a high temperature around 200 to 350° C. is necessary, and the adhered might be damaged due to exposure to the high temperature. Furthermore, a thermosetting adhesive agent containing a novolac-based epoxy resin causes outgassing because the adhesive agent is decomposed when subjected to a high temperature process (for example, from 260 to 280° C.), such as lead-free solder reflow, and a problem of deteriorating tight bonding properties occurs.

On the other hand, a thermosetting adhesive agent containing polyorganosilsesquioxane can be cured at a low temperature compared to the case of a thermosetting adhesive agent containing BCB and can form a cured article having excellent adhesive properties and tight bonding properties for substrates. Furthermore, adhesive properties can be maintained when the thermosetting adhesive agent containing polyorganosilsesquioxane is subjected to a high temperature process.

CITATION LIST

Patent Document

Patent Document 1: JP 2009-279840 A
Patent Document 2: JP 2010-226060 A

SUMMARY OF INVENTION

Technical Problem

However, a cured article of the thermosetting adhesive agent containing polyorganosilsesquioxane have a problem of easily being cracked when the cured article is subjected to thermal shock. Furthermore, the curable adhesive agent containing polyorganosilsesquioxane may cause adhesion failure when an adhered is adhered to an adhesive layer because partial curing of the adhesive agent occurs during drying for removing a solvent contained in the adhesive agent, after the adhesive agent is coated.

An object of the present invention is to provide polyorganosilsesquioxane that cures at a low temperature and that can form a cured article having excellent heat resistance, crack resistance (or thermal shock resistance), and adhesive properties and tight bonding properties for adhereds.

Another object of the present invention is to provide a curable composition for adhesive agents (adhesive agent) that cures at a low temperature and that can form a cured article having excellent heat resistance, crack resistance (or thermal shock resistance), and adhesive properties and tight bonding properties for adhereds.

Another object of the present invention is to provide a cured article of the curable composition for adhesive agents.

Another object of the present invention is to provide an adhesive sheet having an adhesive layer formed by using the curable composition for adhesive agents.

Another object of the present invention is to provide a laminate obtained by adhering an adhered by the curable composition for adhesive agents; and a device having the laminate.

Furthermore, to allow high tight bonding properties of an adhesive agent to be imparted to semiconductors, a method in which tight bonding properties of the adhesive agent is enhanced by coating the adhesive agent after a silane coupling agent is coated on a semiconductor; and a method in which a silane coupling agent is blended in the adhesive agent are known. However, although the tight bonding properties of the adhesive agent to semiconductors is enhanced by using a silane coupling agent, cracking (crazing) may occur in the case where thermal shock, such as cooling and heating cycle (cyclically repeating heating and cooling) is applied, and improvement is needed.

Solution to Problem

The inventors of the present invention found that, according to a polyorganosilsesquioxane, which has a silsesquioxane constituent unit having an ionic polymerizable functional group (unit structure), in which a proportion of a particular structure (the ratio of T3 form to T2 form, the proportion of the silsesquioxane constituent unit having an ionic polymerizable functional group) is controlled to a particular range, which has a high number average molecular weight, and in which a molecular weight dispersity is controlled to a particular range, a curable composition for adhesive agents that contains the polyorganosilsesquioxane cures at a low temperature, can form a cured article having excellent heat resistance, crack resistance, adhesive properties and tight bonding properties for adhereds, and has excellent characteristics as an adhesive agent for laminating semiconductors, electronic components, or the like. Furthermore, it was found that use of the polysilsesquioxane and a particular epoxy group-containing silane compound for adhesion of an adhered provides an adhesive sheet having excellent crack resistance (or thermal shock resistance), heat resistance, and adhesive properties and tight bonding properties for adhereds. The present invention has been completed based on these findings.

That is, an embodiment of the present invention provides a curable composition for adhesive agents, the curable composition containing a polyorganosilsesquioxane (A) having a constituent unit represented by Formula (1):

[Chemical Formula 1]

$$[R^1SiO_{3/2}] \qquad (1)$$

in Formula (1), $R^1$ represents an ionic polymerizable functional group-containing group;

a constituent unit represented by Formula (I):

[Chemical Formula 2]

$$[R^a SiO_{3/2}] \quad (I)$$

in Formula (I), $R^a$ represents an ionic polymerizable functional group-containing group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom;

a constituent unit represented by Formula (II):

[Chemical Formula 3]

$$[R^b SiO_{2/2}(OR^c)] \quad (II)$$

in Formula (II), $R^b$ represents an ionic polymerizable functional group-containing group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom, and $R^c$ represents a hydrogen atom or an alkyl group having from 1 to 4 carbons; and a constituent unit represented by Formula (4):

[Chemical Formula 4]

$$[R^1 SiO_{2/2}(OR^c)] \quad (4)$$

in Formula (4), $R^1$ is synonymous with $R^1$ in Formula (1), and $R^c$ is synonymous with $R^c$ in Formula (II); wherein a molar ratio of the constituent unit represented by Formula (I) to the constituent unit represented by Formula (II), [(the constituent unit represented by Formula (I))/(the constituent unit represented by Formula (II))] is from 20 to 500, a proportion of the constituent unit represented by Formula (1) and the constituent unit represented by Formula (4) is from 55 to 100 mol % relative to a total amount (100 mol %) of siloxane constituent units, a number average molecular weight is from 2500 to 50000; and a molecular weight dispersity (weight average molecular weight/number average molecular weight) is from 1.0 to 4.0.

In the curable composition for adhesive agents described above, the polyorganosilsesquioxane (A) may further contain a constituent unit represented by Formula (2) below:

[Chemical Formula 5]

$$[R^2 SiO_{3/2}] \quad (2)$$

in Formula (2), $R^2$ represents a substituted or unsubstituted aryl group, a substituted or unsubstituted aralkyl group, a substituted or unsubstituted cycloalkyl group, a substituted or unsubstituted alkyl group, or a substituted or unsubstituted alkenyl group.

In the curable composition for adhesive agents described above, $R^2$ may be a substituted or unsubstituted aryl group.

In the curable composition for adhesive agents described above, the ionic polymerizable functional group may be an epoxy group.

In the curable composition for adhesive agents described above, $R^1$ may be a group represented by Formula (1a) below:

[Chemical Formula 6]

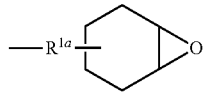
(1a)

in Formula (1a), $R^{1a}$ represents a linear or branched alkylene group;

a group represented by Formula (1b) below:

[Chemical Formula 7]

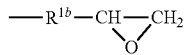
(1b)

in Formula (1b), $R^{1b}$ represents a linear or branched alkylene group;

a group represented by Formula (1c) below:

[Chemical Formula 8]

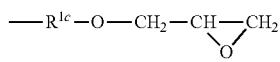
(1c)

in Formula (1c), $R^{1c}$ represents a linear or branched alkylene group; or a group represented by Formula (1d) below:

[Chemical Formula 9]

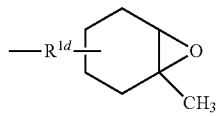
(1d)

in Formula (1d), $R^{1d}$ represents a linear or branched alkylene group.

The curable composition for adhesive agents may further contain a polymerization initiator.

The curable composition for adhesive agents described above may further contain a compound (B) having an ionic polymerizable functional group except the polyorganosilsesquioxane (A).

In the curable composition for adhesive agents, the ionic polymerizable functional group of the compound (B) may be at least one type selected from the group consisting of an epoxy ring, an oxetane ring, a vinyl ether group, and a vinylphenyl group.

The curable composition for adhesive agents may further contain a polymerization stabilizer (C).

The curable composition for adhesive agents may further contain a silane coupling agent (D).

In the curable composition for adhesive agents, the silane coupling agent (D) may contain a compound represented by Formula (X) below:

[Chemical Formula 10]

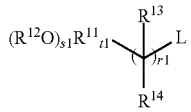
(X)

in Formula (X), r1 represents an integer of 4 to 20, L represents a group containing at least one group selected from the group consisting of an epoxy group, an oxetanyl group, and a vinyl ether group, $R^{11}$ and $R^{12}$ each represent a hydrocarbon group that may have a substituent, s1 represents an integer of 1 to 3, t1 represents an integer of 0 to 2, s1+t1 is 3, and $R^{13}$ and $R^{14}$ each represent a hydrogen atom or a hydrocarbon group that may have a substituent.

In the curable composition for adhesive agents, the silane coupling agent (D) may contain at least one type of an epoxy group-containing silane compound selected from the group consisting of compounds represented by Formula (X1) below:

[Chemical Formula 11]

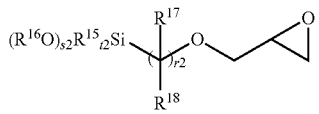
(X1)

in Formula (X1), r2 represents an integer of 4 to 20, $R^{15}$ and $R^{16}$ each represent a hydrocarbon group that may have a substituent, s2 represents an integer of 1 to 3, t2 represents an integer of 0 to 2, s2+t2 is 3, and $R^{17}$ and $R^{18}$ each represent a hydrogen atom or a hydrocarbon group that may have a substituent; and compounds represented by Formula (X2) below:

[Chemical Formula 12]

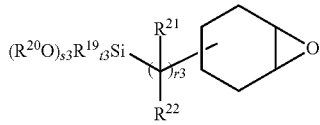
(X2)

in Formula (X2), r3 represents an integer of 4 to 20, $R^{19}$ and $R^{20}$ each represent a hydrocarbon group that may have a substituent, s3 represents an integer of 1 to 3, t3 represents an integer of 0 to 2, s3+t3 is 3, and $R^{21}$ and $R^{22}$ each represent a hydrogen atom or a hydrocarbon group that may have a substituent.

Furthermore, an embodiment of the present invention provides a cured article of the curable composition for adhesive agents.

Furthermore, an embodiment of the present invention provides a cured article obtained by subjecting the curable composition for adhesive agents described above to heat treatment in which a curing temperature is changed stepwisely, the heat treatment being a heat treatment in which a degree of curing at a time of heat treatment completion of a first step is 85% or less and the degree of curing is made greater than 85% by heat treatment of a second step or later.

Furthermore, an embodiment of the present invention provides an adhesive sheet containing a substrate and an adhesive layer on at least one face of the substrate, the adhesive layer being a layer of the curable composition for adhesive agents described above.

Furthermore, an embodiment of the present invention provides an adhesive sheet containing a substrate and, on at least one face of the substrate, an adhesive layer and an anchor coat layer containing a silane coupling agent (D), the adhesive layer being provided on a surface of the anchor coat layer, the adhesive layer being a layer of the curable composition for adhesive agents described above.

In the adhesive sheet described above, the silane coupling agent (D) may contain a compound represented by Formula (X) below:

[Chemical Formula 13]

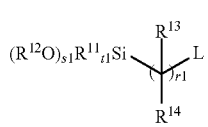
(X)

in Formula (X), r1 represents an integer of 4 to 20, L represents a group containing at least one group selected from the group consisting of an epoxy group, an oxetanyl group, and a vinyl ether group, $R^{11}$ and $R^{12}$ each represent a hydrocarbon group that may have a substituent, s1 represents an integer of 1 to 3, t1 represents an integer of 0 to 2, s1+t1 is 3, and $R^{13}$ and $R^{14}$ each represent a hydrogen atom or a hydrocarbon group that may have a substituent.

In the adhesive sheet described above, the silane coupling agent (D) may contain at least one type of an epoxy group-containing silane compound selected from the group consisting of compounds represented by Formula (X1) below:

[Chemical Formula 14]

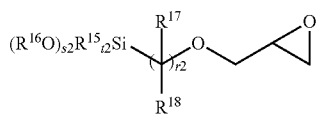
(X1)

in Formula (X1), r2 represents an integer of 4 to 20, $R^{15}$ and $R^{16}$ each represent a hydrocarbon group that may have a substituent, s2 represents an integer of 1 to 3, t2 represents an integer of 0 to 2, s2+t2 is 3, and $R^{17}$ and $R^{18}$ each represent a hydrogen atom or a hydrocarbon group that may have a substituent; and compounds represented by Formula (X2) below:

[Chemical Formula 15]

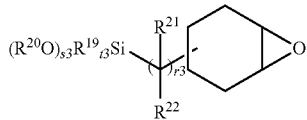
(X2)

in Formula (X2), r3 represents an integer of 4 to 20, $R^{19}$ and $R^{20}$ each represent a hydrocarbon group that may have a substituent, s3 represents an integer of 1 to 3, t3 represents an integer of 0 to 2, s3+t3 is 3, and $R^{21}$ and $R^{22}$ each represent a hydrogen atom or a hydrocarbon group that may have a substituent.

Furthermore, an embodiment of the present invention provides a laminate in which an adhered layer is adhered on the adhesive layer of the adhesive sheet described above.

Furthermore, an embodiment of the present invention provides a laminate formed from three or more layers,
the laminate having two adhered layers and an adhesive layer between the adhered layers, and
the adhesive layer being a layer of a cured article of the curable composition for adhesive agents described above.

Furthermore, an embodiment of the present invention provides a device having the laminate described above.

Advantageous Effects of Invention

Occurrence of cracking or peeling off in an adhesive layer in a laminate causes peeling off of an adhered layer or breakage of wiring and, as a result, causes failure of a device having the laminate. However, because the curable composition for adhesive agents according to an embodiment of the present invention having the structure described above cures at a low temperature and can form a cured article having excellent crack resistance, heat resistance, adhesive properties and tight bonding properties for adhereds, no cracking or peeling off in the adhesive layer occurs even when thermal shock is applied, and a reliable device can be formed. In the case where the laminate obtained by using the adhesive sheet or the curable composition for adhesive agents according to an embodiment of the present invention is a three-dimensional laminate of a semiconductor chip, by virtue of achieving higher integration and better power saving compared to those of known semiconductors, use of the laminate according to an embodiment of the present invention can provide a smaller electronic devices with higher performance while packaging density is enhanced.

DESCRIPTION OF EMBODIMENTS

Curable Composition for Adhesive Agent

Figure 1:
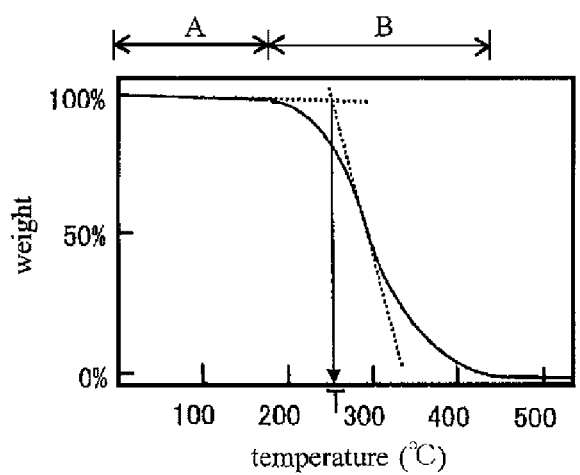
FIG. 1 is an explanation diagram (schematic diagram of thermogravimetric analysis result) showing an evaluation method of heat resistance of a cured article.

The curable composition for adhesive agents according to an embodiment of the present invention is a curable composition (curable resin composition) containing, as an essential component, a polyorganosilsesquioxane (A) which has a silsesquioxane constituent unit having an ionic polymerizable functional group (unit structure), in which a proportion of a particular structure (the ratio of T3 form to T2 form, the proportion of the silsesquioxane constituent unit having an ionic polymerizable functional group) is controlled to a particular range and in which a number average molecular weight and a molecular weight dispersity are controlled to particular ranges. As described below, the curable composition for adhesive agents according to an embodiment of the present invention may further contain other components, such as a compound (B) having an ionic polymerizable functional group except the polyorganosilsesquioxane (A) described below, a polymerization stabilizer (C), a silane coupling agent (D), a polymerization initiator, a solvent, a surface conditioner, a surface modifier, and the like.

Polyorganosilsesquioxane (A)

The polyorganosilsesquioxane (A) according to an embodiment of the present invention (silsesquioxane) has a constituent unit represented by Formula (1) below; where a molar ratio (constituent units represented by Formula (I)/constituent units represented by Formula (II); which may be described as "T3 form/T2 form") of constituent units represented by Formula (I) below (which may be referred to as "T3 form") to constituent units represented by Formula (II) below (which may be referred to as "T2 form") is from 20 to 500; a proportion (total amount) of constituent units represented by Formula (1) below and constituent units represented by Formula (4) described below is from 55 to 100 mol % relative to a total amount (100 mol %) of siloxane constituent units; a number average molecular weight is from 2500 to 50000; and a molecular weight dispersity (weight average molecular weight/number average molecular weight) is from 1.0 to 4.0.

[Chemical Formula 16]

$[R^1SiO_{3/2}]$ (1)

[Chemical Formula 17]

$[R^aSiO_{3/2}]$ (I)

[Chemical Formula 18]

$[R^bSiO_{2/2}(OR^c)]$ (II)

The constituent unit represented by Formula (1) above is a silsesquioxane constituent unit (what is called a T unit) generally represented by $[RSiO_{3/2}]$. Here, R in the above formula represents a hydrogen atom or a monovalent organic group and is also the same below. The constituent unit represented by Formula (1) above is formed by hydrolysis and condensation reactions of a corresponding hydrolyzable trifunctional silane compound (specifically, a compound represented by Formula (a) described later).

$R^1$ in Formula (1) represents an ionic polymerizable functional group-containing group (monovalent group). That is, the polyorganosilsesquioxane (A) according to an embodiment of the present invention is a polymerizable compound at least having an ionic polymerizable functional group in a molecule.

Examples of the ionic polymerizable functional group include an epoxy group, an oxetane group, a vinyl ether group, a vinylphenyl group, and the like.

From the perspectives of curability of the curable composition for adhesive agents; and heat resistance and crack resistance of the cured article, an epoxy group is particularly preferable.

Examples of the epoxy group-containing group include well known or commonly used oxirane ring-containing groups and are not particularly limited, but from the perspectives of curability of the curable composition for adhesive agents; and heat resistance and crack resistance of the cured article, a group represented by Formula (1a) below, a group represented by Formula (1b) below, a group represented by Formula (1c) below, and a group represented by Formula (1d) below are preferred, a group represented by Formula (1a) below and a group represented by Formula (1c) below are more preferred, and a group represented by Formula (1a) below is even more preferred.

[Chemical Formula 19]

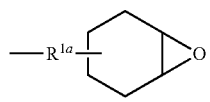
(1a)

[Chemical Formula 20]

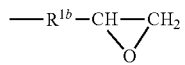
(1b)

[Chemical Formula 21]

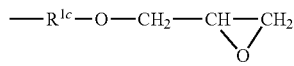
(1c)

[Chemical Formula 22]

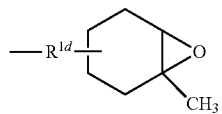
(1d)

In Formula (1a) above, $R^{1a}$ represents a linear or branched alkylene group. Examples of the linear or branched alkylene group include linear or branched alkylene groups having from 1 to 10 carbons, such as a methylene group, a methyl methylene group, a dimethyl methylene group, an ethylene group, a propylene group, a trimethylene group, a tetramethylene group, a pentamethylene group, a hexamethylene group, and a decamethylene group. Among these, from the perspectives of heat resistance and crack resistance of the cured article; and curability, $R^{1a}$ is preferably a linear alkylene group having from 1 to 4 carbons and a branched alkylene group having 3 or 4 carbons, more preferably an ethylene group, a trimethylene group, and a propylene group, and even more preferably an ethylene group and a trimethylene group.

In Formula (1b) above, $R^{1b}$ represents a linear or branched alkylene group, and the same groups as $R^{1a}$ are exemplified. Among these, from the perspectives of heat resistance and crack resistance of the cured article; and curability, $R^{1b}$ is preferably a linear alkylene group having from 1 to 4 carbons and a branched alkylene group having 3 or 4 carbons, more preferably an ethylene group, a trimethylene group, and a propylene group, and even more preferably an ethylene group and a trimethylene group.

In Formula (1c) above, $R^{1c}$ represents a linear or branched alkylene group, and the same groups as $R^{1a}$ are exemplified. Among these, from the perspectives of heat resistance and crack resistance of the cured article; and curability, $R^{1c}$ is preferably a linear alkylene group having from 1 to 4 carbons and a branched alkylene group having 3 or 4 carbons, more preferably an ethylene group, a trimethylene group, and a propylene group, and even more preferably an ethylene group and a trimethylene group.

In Formula (1d) above, $R^{1d}$ represents a linear or branched alkylene group, and the same groups as $R^{1a}$ are exemplified. Among these, from the perspectives of heat resistance and crack resistance of the cured article; and curability, $R^{1d}$ is preferably a linear alkylene group having from 1 to 4 carbons and a branched alkylene group having 3 or 4 carbons, more preferably an ethylene group, a trimethylene group, and a propylene group, and even more preferably an ethylene group and a trimethylene group.

In particular, $R^1$ in Formula (1) is preferably a group represented by Formula (1a) above in which $R^{1a}$ is an ethylene group (in particular, 2-(3',4'-epoxycyclohexyl)ethyl group).

Examples of the oxetane group-containing group include well known or commonly used oxetane ring-containing groups and are not particularly limited. Examples thereof include an oxetane group and groups obtained by replacing hydrogen atom(s) (typically one or more, and preferably one hydrogen atom) of an alkyl group (an alkyl group preferably having from 1 to 10 carbons and more preferably 1 to 5 carbons) with oxetane group(s). From the perspectives of curability of the curable composition for adhesive agents; and heat resistance and crack resistance of the cured article, a 3-oxetanyl group, an oxetan-3-ylmethyl group, a 3-ethyloxetan-3-ylmethyl group, a 2-(oxetan-3-yl)ethyl group, a 2-(3-ethyloxetan-3-yl)ethyl group, a 3-(oxetan-3-ylmethoxy)propyl group, a 3-(3-ethyloxetan-3-ylmethoxy) propyl group, and the like.

Examples of the vinyl ether group-containing group include well known or commonly used vinyl ether group-containing groups and are not particularly limited. Examples thereof include a vinyl ether group and groups obtained by replacing hydrogen atom(s) (typically one or more and preferably one hydrogen atom) of an alkyl group (an alkyl group preferably having from 1 to 10 carbons and more preferably from 1 to 5 carbons) with vinyl ether group(s). From the perspectives of curability of the curable composition for adhesive agents; and heat resistance and crack resistance of the cured article, a vinyloxymethyl group, a 2-(vinyloxy)ethyl group, a 3-(vinyloxy)propyl group, and the like are preferred.

Examples of the vinylphenyl group-containing group include well known or commonly used vinylphenyl group-containing groups and are not particularly limited. Examples thereof include a vinylphenyl group and groups obtained by replacing hydrogen atom(s) (typically one or more and preferably one hydrogen atom) of an alkyl group (an alkyl group preferably having from 1 to 10 carbons and more preferably from 1 to 5 carbons) with vinylphenyl group(s). From the perspectives of curability of the curable composition for adhesive agents; and heat resistance and crack resistance of the cured article, a 4-vinylphenyl group, a 3-vinylphenyl group, a 2-vinylphenyl group, and the like are preferred.

$R^1$ in Formula (1) is preferably an epoxy group-containing group, and a group which is represented by Formula (1a) above, in which $R^{1a}$ is an ethylene group (in particular, 2-(3',4'-epoxycyclohexyl)ethyl group), is particularly preferred.

The polyorganosilsesquioxane (A) according to an embodiment of the present invention may contain only one type of constituent unit represented by Formula (1) above or may include two or more types of constituent units represented by Formula (1) above.

The polyorganosilsesquioxane (A) according to an embodiment of the present invention may also contain a constituent unit represented by Formula (2) below, in addition to the constituent unit represented by Formula (1) above, as the silsesquioxane constituent unit $[RSiO_{3/2}]$.

[Chemical Formula 23]

$$[R^2SiO_{3/2}] \quad (2)$$

The constituent unit represented by Formula (2) above is a silsesquioxane constituent unit (T unit) generally represented by $[RSiO_{3/2}]$. That is, the constituent unit represented by Formula (2) above is formed by hydrolysis and condensation reactions of a corresponding hydrolyzable trifunctional silane compound (specifically, a compound represented by Formula (b) described later).

$R^2$ in Formula (2) above represents a substituted or unsubstituted aryl group, a substituted or unsubstituted aralkyl group, a substituted or unsubstituted cycloalkyl group, a substituted or unsubstituted alkyl group, or a substituted or unsubstituted alkenyl group. Examples of the aryl group include a phenyl group, a tolyl group, and a naphthyl group. Examples of the aralkyl group include a benzyl group and a phenethyl group. Examples of the cycloalkyl group include a cyclobutyl group, a cyclopentyl group, and a cyclohexyl group. Examples of the alkyl group include linear or branched alkyl groups, such as a methyl group, an ethyl group, a propyl group, an n-butyl group, an isopropyl group, an isobutyl group, an s-butyl group, a t-butyl group, and an isopentyl group. Examples of the alkenyl group include linear or branched alkenyl groups, such as a vinyl group, an allyl group, and an isopropenyl group.

Examples of the substituted aryl group, the substituted aralkyl group, the substituted cycloalkyl group, the substituted alkyl group, and the substituted alkenyl group described above include a group in which some or all of hydrogen atoms or a portion or whole of the backbone in each of the aryl group, the aralkyl group, the cycloalkyl group, the alkyl group, and the alkenyl group described above are replaced with at least one type selected from the group consisting of an ether group, an ester group, a carbonyl group, a siloxane group, a halogen atom (such as a fluorine atom), an acrylic group, a methacrylic group, a mercapto group, an amino group, and a hydroxy group (hydroxyl group).

Among these, $R^2$ is preferably a substituted or unsubstituted aryl group, a substituted or unsubstituted alkyl group, or a substituted or unsubstituted alkenyl group, more preferably a substituted or unsubstituted aryl group, and even more preferably a phenyl group.

A proportion of each silsesquioxane constituent unit described above (the constituent unit represented by Formula (1) and the constituent unit represented by Formula (2)) in the polyorganosilsesquioxane (A) according to an embodiment of the present invention can be appropriately adjusted by the composition of the raw materials (hydrolyzable trifunctional silanes) for forming these constituent units.

The polyorganosilsesquioxane (A) according to an embodiment of the present invention may further contain, in addition to the constituent unit represented by Formula (1) above and the constituent unit represented by Formula (2) above, at least one type of siloxane constituent unit selected from the group consisting of a silsesquioxane constituent unit $[RSiO_{3/2}]$ other than the constituent unit represented by Formula (1) above and the constituent unit represented by Formula (2) above; a constituent unit represented by $[R_3SiO_{1/2}]$ (what is called an M unit); a constituent unit represented by $[R_2SiO_{2/2}]$ (what is called a D unit); and a constituent unit represented by $[SiO_{4/2}]$ (what is called a Q unit). Here, examples of the silsesquioxane constituent unit other than the constituent unit represented by Formula (1) above and the constituent unit represented by Formula (2) above include a constituent unit represented by Formula (3) below.

[Chemical Formula 24]

$$[HSiO_{3/2}] \quad (3)$$

The ratio (T3 form/T2 form) of the constituent unit (T3 form) represented by Formula (I) above to the constituent unit (T2 form) represented by Formula (II) above in the polyorganosilsesquioxane (A) according to an embodiment of the present invention is from 20 to 500 as described above. The lower limit of the ratio (T3 form/T2 form) is preferably 21, more preferably 23, and even more preferably 25. The ratio (T3 form/T2 form) of 20 or greater significantly enhances heat resistance, crack resistance, and adhesive properties of the cured article. On the other hand, the upper limit of the ratio (T3 form/T2 form) is preferably 100, more preferably 50, and even more preferably 40. The ratio [T3 form/T2 form] of 500 or less enhances compatibility with other components in the curable composition for adhesive agents, suppresses viscosity, and achieves easy handling and coatability as an adhesive agent.

The constituent unit represented by Formula (I) above is represented by Formula (I') below in more detail. Furthermore, the constituent unit represented by Formula (II) above is represented by Formula (II') below in more detail. Three oxygen atoms bonded to the silicon atom illustrated in the structure represented by Formula (I') below are each bonded to another silicon atom (a silicon atom not illustrated in Formula (I')). On the other hand, two oxygen atoms located above and below the silicon atom illustrated in the structure represented by Formula (II') below are each bonded to another silicon atom (a silicon atom not illustrated in Formula (II')). That is, both the T3 form and the T2 form are constituent units (T units) formed by hydrolysis and condensation reactions of a corresponding hydrolyzable trifunctional silane compound.

[Chemical Formula 25]

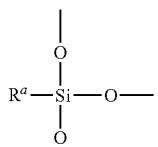

(I′)

[Chemical Formula 26]

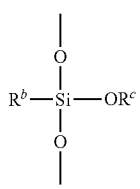

(I″)

$R^a$ in Formula (I) above (also $R^a$ in Formula (I′)) and $R^b$ in Formula (II) above (also $R^b$ in Formula (II′)) each represent an ionic polymerizable functional group-containing group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom. Specific examples of $R^a$ and $R^b$ include those exemplified for $R^1$ in Formula (1) above and $R^2$ in Formula (2) above. Note that $R^a$ in Formula (I) and $R^b$ in Formula (II) are each derived from a group bonded to a silicon atom in the hydrolyzable trifunctional silane compound used as a raw material for the polyorganosilsesquioxane (A) according to an embodiment of the present invention (a group other than an alkoxy group and a halogen atom; for example, $R^1$, $R^2$, a hydrogen atom, and the like in Formulas (a) to (c) described below).

$R^c$ in Formula (II) above (also $R^c$ in Formula (II′)) represents a hydrogen atom or an alkyl group having from 1 to 4 carbons. Examples of the alkyl group having from 1 to 4 carbons include linear or branched alkyl groups having from 1 to 4 carbons, such as a methyl group, an ethyl group, a propyl group, an isopropyl group, a butyl group, and an isobutyl group. The alkyl group in $R^c$ in Formula (II) is typically derived from an alkyl group forming an alkoxy group (for example, an alkoxy group as $X^1$ to $X^3$ described below and the like) in the hydrolyzable silane compound used as a raw material for the polyorganosilsesquioxane (A) according to an embodiment of the present invention.

The above ratio (T3 form/T2 form) in the polyorganosilsesquioxane (A) according to an embodiment of the present invention can be determined, for example, by $^{29}$Si-NMR spectrum measurement. In the $^{29}$Si-NMR spectrum, the silicon atom in the constituent unit (T3 form) represented by Formula (I) above and the silicon atom in the constituent unit (T2 form) represented by Formula (II) above exhibit signals (peaks) at different positions (chemical shifts), and thus the above ratio (T3 form/T2 form) is determined by calculating the integration ratio of these respective peaks. Specifically, for example, when the polyorganosilsesquioxane (A) according to an embodiment of the present invention contains a constituent unit represented by Formula (1) above where $R^1$ is a 2-(3′,4′-epoxycyclohexyl)ethyl group, the signal of the silicon atom in the structure (T3 form) represented by Formula (I) above appears at −64 to −70 ppm, and the signal of the silicon atom in the structure (T2 form) represented by Formula (II) above appears at −54 to −60 ppm. Thus, in this case, the above ratio (T3 form/T2 form) can be determined by calculating the integration ratio of the signal at −64 to −70 ppm (T3 form) and the signal at −54 to −60 ppm (T2 form). Even in the case where $R^1$ is an ionic polymerizable functional group-containing group except the 2-(3′,4′-epoxycyclohexyl)ethyl group, (T3 form/T2 form) can be determined in the same manner.

$^{29}$Si-NMR spectrum of the polyorganosilsesquioxane (A) according to an embodiment of the present invention can be measured, for example, with the following instrument and conditions.

Measuring instrument: Trade name "JNM-ECA500NMR" (available from JEOL Ltd.)
Solvent: Deuteriochloroform
Cumulative number: 1800 times
Measurement temperature: 25° C.

The ratio (T3 form/T2 form) of the polyorganosilsesquioxane (A) according to an embodiment of the present invention being 20 to 500 means that the level of T2 form relative to T3 form in the polyorganosilsesquioxane (A) according to an embodiment of the present invention is relatively smaller, and the hydrolysis and condensation reactions of the silanol have progressed more. Examples of such a T2 form include a constituent unit represented by Formula (4) below, a constituent unit represented by Formula (5) below, and a constituent unit represented by Formula (6) below. $R^1$ in Formula (4) below and $R^2$ in Formula (5) below are each synonymous with $R^1$ in Formula (1) above and $R^2$ in Formula (2) above. $R^c$ in each of Formulas (4) to (6) below represents a hydrogen atom or an alkyl group having from 1 to 4 carbons, as in the case of $R^c$ in Formula (II).

[Chemical Formula 27]

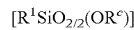 (4)

[Chemical Formula 28]

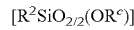 (5)

[Chemical Formula 29]

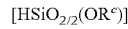 (6)

The polyorganosilsesquioxane (A) according to an embodiment of the present invention may have any cage, partial cage, ladder, or random silsesquioxane structure or may have a combination of two or more of these silsesquioxane structures.

The proportion (total amount) of the constituent units represented by Formula (1) above and the constituent units represented by Formula (4) above relative to a total amount of siloxane constituent units (total siloxane constituent units; total amount of M unit, D unit, T unit, and Q unit) (100 mol %) in the polyorganosilsesquioxane (A) according to an embodiment of the present invention is from 55 to 100 mol % as described above, preferably from 65 to 100 mol %, and more preferably from 80 to 99 mol %. The proportion of 55 mol % or greater enhances curability of the curable composition for adhesive agents and significantly enhances heat resistance, crack resistance, and adhesive properties of the cured article. In addition, the proportion of each siloxane constituent unit in the polyorganosilsesquioxane (A) according to an embodiment of the present invention can be calculated, for example, from a raw material composition, NMR spectrum measurement, or the like.

The proportion (total amount) of the constituent units represented by Formula (2) above and the constituent units represented by Formula (5) above relative to the total amount of siloxane constituent units (total siloxane constituent units; total amount of M unit, D unit, T unit, and Q unit) (100 mol %) in the polyorganosilsesquioxane (A) according to an embodiment of the present invention is not particularly limited but is preferably from 0 to 70 mol %, more preferably from 0 to 60 mol %, even more preferably from 0 to 40 mol %, and particularly preferably from 1 to 15 mol %. The proportion of 70 mol % or less can relatively increase the proportion of the constituent units represented by Formula (1) and the constituent units represented by Formula (4), thus tends to enhance the curability of the curable composition for adhesive agents, and tends to further enhance heat resistance, crack resistance, and adhesive properties of the cured article. On the other hand, the proportion of 1 mol % or greater tends to enhance gas barrier properties of the cured article.

The proportion (total amount) of the constituent units represented by Formula (1) above, the constituent units represented by Formula (2) above, the constituent units represented by Formula (4) above, and the constituent units represented by Formula (5) above relative to the total amount of siloxane constituent units (total siloxane constituent units; total amount of M unit, D unit, T unit, and Q unit) (100 mol %) in the polyorganosilsesquioxane (A) according to an embodiment of the present invention is not particularly limited but is preferably from 60 to 100 mol %, more preferably from 70 to 100 mol %, and even more preferably from 80 to 100 mol %. The proportion of 60 mol % or greater tends to further enhance heat resistance, crack resistance, and adhesive properties of the cured article.

The number average molecular weight (Mn) of the polyorganosilsesquioxane (A) according to an embodiment of the present invention in terms of standard polystyrene by gel permeation chromatography is from 2500 to 50000 as described above, preferably from 2800 to 10000, and more preferably from 3000 to 8000. The number average molecular weight of 2500 or greater further enhances heat resistance, crack resistance, and adhesive properties of the cured article. On the other hand, the number average molecular weight of 50000 or less enhances compatibility with other components in the curable composition for adhesive agents and further enhances heat resistance and crack resistance of the cured article.

The molecular weight dispersity (Mw/Mn) of the polyorganosilsesquioxane (A) according to an embodiment of the present invention in terms of standard polystyrene by gel permeation chromatography is from 1.0 to 4.0 as described above, preferably from 1.1 to 3.0, and more preferably from 1.2 to 2.5. The molecular weight dispersity of 4.0 or less further enhances heat resistance crack resistance, and adhesive properties of the cured article. On the other hand, the polyorganosilsesquioxane with the molecular weight dispersity of 1.1 or greater tends to be liquid and enhances the handling ease.

The number average molecular weight and the molecular weight dispersity of the polyorganosilsesquioxane (A) according to an embodiment of the present invention can be measured with the following instrument and conditions:

Measuring instrument: Trade name "LC-20AD" (available from Shimadzu Corporation)
Column: Shodex KF-801×2, KF-802, and KF-803 (available from Showa Denko K.K.)
Measurement temperature: 40° C.
Eluent: THF, sample concentration of 0.1 to 0.2 wt. %
Flow rate: 1 mL/min
Detector: UV-VIS detector (trade name "SPD-20A", available from Shimadzu Corporation)
Molecular weight: in terms of standard polystyrene A 5% weight loss temperature ($T_{d5}$) of the polyorganosilsesquioxane (A) according to an embodiment of the present invention in air atmosphere is, but not particularly limited to, preferably 330° C. or higher (for example, from 330 to 450° C.), more preferably 340° C. or higher, and even more preferably 350° C. or higher. The polyorganosilsesquioxane with a 5% weight loss temperature of 330° C. or higher tends to further improve the heat resistance of the cured article. In particular, with the polyorganosilsesquioxane (A) according to an embodiment of the present invention having the ratio (T3 form/T2 form) described above of 20 to 500, the number average molecular weight of 2500 to 50000, and the molecular weight dispersity from 1.0 to 4.0, the 5% weight loss temperature is controlled to 330° C. or higher. Here, the 5% weight loss temperature is a temperature at which 5% of the weight before heating decreases when heated at a constant temperature increase rate and is an indicator of heat resistance. The 5% weight loss temperature can be measured by TGA (thermogravimetric analysis) under conditions of a temperature increase rate of 5° C./min in air atmosphere.

The polyorganosilsesquioxane (A) according to an embodiment of the present invention can be produced by a well known or commonly used method for producing a polysiloxane and, for example, can be produced by, but not particularly limited to, a method of hydrolysis and condensation of one type or two or more types of hydrolyzable silane compounds. As the hydrolyzable silane compound, however, a hydrolyzable trifunctional silane compound (compound represented by Formula (a) below) for forming the constituent unit represented by Formula (1) described above needs to be used as an essential hydrolyzable silane compound.

More specifically, for example, the polyorganosilsesquioxane (A) according to an embodiment of the present invention can be produced by a method of hydrolysis and condensation of a compound represented by Formula (a) below, which is a hydrolyzable silane compound for forming a silsesquioxane constituent unit (T unit) in the polyorganosilsesquioxane (A) according to an embodiment of the present invention and, additionally as necessary, a compound represented by Formula (b) below and a compound represented by Formula (c) below.

[Chemical Formula 30]

  (a)

[Chemical Formula 31]

  (b)

[Chemical Formula 32]

  (c)

The compound represented by Formula (a) above is a compound that forms a constituent unit represented by Formula (1) in the polyorganosilsesquioxane (A) according to an embodiment of the present invention. $R^1$ in Formula (a) represents an ionic polymerizable functional group-containing group, as in the case of $R^1$ in Formula (1) above. That is, $R^1$ in Formula (a) is preferably a group represented by Formula (1a) above, a group represented by Formula (1b)

above, a group represented by Formula (1c) above, and a group represented by Formula (1d) above, more preferably a group represented by Formula (1a) above and a group represented by Formula (1c) above, even more preferably a group represented by Formula (1a) above, particularly preferably a group represented by Formula (1a) above where $R^{1a}$ is an ethylene group (in particular, 2-(3',4'-epoxycyclohexyl) ethyl group).

$X^1$ in Formula (a) above represents an alkoxy group or a halogen atom. Examples of the alkoxy group in $X^1$ include alkoxy groups having from 1 to 4 carbons, such as a methoxy group, an ethoxy group, a propoxy group, an isopropyloxy group, a butoxy group, and an isobutyloxy group. In addition, examples of the halogen atom in $X^1$ include a fluorine atom, a chlorine atom, a bromine atom, and an iodine atom. Among them, $X^1$ is preferably an alkoxy group and more preferably a methoxy group and an ethoxy group. In addition, the three Vs each may be the same or different.

The compound represented by Formula (b) above is a compound that forms a constituent unit represented by Formula (2) in the polyorganosilsesquioxane (A) according to an embodiment of the present invention. $R^2$ in Formula (b) represents, as in the case of $R^2$ in Formula (2) above, a substituted or unsubstituted aryl group, a substituted or unsubstituted aralkyl group, a substituted or unsubstituted cycloalkyl group, a substituted or unsubstituted alkyl group, or a substituted or unsubstituted alkenyl group. That is, $R^2$ in Formula (b) is preferably a substituted or unsubstituted aryl group, a substituted or unsubstituted alkyl group, or a substituted or unsubstituted alkenyl group, more preferably a substituted or unsubstituted aryl group, and even more preferably a phenyl group.

$X^2$ in Formula (b) above represents an alkoxy group or a halogen atom. Specific examples of $X^2$ include those exemplified as $X^1$. Among them, $X^2$ is preferably an alkoxy group and more preferably a methoxy group and an ethoxy group. In addition, the three $X^2$s each may be the same or different.

The compound represented by Formula (c) above is a compound that forms a constituent unit represented by Formula (3) in the polyorganosilsesquioxane (A) according to an embodiment of the present invention. $X^3$ in Formula (c) above represents an alkoxy group or a halogen atom. Specific examples of $X^3$ include those exemplified as $X^1$. Among these, $X^3$ is preferably an alkoxy group and more preferably a methoxy group or an ethoxy group. In addition, the three $X^3$s each may be the same or different.

A hydrolyzable silane compound other than the compounds represented by Formulae (a) to (c) above may be used in combination as the hydrolyzable silane compound. Examples thereof include hydrolyzable trifunctional silane compounds other than the compounds represented by Formulae (a) to (c) above, hydrolyzable monofunctional silane compounds forming an M unit, hydrolysable bifunctional silane compounds forming a D unit, and hydrolysable tetrafunctional silane compounds forming a Q unit.

The used amount and the composition of the hydrolyzable silane compound can be appropriately adjusted according to a desired structure of the polyorganosilsesquioxane (A) according to an embodiment of the present invention. For example, the used amount of the compound represented by Formula (a) above is not particularly limited but is preferably from 55 to 100 mol %, more preferably from 65 to 100 mol %, and even more preferably from 80 to 99 mol %, relative to a total amount (100 mol %) of the hydrolyzable silane compound used.

In addition, the used amount of the compound represented by Formula (b) above is, but not particularly limited to, preferably from 0 to 70 mol %, more preferably from 0 to 60 mol %, even more preferably from 0 to 40 mol %, and particularly preferably from 1 to 15 mol %, relative to a total amount (100 mol %) of the used hydrolyzable silane compound.

Furthermore, the proportion (proportion in the total amount) of the compound represented by Formula (a) and the compound represented by Formula (b) relative to a total amount (100 mol %) of the used hydrolysable silane compound is, but not particularly limited to, preferably from 60 to 100 mol %, more preferably from 70 to 100 mol %, and even more preferably from 80 to 100 mol %.

In addition, in a case where two or more types of the hydrolyzable silane compounds are used in combination, hydrolysis and condensation reactions of these hydrolyzable silane compounds can be performed simultaneously or sequentially. The order of the reactions when performed sequentially is not particularly limited.

The hydrolysis and condensation reactions of the hydrolyzable silane compound may be performed in one step or in two or more steps; however, to efficiently produce the polyorganosilsesquioxane (A) according to an embodiment of the present invention, the hydrolysis and condensation reactions are preferably performed in two or more steps (preferably two steps). An embodiment in which the hydrolysis and condensation reactions of the hydrolyzable silane compound is performed in two steps will be described below; however, the method for producing the polyorganosilsesquioxane (A) according to an embodiment of the present invention is not limited to this.

In the case where the hydrolysis and condensation reactions according to an embodiment of the present invention are performed in two steps, the polyorganosilsesquioxane (A) according to an embodiment of the present invention can be obtained by, preferably, obtaining a polyorganosilsesquioxane having the ratio (T3 form/T2 form) of 5 or greater but less than 20 and the number average molecular weight from 1000 to 3000 (hereinafter, also referred to as "intermediate polyorganosilsesquioxane") in the hydrolysis and condensation reactions of the first step; and then subjecting the intermediate polyorganosilsesquioxane to further hydrolysis and condensation reactions in the second step.

The hydrolysis and condensation reactions of the first step can be performed in the presence or absence of a solvent. Among them, the hydrolysis and condensation reactions are preferably performed in the presence of a solvent. Examples of the solvent include aromatic hydrocarbons, such as benzene, toluene, xylene, and ethylbenzene; ethers, such as diethyl ether, dimethoxyethane, tetrahydrofuran, and dioxane; ketones, such as acetone, methyl ethyl ketone, and methyl isobutyl ketone; esters, such as methyl acetate, ethyl acetate, isopropyl acetate, and butyl acetate; amides, such as N,N-dimethylformamide and N,N-dimethylacetamide; nitriles, such as acetonitrile, propionitrile, and benzonitrile; alcohols, such as methanol, ethanol, isopropyl alcohol, and butanol. Among them, the solvent is preferably ketones and ethers. In addition, one type of the solvent can be used alone, or two or more types thereof can be used in combination.

The used amount of the solvent in the hydrolysis and condensation reactions of the first step is not particularly limited and can be appropriately adjusted in a range of 0 to 2000 parts by weight relative to 100 parts by weight of a total amount of the hydrolyzable silane compound, according to a desired reaction time or the like.

The hydrolysis and condensation reactions of the first step are preferably performed in the presence of a catalyst and water. The catalyst may be an acid catalyst or an alkali catalyst, and to suppress decomposition of the ionic polymerizable functional group such as an epoxy group, an alkali catalyst is preferred. Examples of the acid catalyst include mineral acids, such as hydrochloric acid, sulfuric acid, nitric acid, phosphoric acid, and boric acid; phosphate esters; carboxylic acids, such as acetic acid, formic acid, and trifluoroacetic acid; sulfonic acids, such as methanesulfonic acid, trifluoromethanesulfonic acid, and p-toluenesulfonic acid; solid acids, such as activated clay; and Lewis acids, such as iron chloride. Examples of the alkali catalyst include alkali metal hydroxides, such as lithium hydroxide, sodium hydroxide, potassium hydroxide, and cesium hydroxide; alkaline earth metal hydroxides, such as magnesium hydroxide, calcium hydroxide, and barium hydroxide; alkali metal carbonates, such as lithium carbonate, sodium carbonate, potassium carbonate, and cesium carbonate; alkaline earth metal carbonates, such as magnesium carbonate; alkali metal hydrogencarbonates, such as lithium hydrogencarbonate, sodium hydrogencarbonate, sodium hydrogencarbonate, potassium hydrogencarbonate, and cesium hydrogencarbonate; alkali metal organic acid salts (for example, acetates), such as lithium acetate, sodium acetate, potassium acetate, and cesium acetate; alkaline earth metal organic acid salts (for example, acetates), such as magnesium acetate; alkali metal alkoxides, such as lithium methoxide, sodium methoxide, sodium ethoxide, sodium isopropoxide, potassium ethoxide, and potassium t-butoxide; alkali metal phenoxides, such as sodium phenoxide; amines (tertiary amines and the like), such as triethylamine, N-methylpiperidine, 1,8-diazabicyclo[5.4.0]undec-7-ene, and 1,5-diazabicyclo[4.3.0]non-5-ene; and nitrogen-containing heterocyclic aromatic compounds, such as pyridine, 2,2'-bipyridyl, and 1,10-phenanthroline. Here, one type of the catalyst can be used alone, or two or more types thereof can be used in combination. In addition, the catalyst can be used in a state of being dissolved or dispersed in water, a solvent, or the like.

The amount of the catalyst used in the hydrolysis and condensation reactions of the first step is not particularly limited and can be appropriately adjusted in a range from 0.002 to 0.200 mol relative to 1 mol total of the hydrolyzable silane compound.

The amount of water used in the hydrolysis and condensation reactions of the first step is not particularly limited and can be appropriately adjusted in a range from 0.5 to 20 mol relative to 1 mol total of the hydrolyzable silane compound.

The method for adding water in the hydrolysis and condensation reactions of the first step is not particularly limited, and a total amount (total used amount) of water to be used may be added at once or may be added sequentially. When water is added sequentially, it may be added continuously or intermittently.

For the reaction conditions of the hydrolysis and condensation reactions of the first step, it is particularly important to select the reaction conditions to achieve the above ratio (T3 form/T2 form) of 5 or greater but less than 20 in the intermediate polyorganosilsesquioxane. The reaction temperature of the hydrolysis and condensation reactions of the first step are not particularly limited but are preferably from 40 to 100° C. and more preferably from 45 to 80° C. By controlling the reaction temperature to the range described above, the above ratio (T3 form/T2 form) tends to be more efficiently controlled to 5 or greater but less than 20. In addition, the reaction time of the hydrolysis and condensation reactions of the first step is not particularly limited but are preferably from 0.1 to 10 hours and more preferably from 1.5 to 8 hours. Furthermore, the hydrolysis and condensation reactions of the first step can be performed under normal pressure or can be performed under increased pressure or reduced pressure. Here, an atmosphere for performing the hydrolysis and condensation reactions of the first step is not particularly limited. For example, it may be any of under an inert gas atmosphere, such as a nitrogen atmosphere or an argon atmosphere, or in the presence of oxygen, such as in the air. However, the hydrolysis and condensation reactions of the first step are preferably performed in an inert gas atmosphere.

The intermediate polyorganosilsesquioxane can be obtained by the hydrolysis and condensation reactions of the first step. After completion of the hydrolysis and condensation reactions of the first step, the catalyst is preferably neutralized to suppress decomposition of an ionic polymerizable functional group, such as ring-opening of the epoxy group. The intermediate polyorganosilsesquioxane may be, for example, separated and purified by a separation means, such as water washing, acid washing, alkali washing, filtration, concentration, distillation, extraction, crystallization, recrystallization, and column chromatography, or a combined separation means thereof.

The polyorganosilsesquioxane (A) according to an embodiment of the present invention can be produced by subjecting the intermediate polyorganosilsesquioxane obtained in the hydrolysis and condensation reactions of the first step to the hydrolysis and condensation reactions of the second step.

The hydrolysis and condensation reactions of the second step can be performed in the presence or absence of a solvent. In the case where the hydrolysis and condensation reactions of the second step are performed in the presence of a solvent, the solvent exemplified in the hydrolysis and condensation reactions of the first step can be used. As the solvent for the hydrolysis and condensation reactions of the second step, an intermediate polyorganosilsesquioxane containing a reaction solvent, extraction solvent, or the like of the hydrolysis and condensation reactions of the first step may be used as is or may be used after some being distilled away. In addition, one type of the solvent can be used alone, or two or more types thereof can be used in combination.

In the case where the solvent is used in the hydrolysis and condensation reactions of the second step, the used amount thereof is not particularly limited and can be appropriately adjusted in a range from 0 to 2000 parts by weight relative to 100 parts by weight of the intermediate polyorganosilsesquioxane, according to a desired reaction time or the like.

The hydrolysis and condensation reactions of the second step are preferably performed in the presence of a catalyst and water. As the catalyst, the catalyst exemplified for the hydrolysis and condensation reactions of the first step can be used. To suppress decomposition of the ionic polymerizable functional group such as an epoxy group, an alkali catalyst is preferred, and an alkali metal hydroxide, such as sodium hydroxide, potassium hydroxide, or cesium hydroxide; or an alkali metal carbonate, such as lithium carbonate, sodium carbonate, potassium carbonate, or cesium carbonate, is more preferred. Here, one type of the catalyst can be used alone, or two or more types thereof can be used in combination. In addition, the catalyst can be used in a state of being dissolved or dispersed in water, a solvent, or the like.

The amount of the used catalyst in the hydrolysis and condensation reactions of the second step is not particularly limited and can be appropriately adjusted in a range from preferably 0.01 to 10000 ppm and more preferably from 0.1 to 1000 ppm, relative to the amount (1000000 ppm) of the intermediate polyorganosilsesquioxane.

The amount of the used water in the hydrolysis and condensation reactions of the second step is not particularly limited and can be appropriately adjusted in a range from preferably 10 to 100000 ppm and more preferably 100 to 20000 ppm, relative to the amount (1000000 ppm) of the intermediate polyorganosilsesquioxane. The amount of the used water of greater than 100000 ppm tends to make it difficult to control the number average molecular weight and the ratio (T3 form/T2 form) of the polyorganosilsesquioxane (A) to the predetermined ranges.

The method for adding the water in the hydrolysis and condensation reactions of the second step is not particularly limited, and a total amount (total used amount) of the water to be used may be added at once or may be added sequentially. When water is added sequentially, it may be added continuously or intermittently.

For the reaction conditions of the hydrolysis and condensation reactions of the second step, it is particularly important to select the reaction conditions to achieve the number average molecular weight of 2500 to 50000 and the above ratio (T3 form/T2 form) of 20 to 500 in the polyorganosilsesquioxane (A) according to an embodiment of the present invention. The reaction temperature of the hydrolysis and condensation reactions of the second step varies depending on the used catalyst and is not particularly limited but is preferably from 5 to 200° C. and more preferably from 30 to 100° C. By controlling the reaction temperature to the range described above, the above ratio (T3 form/T2 form) and the number average molecular weight tend to be more efficiently controlled to the predetermined ranges. In addition, the reaction time of the hydrolysis and condensation reactions of the second step is not particularly limited but is preferably from 0.5 to 1000 hours and more preferably from 1 to 500 hours.

Furthermore, the polyorganosilsesquioxane (A) according to an embodiment of the present invention having the predetermined ratio (T3 form/T2 form) and number average molecular weight can be obtained by performing the reaction while the above ratio (T3 form/T2 form) and the number average molecular weight are monitored by taking samples timely while the hydrolysis and condensation reactions are performed within the range of the reaction temperature described above.

The hydrolysis and condensation reactions of the second step can be performed under normal pressure or can be performed under increased pressure or reduced pressure. Here, an atmosphere for performing the hydrolysis and condensation reactions of the second step are not particularly limited. For example, it may be any of under an inert gas atmosphere, such as a nitrogen atmosphere or an argon atmosphere, or in the presence of oxygen, such as in the air. However, the hydrolysis and condensation reactions of the second step are preferably performed in an inert gas atmosphere.

The polyorganosilsesquioxane (A) according to an embodiment of the present invention can be obtained by the hydrolysis and condensation reactions of the second step. After completion of the hydrolysis and condensation reactions of the second step, the catalyst is preferably neutralized to suppress decomposition of an ionic polymerizable functional group, such as ring-opening of the epoxy group. The polyorganosilsesquioxane (A) according to an embodiment of the present invention may be separated and purified by a separation means, for example, such as water washing, acid washing, alkali washing, filtration, concentration, distillation, extraction, crystallization, recrystallization, and column chromatography, or a combined separation means thereof.

Since the polyorganosilsesquioxane (A) according to an embodiment of the present invention has the composition described above, the curable composition for adhesive agents containing the polyorganosilsesquioxane (A) as an essential component cures at a low temperature and can form a cured article having excellent heat resistance, crack resistance (or thermal shock resistance), and adhesive properties and tight bonding properties for adhereds.

In the curable composition for adhesive agents according to an embodiment of the present invention, one type of the polyorganosilsesquioxane (A) according to an embodiment of the present invention can be used alone, or two or more types of the polyorganosilsesquioxanes (A) can be used in combination.

The content (blended amount) of the polyorganosilsesquioxane (A) according to an embodiment of the present invention in the curable composition for adhesive agents according to an embodiment of the present invention is, but not particularly limited to, preferably 70 wt. % or greater but less than 100 wt. %, more preferably from 80 to 99.8 wt. %, and even more preferably from 90 to 99.5 wt. %, relative to a total amount (100 wt. %) of the curable composition for adhesive agents excluding the solvent. The content of the polyorganosilsesquioxane (A) according to an embodiment of the present invention of 70 wt. % or greater tends to further enhance heat resistance, crack resistance, and adhesive properties of the cured article. On the other hand, the content of less than 100 wt. % of the polyorganosilsesquioxane (A) according to an embodiment of the present invention can contain a curing catalyst. Because of this, curing of the curable composition for adhesive agents tends to be more efficiently proceeded.

The proportion of the polyorganosilsesquioxane (A) according to an embodiment of the present invention relative to the total amount (100 wt. %) of the polymerizable compounds contained in the curable composition for adhesive agents according to an embodiment of the present invention is not particularly limited but is preferably from 30 to 100 wt. %, more preferably from 35 to 98 wt. %, and even more preferably from 40 to 95 wt. %. The content of the polyorganosilsesquioxane (A) according to an embodiment of the present invention of 30 wt. % or greater tends to further enhance heat resistance of the cured article.

The proportion of the polyorganosilsesquioxane (A) according to an embodiment of the present invention relative to the total amount (100 wt. %) of the curable compound contained in the curable composition for adhesive agents according to an embodiment of the present invention is not particularly limited but is preferably from 30 to 100 wt. %, more preferably from 35 to 100 wt. %, and even more preferably from 40 to 100 wt. %. The content of the polyorganosilsesquioxane (A) according to an embodiment of the present invention of 30 wt. % or greater tends to further enhance heat resistance of the cured article.

Compound (B) Having Ionic Polymerizable Functional Group except Polyorganosilsesquioxane (A)

The curable composition for adhesive agents according to an embodiment of the present invention may also contain a compound (B) having an ionic polymerizable functional group except the polyorganosilsesquioxane (A) (hereinafter, also simply referred to as "polymerizable compound (B)") in addition to the polyorganosilsesquioxane (A) described above. By allowing the polymerizable compound (B) to be contained in the curable composition for adhesive agents according to an embodiment of the present invention, crack resistance of the cured article tends to be enhanced.

The "ionic polymerizable functional group" contained in the polymerizable compound (B) according to an embodiment of the present invention is not particularly limited as long as the ionic polymerizable functional group has polymerizability, and examples thereof include an epoxy ring, an oxetane ring, a vinyl ether group, a vinylphenyl group, and the like. From the perspective of enhancement of crack resistance of the cured article, an epoxy ring is more preferred.

The polymerizable compound (B) according to an embodiment of the present invention may contain one type of the ionic polymerizable functional groups or may contain a combination of two or more types of the ionic polymerizable functional groups.

The number of the ionic polymerizable functional group contained in a molecule of the polymerizable compound (B) according to an embodiment of the present invention is not particularly limited but is preferably from 1 to 50, more preferably from 1 to 30, and even more preferably from 2 to 20.

The polymerizable compound (B) according to an embodiment of the present invention may be a low molecular weight compound or may be a high molecular weight compound in which monomer components are polymerized.

The molecular weight of the polymerizable compound (B) according to an embodiment of the present invention (in the case of a high molecular weight compound, weight average molecular weight) is not particularly limited. From the perspective of enhancement of crack resistance of the cured article, the molecular weight is preferably from 200 to 500000 and more preferably from 300 to 100000.

The weight average molecular weight of the polymerizable compound (B) according to an embodiment of the present invention can be measured by the same method as for the polyorganosilsesquioxane (A) described above.

The equivalent of the ionic polymerizable functional group of the polymerizable compound (B) according to an embodiment of the present invention is not particularly limited. From the perspective of enhancement of crack resistance of the cured article, the equivalent is preferably from 100 to 100000 and more preferably from 150 to 50000.

The equivalent of the ionic polymerizable functional group of the polymerizable compound (B) according to an embodiment of the present invention means a molecular weight of a compound relative to one functional group (in the case of a high molecular weight compound, weight average molecular weight) and can be measured by a well known method. For example, in the case where the ionic polymerizable functional group is an epoxy ring, measurement can be performed by a method in accordance with JIS K 7236:2001 (Determination of epoxy equivalent in epoxy resins).

As the polymerizable compound (B) having an epoxy ring, a well known or commonly used compound having one or more epoxy groups (oxirane rings) in a molecule except the polyorganosilsesquioxane (A) can be used without particular limitation. Examples thereof include alicyclic epoxy compounds (alicyclic epoxy resins), aromatic epoxy compounds (aromatic epoxy resins), aliphatic epoxy compounds (aliphatic epoxy resins), and the like.

The alicyclic epoxy compound include well known or commonly used compounds including one or more alicyclic rings and one or more epoxy groups in the molecule and is not particularly limited. Examples thereof include (1) a compound including an epoxy group (referred to as an "alicyclic epoxy group") composed of two adjacent carbon atoms and an oxygen atom that constitute an alicyclic ring in the molecule; (2) a compound in which an epoxy group is directly bonded to an alicyclic ring with a single bond; and (3) a compound including an alicyclic ring and a glycidyl ether group in the molecule (a glycidyl ether type epoxy compound).

Examples of the compound (1) including an alicyclic epoxy group in the molecule include a compound represented by Formula (i) below.

[Chemical Formula 33]

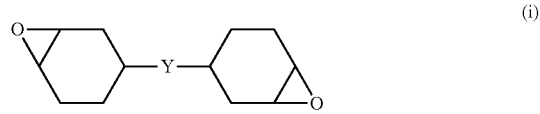

(i)

In Formula (i) above, Y represents a single bond or a linking group (a divalent group having one or more atoms). Examples of the linking group include divalent hydrocarbon groups, alkenylene groups in which some or all of the carbon-carbon double bonds are epoxidized, carbonyl groups, ether bonds, ester bonds, carbonate groups, amide groups, and groups in which a plurality thereof are linked.

Examples of the divalent hydrocarbon group include linear or branched alkylene groups having from 1 to 18 carbons and divalent alicyclic hydrocarbon groups. Examples of the linear or branched alkylene group having from 1 to 18 carbons include a methylene group, a methyl methylene group, a dimethyl methylene group, an ethylene group, a propylene group, and a trimethylene group. Examples of the divalent alicyclic hydrocarbon group include a divalent cycloalkylene group (including a cycloalkylidene group), such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group.

Examples of the alkenylene group in the alkenylene group in which some or all of the carbon-carbon double bonds are epoxidized (which may be referred to as an "epoxidized alkenylene group") include a linear or branched alkenylene group having from 2 to 8 carbons, such as a vinylene group, a propenylene group, a 1-butenylene group, a 2-butenylene group, a butadienylene group, a pentenylene group, a hexenylene group, a heptenylene group, and an octenylene group. In particular, the epoxidized alkenylene group is preferably an alkenylene group in which all of the carbon-carbon double bonds are epoxidized and more preferably an alkenylene group having from 2 to 4 carbons in which all of the carbon-carbon double bonds are epoxidized.

Representative examples of the alicyclic epoxy compound represented by Formula (i) above include (3,4,3',4'-diepoxy)bicyclohexyl, compounds represented by Formulas (i-1) to (i-10) below, and the like. In Formulae (i-5) and (i-7) below, 1 and m each represent an integer from 1 to 30. R' in Formula (i-5) below is an alkylene group having from 1 to 8 carbons, and among these, a linear or branched alkylene group having from 1 to 3 carbons, such as a methylene group, an ethylene group, a propylene group, or an isopropylene group, is preferred. In Formulae (i-9) and (i-10) below, n1 to n6 each represent an integer from 1 to 30. In addition, examples of the alicyclic epoxy compound represented by Formula (i) above include 2,2-bis(3,4-epoxycyclohexyl)propane, 1,2-bis(3,4-epoxycyclohexyl)ethane, 2,3-bis(3,4-epoxycyclohexyl)oxirane, and bis(3,4-epoxycyclohexylmethyl)ether.

[Chemical Formula 34]

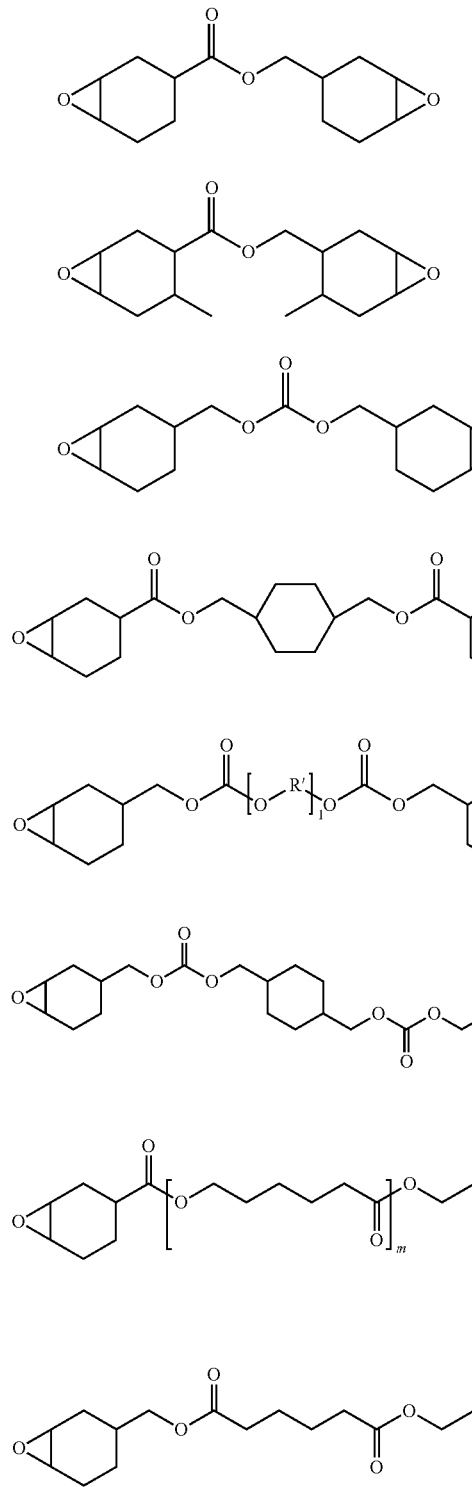

[Chemical Formula 35]

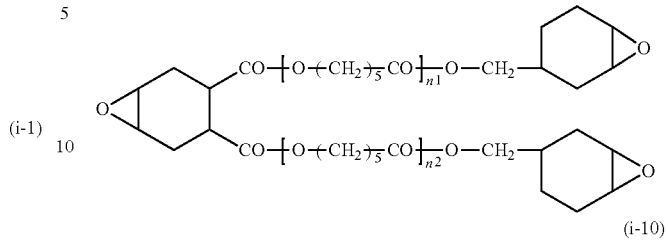

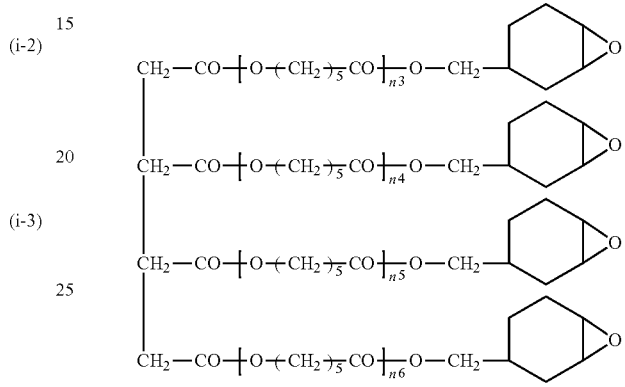

Examples of the compound (2) described above in which an epoxy group is directly bonded to an alicyclic ring with a single bond include a compound represented by Formula (ii) below.

[Chemical Formula 36]

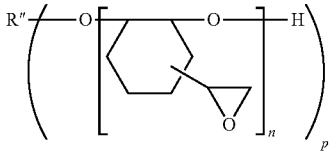

In Formula (ii), R" is a group resulting from elimination of p hydroxyl groups (—OH) from a structural formula of a p-hydric alcohol (p-valent organic group), where p and n each represent a natural number. Examples of the p-hydric alcohol [R"(OH)$_p$] include polyhydric alcohols (alcohols having from 1 to 15 carbons and the like), such as 2,2-bis(hydroxymethyl)-1-butanol. Here, p is preferably from 1 to 6, and n is preferably from 1 to 30. When p is 2 or greater, n in each group in parentheses (in the outer parentheses) may be the same or different. Examples of the compound represented by Formula (ii) specifically include 1,2-epoxy-4-(2-oxiranyl)cyclohexane adduct of 2,2-bis(hydroxymethyl)-1-butanol (for example, such as the trade name "EHPE3150" (available from Daicel Corporation)).

Examples of the compound (3) described above including an alicyclic ring and a glycidyl ether group in the molecule include glycidyl ethers of alicyclic alcohols (in particular, alicyclic polyhydric alcohols). More particularly, examples thereof include a compound obtained by hydrogenating a bisphenol A type epoxy compound (a hydrogenated bisphenol A type epoxy compound), such as 2,2-bis[4-(2,3-epoxypropoxy)cyclohexyl]propane and 2,2-bis[3,5-dimethyl-4-(2,3-epoxypropoxy)cyclohexyl]propane; a compound obtained by hydrogenating a bisphenol F type epoxy compound (a hydrogenated bisphenol F type epoxy compound), such as bis[o,o-(2,3-epoxypropoxy)cyclohexyl]methane, bis[o,p-(2,3-epoxypropoxy)cyclohexyl]methane, bis[p,p-(2,3-epoxypropoxy)cyclohexyl]methane, and bis[3,5-dimethyl-4-(2,3-epoxypropoxy)cyclohexyl]methane; a hydrogenated bisphenol type epoxy compound; a hydrogenated phenol novolac type epoxy compound; a hydrogenated cresol novolac type epoxy compound; a hydrogenated cresol novolac type epoxy compound of bisphenol A; a hydrogenated naphthalene type epoxy compound; a hydrogenated epoxy compound of an epoxy compound obtained from trisphenolmethane; and a hydrogenated epoxy compound of an aromatic epoxy compound described below.

Examples of the aromatic epoxy compound include an epi-bis type glycidyl ether type epoxy resin obtained by a condensation reaction of bisphenols (for example, bisphenol A, bisphenol F, bisphenol S, fluorenebisphenol, and the like) and an epihalohydrin; a high molecular weight epi-bis type glycidyl ether type epoxy resin obtained by further subjecting the above epi-bis type glycidyl ether type epoxy resin to an addition reaction with the bisphenol described above; a novolac alkyl type glycidyl ether type epoxy resin obtained by subjecting a phenol (for example, phenol, $C_{1-9}$ alkylphenols, xylenol, resorcin, catechol, bisphenol A, bisphenol F, bisphenol S, and the like) and an aldehyde (for example, formaldehyde, acetaldehyde, benzaldehyde, hydroxybenzaldehyde, salicylaldehyde, and the like) to a condensation reaction to obtain a polyhydric alcohol and then further subjecting the polyhydric alcohol to condensation reaction with epihalohydrin; and an epoxy compound in which two phenol skeletons are bonded at the 9-position of the fluorene ring and in which glycidyl groups are each bonded directly or via an alkyleneoxy group to an oxygen atom resulting from eliminating a hydrogen atom from a hydroxy group of these phenol skeletons.

Examples of the aliphatic epoxy compound include glycidyl ethers of a q-hydric alcohol, the alcohol including no cyclic structure (q is a natural number); glycidyl esters of monovalent or polyvalent carboxylic acids (for example, acetic acid, propionic acid, butyric acid, stearic acid, adipic acid, sebacic acid, maleic acid, itaconic acid, and the like); epoxidized materials of oils and fats having a double bond, such as epoxidized linseed oil, epoxidized soybean oil, and epoxidized castor oil; epoxidized materials of polyolefins (including polyalkadienes), such as epoxidized polybutadiene; and the like. Here, examples of the q-hydric alcohol having no cyclic structure include monohydric alcohols, such as methanol, ethanol, 1-propyl alcohol, isopropyl alcohol, and 1-butanol; dihydric alcohols, such as ethylene glycol, 1,2-propanediol, 1,3-propanediol, 1,4-butanediol, neopentyl glycol, 1,6-hexanediol, diethylene glycol, triethylene glycol, tetraethylene glycol, dipropylene glycol, polyethylene glycol, and polypropylene glycol; trihydric or higher polyhydric alcohols, such as glycerin, diglycerin, erythritol, trimethylolethane, trimethylolpropane, pentaerythritol, dipentaerythritol, and sorbitol; and the like. In addition, the q-hydric alcohol may be polyether polyols, polyester polyols, polycarbonate polyols, polyolefin polyols, or the like.

Examples of the polymerizable compound (B) having an oxetane ring includes well known or commonly used compounds having one or more oxetane rings in the molecule and is not particularly limited. Examples thereof include 3,3-bis(vinyloxymethyl)oxetane, 3-ethyl-3-(hydroxymethyl)oxetane, 3-ethyl-3-(2-ethylhexyloxymethyl)oxetane, 3-ethyl-3-[(phenoxy)methyl]oxetane, 3-ethyl-3-(hexyloxymethyl)oxetane, 3-ethyl-3-(chloromethyl)oxetane, 3,3-bis(chloromethyl)oxetane, 1,4-bis[(3-ethyl-3-oxetanylmethoxy)methyl]benzene, bis{[1-ethyl(3-oxetanyl)]methyl}ether, 4,4'-bis[(3-ethyl-3-oxetanyl)methoxymethyl]bicyclohexyl, 1,4-bis[(3-ethyl-3-oxetanyl)methoxymethyl]cyclohexane, 1,4-bis{[(3-ethyl-3-oxetanyl)methoxy]methyl}benzene, 3-ethyl-3-{[(3-ethyloxetan-3-yl)methoxy]methyl)}oxetane, xylylenebisoxetane, 3-ethyl-3-{[3-(triethoxysilyl)propoxy]methyl}oxetane, oxetanylsilsesquioxane, phenol novolac oxetane, and the like.

The polymerizable compound (B) having an vinyl ether group is not particularly limited, and a well known or commonly used compound including one or more vinyl ether groups in the molecule can be used. Examples thereof include 2-hydroxyethyl vinyl ether (ethyleneglycol monovinyl ether), 3-hydroxypropyl vinyl ether, 2-hydroxypropyl vinyl ether, 2-hydroxyisopropyl vinyl ether, 4-hydroxybutyl vinyl ether, 3-hydroxybutyl vinyl ether, 2-hydroxybutyl vinyl ether, 3-hydroxyisobutyl vinyl ether, 2-hydroxyisobutyl vinyl ether, 1-methyl-3-hydroxypropyl vinyl ether, 1-methyl-2-hydroxypropyl vinyl ether, 1-hydroxymethylpropyl vinyl ether, 4-hydroxycyclohexyl vinyl ether, 1,6-hexanediol monovinyl ether, 1,6-hexanediol divinyl ether, 1,8-octanediol divinyl ether, 1,4-cyclohexanedimethanol monovinyl ether, 1,4-cyclohexanedimethanol divinyl ether, 1,3-cyclohexanedimethanol monovinyl ether, 1,3-cyclohexanedimethanol divinyl ether, 1,2-cyclohexanedimethanol monovinyl ether, 1,2-cyclohexanedimethanol divinyl ether, p-xylene glycol monovinyl ether, p-xylene glycol divinyl ether, m-xylene glycol monovinyl ether, m-xylene glycol divinyl ether, o-xylene glycol monovinyl ether, o-xylene glycol divinyl ether, ethylene glycol divinyl ether, diethylene glycol monovinyl ether, diethylene glycol divinyl ether, triethylene glycol monovinyl ether, triethylene glycol divinyl ether, tetraethylene glycol monovinyl ether, tetraethylene glycol divinyl ether, pentaethylene glycol monovinyl ether, pentaethylene glycol divinyl ether, oligoethylene glycol monovinyl ether, oligoethylene glycol divinyl ether, polyethylene glycol monovinyl ether, polyethylene glycol divinyl ether, dipropylene glycol monovinyl ether, dipropylene glycol divinyl ether, tripropylene glycol monovinyl ether, tripropylene glycol divinyl ether, tetrapropylene glycol monovinyl ether, tetrapropylene glycol divinyl ether, pentapropylene glycol monovinyl ether, pentapropylene glycol divinyl ether, oligopropyleneglycol monovinyl ether, oligopropyleneglycol divinyl ether, polypropyleneglycol monovinyl ether, polypropyleneglycol divinyl ether, isosorbide divinyl ether, oxanorbornene divinyl ether, phenyl vinyl ether, n-butyl vinyl ether, isobutyl vinyl ether, octyl vinyl ether, cyclohexyl vinyl ether, hydroquinone divinyl ether, 1,4-butanediol divinyl ether, cyclohexanedimethanol divinyl ether, trimethylolpropane divinyl ether, trimethylolpropane trivinyl ether, bisphenol A divinyl ether, bisphenol F divinyl ether, hydroxyoxanorbornanemethanol divinyl ether, 1,4-cyclohexanediol divinyl ether, pentaerythritol trivinyl ether, pentaerythritol tetravinyl ether, dipentaerythritol pentavinyl ether, dipentaerythritol hexavinyl ether, and the like.

Furthermore, in particular, use of a vinyl ether compound having one or more hydroxy groups in a molecule as the polymerizable compound (B) having a vinyl ether group has an advantage of obtaining a cured article having excellent heat yellowing resistance (characteristic by which yellowing due to heating is less likely to occur). Therefore, a cured article having even higher quality and durability can be obtained. The number of the hydroxy group contained in a molecule of the vinyl ether compound having one or more hydroxy groups in a molecule is, but not particularly limited to, preferably from 1 to 4 and more preferably 1 or 2.

As the polymerizable compound (B) having a vinylphenyl group, well known or commonly used compounds having one or more vinylphenyl groups in a molecule can be used without particular limitation. Examples thereof include styrene, divinylbenzene, methoxystyrene, ethoxystyrene, hydroxystyrene, vinylnaphthalene, vinylanthracene, 4-vinylphenyl acetate, (4-vinylphenyl)dihydroxyborane, (4-vinylphenyl)boranic acid, (4-vinylphenyl)boronic acid, 4-ethenylphenylboronic acid, 4-vinylphenylboranic acid, 4-vinylphenylboronic acid, p-vinylphenylboric acid, p-vinylphenylboronic acid, N-(4-vinylphenyl)maleinimide, N-(p-vinylphenyl)maleimide, N-(p-vinylphenyl)maleinimide, and the like.

In the case where the curable composition for adhesive agents according to an embodiment of the present invention contains the polymerizable compound (B), a compound having an epoxy ring as the polymerizable compound (B) is preferably used together with the polyorganosilsesquioxane (A) according to an embodiment of the present invention. An alicyclic epoxy compound or an aromatic epoxy compound is more preferred; a compound in which an epoxy group is directly bonded to an alicyclic ring through a single bond, an epi-bis type glycidyl ether type epoxy resin, or a novolac alkyl type glycidyl ether type epoxy resin is more preferred; or a compound represented by Formula (ii) above, a bisphenol A-type epoxy resin, a bisphenol F-type epoxy resin, or a glycidyl etherified modified product of a phenol-formaldehyde polycondensation product or $C_{1-9}$ alkylphenol-formaldehyde polycondensation product modified by 2-methylepichlorohydrin or epichlorohydrin is particularly preferred. As a result, even higher crack resistance of the cured article tends to be achieved.

In the curable composition for adhesive agents according to an embodiment of the present invention, one type of the polymerizable compound (B) can be used alone, or two or more types of the polymerizable compounds (B) can be used in combination. Furthermore, the polymerizable compound (B) can be produced by a well known or commonly used method, and for example, a commercially available product, such as trade names "EHPE3150" and "CELLOXIDE 2021P" (available from Daicel Corporation), trade names "jER4004P", "jER4005P", "jER4007P", and "jER4010P" (available from Mitsubishi Chemical Corporation), trade name "RE-303S-L" (available from Nippon Kayaku Co., Ltd.), and the like can be also used.

In the case where the curable composition for adhesive agents according to an embodiment of the present invention contains the polymerizable compound (B), the content (blended amount) is, but not particularly limited to, preferably from 15 to 65 wt. %, more preferably from 20 to 60 wt. %, and even more preferably from 30 to 55 wt. %, relative to the total amount (100 wt. %; the total amount of the curable compound) of the polyorganosilsesquioxane (A) and the polymerizable compound (B) according to an embodiment of the present invention. The content of 65 wt. % or less (especially, 55 wt. % or less) of the polymerizable compound (B) tends to further enhance desired performances for the curable composition for adhesive agents and the cured article (for example, rapid curability and viscosity adjustment for the curable composition for adhesive agents, and the like) or heat resistance of the cured article. On the other hand, the content of 15 wt. % or greater of the polymerizable compound (B) may be able to impart crack resistance.

The content (blended amount) of the polymerizable compound (B) having an epoxy ring in the curable composition for adhesive agents according to an embodiment of the present invention is, but not particularly limited to, preferably from 10 to 70 wt. %, more preferably from 15 to 65 wt. %, and even more preferably from 25 to 60 wt. %, relative to the total amount (100 wt. %; the total amount of the polymerizable compound) of the polyorganosilsesquioxane (A) and the polymerizable compound (B) according to an embodiment of the present invention. Controlling of the content of the polymerizable compound (B) having an epoxy ring to the range described above tends to provide a cured article having a significantly high crack resistance. In particular, controlling of the content of the alicyclic epoxy compound to the range described above tends to further enhance heat resistance in addition to achieving a significantly high crack resistance of the cured article.

Polymerization Stabilizer (C)

The curable composition for adhesive agents according to an embodiment of the present invention may further contain a polymerization stabilizer (C). The polymerization stabilizer (C) is a compound that suppresses progression of cationic polymerization by trapping cations and that has an effect of allowing progression of the polymerization at the point where the cation trapping capability of the polymerization stabilizer is saturated and deactivated. By allowing the curable composition for adhesive agents according to an embodiment of the present invention to contain the polymerization stabilizer (C), after an adhesive layer is formed by coating and drying, the progression of the polymerization can be suppressed for a long period of time, and an adhesive layer exhibiting excellent adhesive properties by being heated at the time where adhesivity is required and having excellent storage stability can be formed.

Examples of the polymerization stabilizer (C) include bis(2,2,6,6-tetramethyl-4-piperidyl)sebacate, poly([6-(1,1,3,3-tetramethylbutyl)imino-1,3,5-triazine-2,4-diyl] [(2,2,6,6-tetramethyl-4-piperidyl)imino]hexamethylene [(2,2,6,6-tetramethyl-4-piperidyl)imino]), tetrakis(2,2,6,6-tetramethyl-4-piperidyl)butane-1,2,3,4-tetracarboxylate, 2,2,6,6-tetramethyl-4-piperidinyl benzoate, (mixed 2,2,6,6-tetramethyl-4-piperidyl/tridecyl)-1,2,3,4-butane tetracarboxylate, 3,9-bis(2,3-di-t-butyl-4-methylphenoxy)-2,4,8,10-tetraoxa-3,9-diphosphaspiro[5.5]undecane, mixed (2,2,6,6-tetramethyl-4-piperidyl/β,β,β',β'-tetramethyl-3-9-[2,4,8,10-tetraoxaspiro[5.5]undecane]diethyl)-1,2,3,4-butanetetracarboxylate, poly([6-N-morpholyl-1,3,5-triazine-2,4-diyl] [(2,2,6,6-tetramethyl-4-piperidyl)imino] hexamethylene [(2,2,6,6-tetramethyl-4-piperidyl)imino]), [N-(2,2,6,6-tetramethyl-4-piperidyl)-2-methyl-2-(2,2,6,6-tetramethyl-4-piperidyl)imino]propionamide, hindered amine-based compounds, such as trade names "LA-77", "LA-67", and "LA-57" (available from Adeka Corporation), trade names "TINUVIN 123" and "TINUVIN 152" (available from Ciba Japan); sulfonium sulfate-based compounds, such as (4-hydroxyphenyl)dimethylsulfonium methylsulfite (for example, trade name "San-Aid SI aid", available from Sanshin Chemical Industry Co., Ltd.); phosphite-based compounds, such as trade name "ADK STAB PEP-36" (available from Adeka Corporation); and the like. Among these, from the perspectives of preventing partial curing of the adhesive agent during drying and of achieving superior adhesive properties for adhereds of the cured article, a sulfonium sulfate-based compound or a phosphite-based compound is preferred.

One type of the polymerization stabilizer (C) may be used alone, or two or more types of the polymerization stabilizers (C) may be used in combination. In the curable composition for adhesive agents according to an embodiment of the present invention, among these, two or more types of the polymerization stabilizers (C) are preferably contained. This tends to achieve significantly excellent storage stability of the curable composition for adhesive agents, further prevent partial curing of the adhesive agent during drying, and achieve superior adhesive properties for adhereds of the cured article. As the two or more types of the polymerization stabilizers (C), at least a sulfonium sulfate-based compound and/or a phosphite-based compound is preferably contained.

In the case where the curable composition for adhesive agents according to an embodiment of the present invention contains the polymerization stabilizer (C), the content (blended amount) is, but not particularly limited to, preferably 0.005 parts by weight or greater, more preferably from 0.01 to 10 parts by weight, and even more preferably from 0.02 to 1 part by weight, per 100 parts by weight of the polyorganosilsesquioxane (A) according to an embodiment of the present invention (in the case where the polymerizable compound (B) is contained, the total amount of the polyorganosilsesquioxane (A) and the polymerizable compound (B)). The content of 0.005 parts by weight or greater tends to prevent partial curing of the adhesive agent during drying and achieve superior adhesive properties for adhereds of the cured article. In particular, in the case where two or more types of the polymerization stabilizers (C) are used, the total amount of the polymerization stabilizers (C) is preferably from 0.1 to 10 parts by weight and more preferably from 0.2 to 1 part by weight, per 100 parts by weight of the polyorganosilsesquioxane according to an embodiment of the present invention (in the case where the polymerizable compound (B) is contained, the total amount of the polyorganosilsesquioxane (A) and the polymerizable compound (B)).

In the case where the polymerization stabilizer (C) and the polymerization initiator described below are contained in the curable composition for adhesive agents according to an embodiment of the present invention, the content (blended amount) of the polymerization stabilizer (C) is not particularly limited but is preferably 1 part by weight or greater, more preferably from 3 to 200 parts by weight, and particularly preferably from 5 to 150 parts by weight, per 100 parts by weight of the polymerization initiator. The content of 1 part by weight or greater tends to prevent partial curing of the adhesive agent during drying and achieve superior adhesive properties for adhereds of the cured article. In particular, in the case where two or more types of the polymerization stabilizers (C) are used, the total amount of the polymerization stabilizers (C) is preferably from 100 to 200 parts by weight and more preferably from 110 to 150 parts by weight, per 100 parts by weight of the polymerization initiator.

Silane Coupling Agent (D)

The curable composition for adhesive agents according to an embodiment of the present invention may further contain a silane coupling agent (D). By allowing the silane coupling agent (D) to be contained, superior characteristics, such as tight bonding properties, weather resistance, and heat resistance, can be imparted to the resulting cured article.

Examples of the silane coupling agent (D) include (meth)acryloyloxy group-containing silane coupling agents, such as 3-trimethoxysilylpropyl(meth)acrylate, 3-triethoxysilylpropyl(meth)acrylate, 3-dimethoxymethylsilylpropyl(meth)acrylate, and 3-diethoxymethylsilylpropyl(meth)acrylate; epoxy group-containing silane coupling agents, such as 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, and 3-glycidoxypropyltriethoxysilane; compounds represented by Formula (X) below (hereinafter, also referred to as "silane coupling agent (D1)"); and the like.

[Chemical Formula 37]

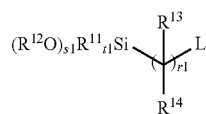

(X)

One type of the silane coupling agent (D) can be used alone, or two or more types of the silane coupling agents (D) can be used in combination. In the case where a silane coupling agent (D) in which the functional group is a (meth)acryloyloxy group is used, a little amount of a radical polymerization initiator may be added.

As the silane coupling agent (D), an epoxy group-containing silane coupling agent or a silane coupling agent (D1) is preferred from the perspectives of heat resistance, crack resistance, adhesive properties and tight bonding properties for adhereds of an adhesive sheet and a cured article, and a silane coupling agent (D1) is particularly preferred from the perspective of crack resistance.

In the silane coupling agent (D1), in Formula (X), r1 represents an integer of 4 to 20, preferably an integer of 5 to 15, and more preferably an integer of 6 to 12. Since r1 is 4 or greater, the cured article formed from the curable composition for adhesive agents according to an embodiment of the present invention containing the silane coupling agent (D1); and the adhesive sheet according to an embodiment of the present invention have excellent crack resistance, and adhesive properties and tight bonding properties for adhereds.

In the silane coupling agent (D1), in Formula (X), $R^{11}$ and $R^{12}$ each represent a hydrocarbon group that may have a substituent. Examples of the hydrocarbon group that may have a substituent include substituted or unsubstituted monovalent hydrocarbon groups, such as alkyl groups (for example, a methyl group, an ethyl group, a propyl group, a butyl group, a pentyl group, a hexyl group, and the like); cycloalkyl groups (for example, a cyclopropyl group, a cyclobutyl group, a cyclopentyl group, a cyclohexyl group, a cyclododecyl group, and the like); alkenyl groups (for example, a vinyl group, an allyl group, a butenyl group, a pentenyl group, a hexenyl group, and the like); aryl groups (for example, a phenyl group, a tolyl group, a xylyl group, a naphthyl group, and the like); cycloalkyl-alkyl groups (for example, a cyclohexylmethyl group, a methylcyclohexyl group, and the like); aralkyl groups (for example, a benzyl group, a phenethyl group, and the like); and halogenated hydrocarbon groups, in which one or more hydrogen atoms in the hydrocarbon group is replaced with halogen atom(s) (for example, halogenated alkyl groups, such as a chloromethyl group, a 3-chloropropyl group, a 3,3,3-trifluoropropyl group, and the like), and the like. Furthermore, examples of the substituent in the hydrocarbon group that may have a substituent include halogen atoms, a hydroxy group, a carboxy group, and the like. Examples of the substituent also include groups in which two or more of substituted or unsubstituted monovalent hydrocarbon groups are bonded through a linking group, such as an ether bond (—O—), a thioether bond (—S—), an ester bond (—CO—O—), an amide bond (—CO—NH—), and a carbonyl group (—CO—).

Among these, as the hydrocarbon group that may have a substituent, a linear or branched alkyl group having from 1 to 10 carbons (linear or branched $C_{1-10}$ alkyl group) is preferred. Examples of the linear or branched $C_{1-10}$ alkyl group include a methyl group, an ethyl group, a propyl group, an isopropyl group, a butyl group, an isobutyl group, an s-butyl group, a t-butyl group, a pentyl group, a hexyl group, a heptyl group, an octyl group, an ethylhexyl group, and the like. Among these alkyl groups, linear or branched $C_{1-4}$ alkyl groups, such as a methyl group, an ethyl group, a propyl group, an isopropyl group, a butyl group, an isobutyl group, an s-butyl group, and a t-butyl group, are preferred. That is, among these, $R^{11}$ is preferably a linear or branched $C_{1-10}$ alkyl group (especially, a linear or branched $C_{1-4}$ alkyl group). Furthermore, among these, $R^{12}$ is preferably a linear or branched $C_{1-10}$ alkyl group (especially, a linear or branched $C_{1-4}$ alkyl group).

In the silane coupling agent (D1), in Formula (X), L represents a group containing at least one group selected from the group consisting of an epoxy group, an oxetanyl group, and a vinyl ether group. Among these, the epoxy group-containing group is preferably an epoxy group, a glycidyl ether group, a 3,4-epoxycyclohexyl group, or a 3,4-epoxy-3-methylcyclohexyl group and more preferably a glycidyl ether group or a 3,4-epoxycyclohexyl group. Examples of the oxetanyl group-containing group include a (3-ethyl-3-oxetanyl)methyloxy group, a (3-ethyl-3-oxetanyl)oxy group, and the like. Examples of the vinyl ether group-containing group include a vinyl ether group and the like.

In the silane coupling agent (D1), in Formula (X), s1 represents an integer of 1 to 3, and t1 represents an integer of 0 to 2. Note that s1+t1 is 3.

In the silane coupling agent (D1), in Formula (X), $R^{13}$ and $R^{14}$ each represent a hydrogen atom or a hydrocarbon group that may have a substituent. Examples of the hydrocarbon group that may have a substituent include those exemplified and described for $R^{11}$ and $R^{12}$ in Formula (X) described above. Among these, $R^{13}$ is preferably a hydrogen atom or a linear or branched $C_{1-10}$ (especially, $C_{1-4}$) alkyl group and more preferably a hydrogen atom. Furthermore, among these, $R^{14}$ is preferably a hydrogen atom or a linear or branched $C_{1-10}$ (especially, $C_{1-4}$) alkyl group and more preferably a hydrogen atom. Note that r1 groups of $R^{13}$s and $R^{14}$s may be the same or different.

As the silane coupling agent (D1), among these, at least one type of epoxy group-containing silane compound selected from the group consisting of compounds represented by Formula (X1) below and compounds represented by Formula (X2) below.

[Chemical Formula 38]

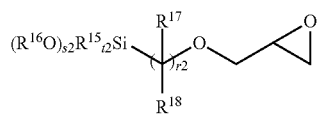

(X1)

[Chemical Formula 39]

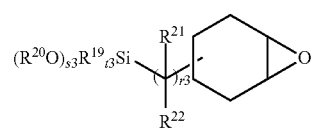

(X2)

In Formula (X1), r2 represents an integer from 4 to 20, preferably an integer from 5 to 15, and more preferably an integer from 6 to 12. Since r2 is 4 or greater, the cured article formed from the curable composition for adhesive agents according to an embodiment of the present invention containing the silane coupling agent (D1); and the adhesive sheet according to an embodiment of the present invention have excellent crack resistance, and adhesive properties and tight bonding properties for adhereds.

In Formula (X1), $R^{15}$ and $R^{16}$ each represent a hydrocarbon group that may have a substituent. Examples of the hydrocarbon group that may have a substituent include those exemplified and described for $R^{11}$ and $R^{12}$ in Formula (X) described above. Among these, $R^{15}$ is preferably a linear or branched $C_{1-10}$ alkyl group (especially, a linear or branched $C_{1-4}$ alkyl group). Furthermore, among these, $R^{16}$ is preferably a linear or branched $C_{1-10}$ alkyl group (especially, a linear or branched $C_{1-4}$ alkyl group).

In Formula (X1), s2 represents an integer from 1 to 3, and t2 represents an integer from 0 to 2. Note that s2+t2 is 3.

In Formula (X1), $R^{17}$ and $R^{18}$ each represent a hydrogen atom or a hydrocarbon group that may have a substituent. Examples of the hydrocarbon group that may have a substituent include those exemplified and described for $R^{13}$ and $R^{14}$ in Formula (X) described above. Among these, $R^{17}$ is preferably a hydrogen atom or a linear or branched $C_{1-10}$ (especially, $C_{1-4}$) alkyl group and more preferably a hydrogen atom. Furthermore, among these, $R^{18}$ is preferably a hydrogen atom or a linear or branched $C_{1-10}$ (especially, $C_{1-4}$) alkyl group and more preferably a hydrogen atom. Note that r2 groups of $R^{17}$s and $R^{18}$s may be the same or different.

Examples of the compound represented by Formula (X1) include 6-glycidoxyhexyltrimethoxysilane, 6-glycidoxyhexylmethyldimethoxysilane, 6-glycidoxyhexyltriethoxysilane, 6-glycidoxyhexylmethyldiethoxysilane, 8-glycidoxyoctyltrimethoxysilane, 8-glycidoxyoctylmethyldimethoxysilane, 8-glycidoxyoctyltriethoxysilane, 8-glycidoxyoctylmethyldiethoxysilane, and the like.

In Formula (X2), r3 represents an integer from 4 to 20, preferably an integer from 5 to 15, and more preferably an integer from 6 to 12. Since r3 is 4 or greater, the cured article formed from the curable composition for adhesive agents according to an embodiment of the present invention containing the silane coupling agent (D1); and the adhesive sheet according to an embodiment of the present invention have excellent crack resistance, and adhesive properties and tight bonding properties for adhereds.

In Formula (X2), $R^{19}$ and $R^{20}$ each represent a hydrocarbon group that may have a substituent. Examples of the hydrocarbon group that may have a substituent include those exemplified and described for $R^{11}$ and $R^{12}$ in Formula (X) described above. Among these, $R^{19}$ is preferably a linear or branched $C_{1-10}$ alkyl group (especially, a linear or branched $C_{1-4}$ alkyl group). Furthermore, among these, $R^{20}$ is preferably a linear or branched $C_{1-10}$ alkyl group (especially, a linear or branched $C_{1-4}$ alkyl group).

In Formula (X2), s3 represents an integer from 1 to 3, and t3 represents an integer from 0 to 2. Note that s3+t3 is 3.

In Formula (X2), $R^{21}$ and $R^{22}$ each represent a hydrogen atom or a hydrocarbon group that may have a substituent. Examples of the hydrocarbon group that may have a substituent include those exemplified and described for $R^{13}$ and $R^{14}$ in Formula (X) described above. Among these, $R^{21}$ is preferably a hydrogen atom or a linear or branched $C_{1-10}$ (especially, $C_{1-4}$) alkyl group and more preferably a hydrogen atom. Furthermore, among these, $R^{22}$ is preferably a hydrogen atom or a linear or branched $C_{1-10}$ (especially, $C_{1-4}$) alkyl group and more preferably a hydrogen atom. Note that r3 groups of $R^{21}$s and $R^{22}$s may be the same or different.

Examples of the compound represented by Formula (X2) include 6-(3,4-epoxycyclohexyl)hexyltrimethoxysilane, 6-(3,4-epoxycyclohexyl)hexylmethyldimethoxysilane, 6-(3,4-epoxycyclohexyl)hexyltriethoxysilane, 6-(3,4-epoxycyclohexyl)hexylmethyldiethoxysilane, 8-(3,4-epoxycyclohexyl)octyltrimethoxysilane, 8-(3,4-epoxycyclohexyl)octylmethyldimethoxysilane, 8-(3,4-epoxycyclohexyl)octyltriethoxysilane, 8-(3,4-epoxycyclohexyl)octylmethyldiethoxysilane, and the like.

As the silane coupling agent (D) in an embodiment of the present invention, for example, commercially available products, such as trade name "KBE-403" (3-glycidoxypropyltriethoxysilane, available from Shin-Etsu Chemical Co., Ltd.), trade name "KBM-403" (3-glycidoxypropyltrimethoxysilane, available from Shin-Etsu Chemical Co., Ltd.), trade name "KBM-303" (2-(3,4-epoxycyclohexyl)ethyltrimethoxysilane, available from Shin-Etsu Chemical Co., Ltd.), trade name "KBM-4803" (8-glycidoxyoctyltrimethoxysilane, available from Shin-Etsu Chemical Co., Ltd.), trade name "Z-6040" (3-glycidoxypropyltrimethoxysilane, available from Dow Corning Toray Co., Ltd.), can be used.

In the case where the curable composition for adhesive agents according to an embodiment of the present invention contains the silane coupling agent (D), the used amount thereof is, for example, approximately from 0 to 10 parts by weight per 100 parts by weight of the polymerizable compound contained in the curable composition for adhesive agents according to an embodiment of the present invention (in the case where the polyorganosilsesquioxane (A) or the polymerizable compound (B) is contained, the total amount of the polyorganosilsesquioxane (A) and the polymerizable compound (B)). The upper limit thereof is preferably 9 parts by weight, particularly preferably 7 parts by weight, and most preferably 6 parts by weight. The lower limit is preferably 0.005 parts by weight and particularly preferably 0.01 parts by weight.

In the case where the curable composition for adhesive agents according to an embodiment of the present invention contains the silane coupling agent (D1), the content (blended amount) thereof is, but not particularly limited to, preferably from 0.01 to 10 parts by weight, more preferably from 0.1 to 7 parts by weight, and even more preferably from 0.5 to 6 parts by weight, per 100 parts by weight of the polyorganosilsesquioxane (A) according to an embodiment of the present invention (in the case where the polymerizable compound (B) is contained, the total amount of the polyorganosilsesquioxane (A) and the polymerizable compound (B)). The content of 0.01 parts by weight or greater tends to achieve superior crack resistance of the cured article and adhesive properties and tight bonding properties for adhereds. The content of 10 parts by weight or less tends to achieve superior adhesive properties and tight bonding properties for adhereds of the cured article.

Polymerization Initiator

The curable composition for adhesive agents according to an embodiment of the present invention preferably further contains a polymerization initiator. In particular, from the perspective of shortening curing time until the condition of tack-free is achieved, a cationic polymerization initiator or an anionic polymerization initiator is particularly preferably contained as the polymerization initiator.

The cationic polymerization initiator is a compound that initiates a curing reaction of a polymerizable compound by generating a cationic species by heating. The anionic polymerization initiator is a compound that initiates a curing reaction of a polymerizable compound by generating an anionic species by heating. By allowing the curable composition for adhesive agents according to an embodiment of the present invention to contain the polymerization initiator, curing time until the condition of tack-free is achieved can be shortened. Note that one type of the polymerization initiator can be used alone, or two or more types of the polymerization initiators can be used in combination.

In an embodiment of the present invention, a polymerization initiator having the curing characteristics described below is preferably used from the perspectives of being enable to rapidly form an adhesive layer without proceeding with curing reaction by heating and drying, of exhibiting no adhesivity at lower than 50° C., of exhibiting adhesivity by being heated at a temperature that can suppress damage to a semiconductor chip, and then of obtaining an adhesive layer that rapidly cures to the condition where tack-free is achieved.

That is, in the case of the cationic polymerization initiator, use of a polymerization initiator, with which a thermal curing time at 130° C. of 3.5 minutes or longer (for example, from 3.5 to 7.0 minutes and preferably from 4.5 to 6.0 minutes) is achieved for a composition obtained by adding 1 part by weight of the cationic polymerization initiator per 100 parts by weight of 3,4-epoxycyclohexylmethyl(3',4'-epoxy)cyclohexanecarboxylate (for example, trade name "CELLOXIDE 2021P", available from Daicel Corporation), is preferred.

Furthermore, in the case of the anionic polymerization initiator, use of a polymerization initiator, with which a thermal curing time (in accordance with JIS K 5909:1994) at 130° C. of 3.5 minutes or longer is achieved for a composition obtained by adding 1 part by weight of the anionic polymerization initiator per 100 parts by weight of bisphenol A diglycidylether, is preferred.

Note that the thermal curing time in an embodiment of the present invention refers to a time necessary for the curable composition to become rubbery when heated on a hot plate (more specifically, a time necessary for the composition to undergo curing until the composition is unliftable as a thread from a needlepoint) and is the time determined by a method in accordance with JIS K 5909 (1994). By use of the polymerization initiator with which the thermal curing time becomes 3.5 minutes or longer, cationic species are less likely to be generated during heating and drying in the case where a cationic polymerization initiator is used, anionic species are less likely to be generated during heating and drying in the case where an anionic polymerization initiator is used, the polymerization is less likely to be progressed thereafter at room temperature, and thus an adhesive layer having superior storage stability tends to be obtained.

The cationic polymerization initiator is formed from a cation moiety that absorbs heat and an anion moiety that serves as a source of generation of an acid. Examples of the cationic polymerization initiator include arylsulfonium salts, aryliodonium salts, allene-ion complexes, quaternary ammonium salts, aluminum chelates, boron trifluoride-amine complexes, and the like. Among these, an arylsulfonium salt is preferred.

Examples of the cation moiety of the arylsulfonium salt include arylsulfonium ions (especially, triarylsulfonium ions), such as (4-hydroxyphenyl)methylbenzylsulfonium ion, triphenylsulfonium ion, diphenyl[4-(phenylthio)phenyl]sulfonium ion, 4-(4-biphenylylthio)phenyl-4-biphenylylphenylsulfonium ion, tri-p-tolylsulfonium ion, and the like.

Examples of the anion moiety of the arylsulfonium salt include $SbF_6^-$, $PF_6^-$, $BF_4^-$, $(CF_3CF_2)_3PF_3^-$, $(CF_3CF_2CF_2)_3PF_3^-$, $(C_6F_5)_4B^-$, $(C_6F_5)_4Ga^-$, a sulfonate anion (such as a trifluoromethanesulfonate anion, a pentafluoroethanesulfonate anion, a nonafluorobutanesulfonate anion, a methanesulfonate anion, a benzenesulfonate anion, and a p-toluenesulfonate anion), $(CF_3SO_2)_3C^-$, $(CF_3SO_2)_2N^-$, a perhalogenate ion, a halogenated sulfonate ion, a sulfate ion, a carbonate ion, an aluminate ion, a hexafluorobismuthate ion, a carboxylate ion, an arylborate ion, a thiocyanate ion, a nitrate ion, and the like.

As the cationic polymerization initiator, for example, commercially available products, such as trade name "San-Aid SI-110L", "San-Aid SI-145L", "San-Aid SI-150L", "San-Aid SI-160L", and "San-Aid SI-180L" (available from Sanshin Chemical Industry Co., Ltd.), can be used.

Examples of the anionic polymerization initiator include primary amines, secondary amines, tertiary amines, imidazoles, boron trifluoride-amine complexes, and the like. Examples of the imidazole include 2-ethyl-4-methylimidazole, 2-phenylimidazole, 1-(2-cyanoethyl)-2-ethyl-4-methylimidazole, 2,4-diamino-6-[2-methylimidazolyl-(1)]ethyl-s-triazine, 2-phenylimidazoline, 2,3-dihydro-1H-pyrrolo[1,2-a]benzimidazole, 1-cyanoethyl-2-methylimidazole, 1-cyanoethyl-2-undecylimidazole, and the like. Furthermore, examples of the tertiary amine include tris(dimethylaminomethyl)phenol, benzyldimethylamine, 1,8-diazabicyclo[5.4.0]undecene-7 (DBU), and the like.

In an embodiment of the present invention, use of the cationic polymerization initiator (particularly preferably a thermal cationic polymerization initiator and most preferably an arylsulfonium salt) is preferred.

In the case where the curable composition for adhesive agents according to an embodiment of the present invention contains the polymerization initiator, the content (blended amount) of the polymerization initiator is, but not particularly limited to, preferably from 0.01 to 3.0 parts by weight, more preferably from 0.05 to 3.0 parts by weight, even more preferably from 0.1 to 1.0 part by weight, and particularly preferably from 0.3 to 0.8 parts by weight, per 100 parts by weight of the polyorganosilsesquioxane (A) according to an embodiment of the present invention (in the case where the polymerizable compound (B) and/or the silane coupling agent (D) is contained, the total amount of the polyorganosilsesquioxane (A) and the polymerizable compound (B) and/or the silane coupling agent (D)). The content of the polymerization initiator of 0.01 parts by weight or greater can sufficiently and efficiently proceeds curing reaction and tends to enhance adhesive properties of the cured article. On the other hand, the content of the polymerization initiator of 3.0 parts by weight or less tends to enhance storage properties of the curable composition for adhesive agents and/or tends to suppress coloring of the cured article.

Solvent

The curable composition for adhesive agents according to an embodiment of the present invention may preferably further contain a solvent. Examples of the solvent include water, organic solvents, and the like. The solvent is not particularly limited as long as the solvent can dissolve the polyorganosilsesquioxane (A) according to an embodiment of the present invention; and optionally used additives and does not inhibit polymerization.

As the solvent, a solvent that can impart fluidity appropriate for performing coating by spin coating and that can be easily removed by heating at a temperature that can suppress progression of polymerization is preferably used. Use of one type or two or more types of solvents each having a boiling point of 170° C. or lower (at 1 atm) (for example, toluene, butyl acetate, methyl isobutyl ketone, xylene, mesitylene, propylene glycol monomethyl ether, propylene glycol monomethyl ether acetate, cyclohexanone, and the like) is preferred.

The solvent is preferably used in a range that, for example, concentration of nonvolatile components contained in the curable composition for adhesive agents is approximately from 30 to 80 wt. %, preferably from 40 to 70 wt. %, and particularly preferably from 50 to 60 wt. %, from the perspective of excellent coatability during spin coating. The case where the used amount of the solvent is excessive tends to make it difficult to form a layer having an appropriate film thickness (for example, approximately from 0.5 to 30 μm) because the viscosity of the curable composition for adhesive agents becomes low. On the other hand, in the case where the used amount of the solvent is too little, the viscosity of the curable composition for adhesive agents becomes too high, and uniform coating on a support or an adhered tends to become difficult.

The curable composition for adhesive agents according to an embodiment of the present invention may further contain a commonly used additive as an additional optional component, such as an inorganic filler, such as precipitated silica, wet silica, fumed silica, calcined silica, titanium oxide, alumina, glass, quartz, aluminosilicic acid, iron oxide, zinc oxide, calcium carbonate, carbon black, silicon carbide, silicon nitride, and boron nitride; an inorganic filler obtained by treating the above filler with an organosilicon compound, such as an organohalosilane, organoalkoxysilane, and organosilazane; an organic resin fine powder, such as a silicone resin, an epoxy resin, and a fluororesin; a filler, such as a conductive metal powder of silver, copper, or the like; a curing auxiliary; a solvent (such as an organic solvent); a stabilizer (such as an antioxidant, an ultraviolet absorber, a light-resistant stabilizer, a heat stabilizer, and a heavy metal inactivator); a flame retardant (such as a phosphorus-based flame retardant, a halogen-based flame retardant, and an inorganic flame retardant); a flame retardant auxiliary; a reinforcing material (such as an additional filler); a nucleating agent; a coupling agent (such as a silane coupling agent except the silane coupling agent (D)); a lubricant; a wax; a plasticizer; a releasing agent; an impact modifier; a hue modifier; a transparentizing agent; a rheology modifier (such as a fluidity modifier); a processability modifier; a colorant (such as a dye and a pigment); an antistatic agent; a dispersant; a surface conditioner (such as an antifoaming agent, a leveling agent, a foaming preventing agent); a surface modifier (such as a slipping agent); a matting agent; an antifoaming agent; a foam inhibitor; a deforming agent; an antibacterial agent; a preservative; a viscosity modifier; a thickening agent; a photosensitizer; and a foaming agent. One type alone or two or more types of these additives in combination can be used.

The curable composition for adhesive agents according to an embodiment of the present invention can be prepared by, but not particularly limited to, agitating and mixing each component described above at room temperature or under heating as necessary. Note that the curable composition for adhesive agents according to an embodiment of the present invention can be prepared as a one-part composition, wherein each of the components are mixed in advance and used as is. Alternatively, for example, the curable composition can be prepared as a composition of a multi-part system (for example, two-part system), wherein at least two parts that are stored separately are mixed in predetermined proportions prior to use and then used.

The curable composition for adhesive agents according to an embodiment of the present invention is not particularly limited but is preferably a liquid at normal temperature (approximately 25° C.). The viscosity of the curable composition for adhesive agents according to an embodiment of the present invention is not particularly limited and is preferably adjusted depending on the film thickness at the time when coating is performed by spin coating. For example, in the case where coating is performed to achieve a film thickness from 0.1 to 50 the viscosity is preferably from 1 to 5000 mPa·s. In the case where the viscosity of the curable composition for adhesive agents according to an embodiment of the present invention is within the range described above, for example, a coating film having a uniform film thickness can be formed on a substrate, such as silicon wafer. Here, the viscosity of the curable composition for adhesive agents according to an embodiment of the present invention is measured using a viscometer (trade name "MCR301", available from Anton Paar GmbH) under conditions: a swing angle of 5%, frequency from 0.1 to 100 (1/s), and a temperature of 25° C.

Cured Product

By allowing the polymerization reaction of the polymerization compound (such as the polyorganosilsesquioxane (A) according to an embodiment of the present invention) in the curable composition for adhesive agents according to an embodiment of the present invention to proceed, the curable composition for adhesive agents can be cured, and a cured article (hereinafter, also referred to as "cured article according to an embodiment of the present invention") can be obtained. The curing method can be appropriately selected from well known methods without particular limitation, and examples thereof include a method of irradiation with an active energy ray and/or heating.

As the active energy ray, for example, any of an infrared ray, a visible ray, an ultraviolet ray, an X-ray, an electron beam, an α-ray, a β-ray, and a γ-ray can be used. Among them, an ultraviolet ray is preferred in terms of excellent handling ease.

The conditions for curing the curable composition for adhesive agents according to an embodiment of the present invention by irradiation with the active energy ray (active energy ray irradiation conditions and the like) are not particularly limited and can be appropriately adjusted according to the type and energy of the active energy ray for irradiation, the shape and size of the cured article, and the like. In the case of irradiation with an ultraviolet ray, it is, for example, preferably approximately from 1 to 1000 mJ/cm$^2$. In addition, for example, a high-pressure mercury lamp, an ultra high-pressure mercury lamp, a xenon lamp, a carbon arc, a metal halide lamp, the sunlight, an LED lamp, a laser, and the like can be used for irradiation with the active energy ray. After irradiation with the active energy ray, the curing reaction can be further proceeded by being further subjected to a heat treatment (annealing and aging).

On the other hand, for the conditions of curing the curable composition for adhesive agents according to an embodiment of the present invention by heating, a cured article can be rapidly formed by heating at a low temperature of lower than 200° C. because the curable composition for adhesive agents according to an embodiment of the present invention contains the polyorganosilsesquioxane (A). That is, it has low temperature curability. Examples of the heating temperature include from 50 to 190° C. The curing time can be appropriately set.

Among these, the cured article according to an embodiment of the present invention is preferably a cured article obtained by subjecting the curable composition for adhesive agents described above to heat treatment in which a curing temperature is changed stepwisely. The cured article in the preferred embodiment is particularly preferably a cured article obtained by a heat treatment in which the degree of curing at the time of heat treatment completion of a first step is 85% or less (for example, from 50 to 85%, particularly preferably from 55 to 85%, and more preferably from 60 to 80%) and in which the degree of curing at the time of heat treatment of a second step or later is greater than 85% (preferably 90% or greater and particularly preferably 95% or greater; note that the upper limit of the degree of curing is 100%). Note that the degree of curing at the time of heat treatment completion of the first step in the preferred embodiment can be determined by measuring, by DSC, the calorific value of the sample at the time of heat treatment completion of the first step and the calorific value of the sample before the heat treatment and calculating based on the following equation.

$$\text{Degree of curing (\%)}=[1-(\text{calorific value at the time of heat treatment completion of first step/calorific value before heat treatment})]\times 100$$

The method for producing the cured article according to the preferred embodiment of the present invention is a method in which a cured article is produced by subjecting the curable composition for adhesive agents containing a compound having a polymerizable group to a heating treatment in which a curing temperature is changed stepwisely, the degree of curing at the time of heat treatment completion of the first step is 85% or less (for example, from 50 to 85%, particularly preferably from 55 to 85%, and more preferably from 60 to 80%), and the degree of curing at the time of heat treatment of the second step or later is greater than 85% (preferably 90% or greater and particularly preferably 95% or greater; note that the upper limit of the degree of curing is 100%). By controlling the degree of curing at the time of heat treatment completion of the first step to 85% or less, it is possible to form a structure that readily undergoes stress relaxation, and it is conceived that crack resistance of the cured article obtained as the final product can be enhanced.

The degree of curing in the preferred embodiment can be controlled by adjusting the heating temperature and the heating time. In the preferred embodiment, from the perspective of obtaining a cured article having further superior crack resistance, it is preferred that curing is gradually performed over a certain period of time until the degree of curing reaches from 50 to 85% (preferably from 55 to 85% and more preferably from 60 to 80%). The heat treatment of the first step is preferably performed over 5 minutes or longer (preferably from 5 to 120 minutes, particularly preferably from 10 to 60 minutes, and most preferably from 30 to 60 minutes).

The heating temperature in the heat treatment of the first step of the preferred embodiment needs to be a temperature that does not allow the degree of curing at the time of heat treatment completion of the first step to exceed 85% even when the heat treatment is performed for 5 minute or longer, and examples thereof include 90° C. or higher but lower than 150° C., preferably from 100 to 140° C., and particularly preferably from 110 to 140° C. When the heat treatment of the first step is performed at a temperature within the range described above, a cured article having excellent crack resistance can be produced with excellent workability. On the other hand, in the case where the heat treatment of the first step is performed at a temperature higher than 150° C., gradual curing cannot be performed, and crack resistance of the resulting cured article tends to be deteriorated. Furthermore, because the curing progresses too rapidly, it tends to be difficult to complete the heat treatment of the first step while the degree of curing is 85% or less. In the case where the heat treatment of the first step is performed at a temperature of lower than 90° C., the curing takes too long, and workability tends to be deteriorated.

The heating temperature in the heat treatment of the second step or later of the preferred embodiment is, for example, from 150 to 200° C., preferably from 160 to 190° C., and particularly preferably from 160 to 180° C. The heating time is, for example, from 5 to 120 minutes and preferably from 10 to 60 minutes. In the case where the heat treatment temperature of the second step or later is lower than 150° C., it becomes difficult to increase the degree of curing of the resulting cured article to 100%, and heat resistance, crack resistance, and adhesive properties and tight bonding properties for adhereds tend to be deteriorated. Furthermore, even if the degree of curing is increased to approximately 100%, such curing takes too long and is not preferred because workability is deteriorated. On the other hand, in the case where the heat treatment temperature of the second step or later is higher than 200° C., an adhered may be deteriorated due to the heat.

Note that the heat treatment in each step of the preferred embodiment may be performed while the temperature is changed stepwisely within the range described above or may be performed while the temperature is fixed to a particular temperature within the range described above. Furthermore, the heat treatment in the preferred embodiment needs to be performed in two steps or more and may be in two steps or multi-step with three or more steps.

Furthermore, the total time spent for the heat treatment of the first step and the second step in the preferred embodiment (in the case where a third step or later step(s) is also performed, the total time includes time required for the heat treatment of the third step or later step(s)) is, for example, approximately from 0.5 to 2 hours and preferably from 0.75 to 1.5 hours.

The cured article according to an embodiment of the present invention obtained by the production method of the preferred embodiment described above achieves excellent crack resistance and tends to suppress occurrence of crack even when subjected to thermal shock.

The cured article according to an embodiment of the present invention (especially, the cured article according to an embodiment of the present invention obtained by the production method of the preferred embodiment) achieves excellent heat resistance. Therefore, the pyrolysis temperature of the cured article according to an embodiment of the present invention is, but not particularly limited to, preferably 200° C. or higher (for example, from 200 to 500° C.), more preferably 260° C. or higher, and even more preferably 300° C. or higher. Note that the pyrolysis temperature is determined by the method described in Examples.

The shape of the cured article according to an embodiment of the present invention is not particularly limited and can be adjusted appropriately based on the purpose, and examples thereof include a sheet shape, a film shape, a tape shape, a plate shape, and the like. The thickness of the cured article is not particularly limited.

The cured article according to an embodiment of the present invention obtained by curing the curable composition for adhesive agents according to an embodiment of the present invention has excellent heat resistance, crack resistance, and adhesive properties and tight bonding properties for adhereds. Therefore, by curing, the curable composition for adhesive agents according to an embodiment of the present invention can be turned into an adhesive agent having excellent heat resistance, crack resistance, and adhesive properties and tight bonding properties for adhereds. The adhesive agent can be used for adhering desired adhereds. For example, the adhesive agent can be used as a photo curable adhesive agent in the case where the curable composition for adhesive agents according to an embodiment of the present invention contains a photocationic polymerization initiator. The adhesive agent can be used as a thermoset adhesive agent in the case where the curable composition contains a thermal cationic polymerization initiator.

The curable composition for adhesive agents according to an embodiment of the present invention can be used for various purposes, in which desired articles (components and the like) are adhered to each other, and is not limited for use in obtaining the adhesive sheet or the laminate described below.

Adhesive Sheet

By using the curable composition for adhesive agents (adhesive composition) according to an embodiment of the present invention, an adhesive sheet (also referred to as "adhesive sheet 1 according to an embodiment of the present invention") having an adhesive layer (also referred to as "adhesive layer according to an embodiment of the present invention") formed from the curable composition for adhesive agents according to an embodiment of the present invention, on at least one face of a substrate, can be obtained. The adhesive sheet 1 according to an embodiment of the present invention can be obtained, but is not particularly limited, by coating the curable composition for adhesive agents according to an embodiment of the present invention on a substrate and further optionally by drying. The method of coating is not particularly limited, and a well known and commonly used method can be used. Furthermore, the method and conditions of drying are not particularly limited, and a well known and commonly used method can be used wherein the conditions, by which volatile components such as a solvent can be removed as much as possible, can be employed. In particular, in the case where the curable composition for adhesive agents according to an embodiment of the present invention contains a polymerization initiator, with which a thermal curing time at 130° C. of 3.5 minutes or longer is achieved for a composition obtained by adding 1 part by weight of the polymerization initiator per 100 parts by weight of CELLOXIDE 2021P (available from Daicel Corporation), an adhesive layer can be formed by rapidly removing volatile components such as a solvent by heating and drying while progression of curing reaction is suppressed. The adhesive layer obtained as described above exhibits no adhesivity at lower than 50° C., exhibits adhesivity by being heated at a temperature that can suppress damage to an electronic component, such as a semiconductor chip, and then rapidly cures.

The adhesive sheet 1 according to an embodiment of the present invention may be a single-sided adhesive sheet having an adhesive layer only on one face of a substrate or may be a double-sided adhesive sheet having adhesive layers on both faces of a substrate. In the case where the adhesive sheet 1 according to an embodiment of the present invention is a double-sided adhesive sheet, at least one of the adhesive layers needs to be the adhesive layer according to an embodiment of the present invention, and the other may be the adhesive layer according to an embodiment of the present invention or may be an adhesive layer except the adhesive layer according to an embodiment of the present invention (other adhesive layer).

Furthermore, as an adhesive sheet of another embodiment of the present invention, an adhesive sheet having excellent crack resistance, heat resistance, and adhesive properties and tight bonding properties for adhereds can be obtained by using the silane coupling agent (D) (preferably, the silane coupling agent (D1)) and the polyorganosilsesquioxane (A) according to an embodiment of the present invention. Specifically, an adhesive sheet, which has an adhesive layer formed from the curable composition for adhesive agents containing an anchor coat layer containing the silane coupling agent (D) (preferably the silane coupling agent (D1)) and the polyorganosilsesquioxane (A) according to an embodiment of the present invention on at least one face of a substrate and in which the adhesive layer is provided on a surface of the anchor coat layer (also referred to as "adhesive sheet 2 according to an embodiment of the present invention"), has excellent crack resistance, heat resistance, adhesive properties and tight bonding properties for adhereds. Note that, in the present specification, the adhesive sheet 1 according to an embodiment of the present invention and the adhesive sheet 2 according to an embodiment of the present invention may be collectively referred to as "adhesive sheet according to an embodiment of the present invention".

The adhesive sheet 2 according to an embodiment of the present invention can be produced by a production method at least including: forming an anchor coat layer by using a composition (also referred to as "anchor coat agent") containing the silane coupling agent (D) (preferably the silane coupling agent (D1)) on at least one face of a substrate; and forming an adhesive layer on a surface of the anchor coat layer by using the curable composition for adhesive agents containing the polyorganosilsesquioxane (A) according to an embodiment of the present invention. The methods of coating the curable composition for adhesive agents and the anchor coat agent are not particularly limited, and well known and commonly used methods can be used. Furthermore, the methods and conditions of drying for forming the anchor coat layer and the adhesive layer are not particularly limited, and a well known and commonly used method can be used wherein the conditions, by which volatile components such as a solvent can be removed as much as possible, can be employed. The anchor coat agent and the curable composition for adhesive agents may further contain components exemplified and described as other components that may be contained in the curable composition for adhesive agents according to an embodiment of the present invention, such as the solvent and the additives described above.

The content (blended amount) of the silane coupling agent (D) (preferably the silane coupling agent (D1)) in the anchor coat layer is, but not particularly limited to, preferably 90 wt. % or greater (for example, from 90 to 100 wt. %) and more preferably 95 wt. % or greater, relative to the weight (100 wt. %) of the anchor coat layer.

The adhesive layer (that is, the adhesive layer included in the adhesive sheet 2 according to an embodiment of the present invention) is not particularly limited as long as the adhesive layer is an adhesive layer formed by using the curable composition for adhesive agents (adhesive composition) containing the polyorganosilsesquioxane (A) according to an embodiment of the present invention.

The content (blended amount) of the polyorganosilsesquioxane (A) according to an embodiment of the present invention in the curable composition for adhesive agents (that is, the curable composition for adhesive agents forming the adhesive layer in the adhesive sheet 2 according to an embodiment of the present invention) is, but not particularly limited to, preferably 70 wt. % or greater (for example, from 70 to 100 wt. %), more preferably 80 wt. % or greater, and even more preferably 90 wt. % or greater, relative to the total amount (100 wt. %) of the curable composition for adhesive agents except the solvent. The content of the polyorganosilsesquioxane (A) according to an embodiment of the present invention of 70 wt. % or greater tends to further enhance heat resistance of the adhesive sheet.

The adhesive sheet 2 according to an embodiment of the present invention may be a single-sided adhesive sheet having an adhesive layer only on one face of a substrate or may be a double-sided adhesive sheet having adhesive layers on both faces of a substrate. In the case where the adhesive sheet 2 according to an embodiment of the present invention is a double-sided adhesive sheet, at least one face of the substrate needs to be provided with the anchor coat layer and the adhesive layer, and the other may be provided with the anchor coat layer or with no anchor coat layer. Furthermore, the other adhesive layer may be an adhesive layer formed from the curable composition for adhesive agents (adhesive composition) containing the polyorganosilsesquioxane (A) according to an embodiment of the present invention or may be an adhesive layer formed from an adhesive composition containing no polyorganosilsesquioxane (A) according to an embodiment of the present invention.

The adhesive sheet according to an embodiment of the present invention include not only a sheet shape but also shapes that are similar to a sheet shape, such as a film shape, a tape shape, and a plate shape.

As the substrate in the adhesive sheet according to an embodiment of the present invention, a well known and commonly used substrate (substrate used in adhesive sheets) can be used without particular limitation. Examples thereof include plastic substrates, metal substrates, ceramics substrates, semiconductor substrates, glass substrates, paper substrates, wood substrates, substrates having coated surfaces, and the like. Furthermore, the substrate in the adhesive sheet according to an embodiment of the present invention may be a release liner. Note that the adhesive sheet according to an embodiment of the present invention may have only one layer of substrate or may have two or more layers of substrates. Furthermore, the thickness of the substrate is not particularly limited and can be, for example, appropriately selected in a range from 1 to 10000 μm.

The adhesive sheet 1 according to an embodiment of the present invention may have only one layer of the adhesive layer according to an embodiment of the present invention or may have two or more types of the adhesive layers. Furthermore, the thickness of the adhesive layer (the adhesive layer according to an embodiment of the present invention, other adhesive layer) in the adhesive sheet according to an embodiment of the present invention is not particularly limited and can be, for example, appropriately selected in a range from 0.1 to 10000 μm.

The adhesive sheet 2 according to an embodiment of the present invention may have only one layer of anchor coat layer or may have two or more types of anchor coat layers. Furthermore, the thickness of the anchor coat layer is not particularly limited and can be, for example, appropriately selected in a range from 0.001 to 10000 μm.

The adhesive sheet according to an embodiment of the present invention may include an additional layer (for example, such as an intermediate layer, a base coat layer, and the like), in addition to the substrate, the adhesive layer, and the anchor coat layer.

Laminate

By using the adhesive sheet according to an embodiment of the present invention, it is possible to obtain a laminate to which an adhered layer (adhered) is adhered to the adhesive layer of the adhesive sheet according to an embodiment of the present invention (also referred to as "laminate according to an embodiment of the present invention"). The laminate is a laminate formed from three or more layers (at least three layers) (laminate) and at least contains two adhered layers (a substrate and an adhered layer) and an adhesive layer arranged in between these adhered layers (a layer adhering the adhered layers). In the case where the adhesive sheet according to an embodiment of the present invention is a single-sided adhesive sheet, for example, the laminate according to an embodiment of the present invention can be obtained by adhering the adhesive sheet according to an embodiment of the present invention to an adhered layer and then performing a heat treatment to cure the adhered layer in the adhesive sheet. In this case, a laminate in which the substrate in the adhesive sheet according to an embodiment of the present invention corresponds to be an adhered layer can be obtained. Furthermore, in the case where the adhesive sheet according to an embodiment of the present invention is a double-sided adhesive sheet and where release liners are adhered as the substrates on the both sides of the adhesive layer, for example, the laminate according to an embodiment of the present invention can be obtained by adhering an adhered layer to an adhesive layer exposed by releasing a release liner on one side of the adhesive sheet according to an embodiment of the present invention, then adhering another adhered layer to an adhesive layer exposed by releasing the other release liner, and then performing a heat treatment to cure the adhesive layer. However, the method for producing the laminate according to an embodiment of the present invention is not limited to these methods. Note that, in the laminate according to an embodiment of the present invention, in the case where the adhesive sheet according to an embodiment of the present invention is the adhesive sheet 1 according to an embodiment of the present invention, the adhesive layer present in between two adhered layers is the adhesive layer according to an embodiment of the present invention. Meanwhile, in the laminate according to an embodiment of the present invention, in the case where the adhesive sheet according to an embodiment of the present invention is the adhesive sheet 2 according to an embodiment of the present invention, an adhered layer is adhered to the side where the adhesive layer formed from the curable composition for adhesive agents (adhesive composition) containing the polyorganosilsesquioxane (A) according to an embodiment of the present invention and from the anchor coat layer described above are provided.

The adhered layer in the laminate according to an embodiment of the present invention is not particularly limited, and examples thereof include substances that are similar to the substrates of the adhesive sheet described above. Note that the laminate according to an embodiment of the present invention may have only two adhered layers or may have 3 or more adhered layers. Furthermore, the thickness of the adhered layer is not particularly limited and can be, for example, appropriately selected in a range of 1 to 100000 μm. The adhered layer does not necessarily have a laminate shape in a strict sense.

The laminate according to an embodiment of the present invention may have only one layer of the adhesive layer (the adhesive layer according to an embodiment of the present invention; and the adhesive layer in the adhesive sheet 2 according to an embodiment of the present invention) or may have two or more types of the adhesive layers. Furthermore, the thickness of the adhesive layer is not particularly limited and can be, for example, appropriately selected in a range from 0.1 to 10000 μm.

The laminate according to an embodiment of the present invention may have another layer (for example, an intermediate layer, a base coat layer, another adhesive layer, and the like), in addition to the adhered layer and the adhesive layer.

Specific examples of the laminate according to an embodiment of the present invention include semiconductor chips, wafers, and the like.

In the laminate according to an embodiment of the present invention, excellent adhesive properties and tight bonding properties for adhereds of the adhesive layer, crack resistance, and heat resistance are achieved. Therefore, for example, in the case where the laminate according to an embodiment of the present invention is a three-dimensional laminate of a semiconductor chip, by virtue of achieving higher integration and better power saving compared to those of known semiconductors, an electronic device with higher performance while packaging density is enhanced can be provided. In particular, cracking and peeling off of the adhesive layer in the laminate cause breakage during production of the laminate and/or breakage of wiring in produced semiconductor chips, wafers, and the like. As a result, such cracking and peeling off of the adhesive layer cause failure of the laminate and/or an device in which the laminate is used. Therefore, the adhesive agent having excellent adhesive properties for adhereds, tight bonding properties, heat resistance, and crack resistance is extremely important as a material for forming a laminate. Therefore, the laminate according to an embodiment of the present invention has high reliability.

Furthermore, use of the laminate according to an embodiment of the present invention (for example, semiconductor chip, wafer, and the like) can provide a microprocessor, a semiconductor memory, an IC for power source, an IC for communication, a semiconductor sensor, an MEMS, or a semiconductor obtained by combining these that are highly integrated. These semiconductors are used in devices, such as high performance servers, workstations, in-car computers, personal computers, communication devices, cameras, and graphic display devices. That is, the device has the laminate according to an embodiment of the present invention.

EXAMPLES

Hereinafter, the present invention will be described in more detail based on examples, but the present invention is not limited by these examples. Molecular weight of a product was measured with an Alliance HPLC system 2695 (available from Waters), a Refractive Index Detector 2414 (available from Waters), columns of Tskgel $GMH_{HR}$-M×2 (available from Tosoh Corporation), a guard column of Tskgel guard column $H_{HR}L$ (available from Tosoh Corporation), a column oven of COLUMN HEATER U-620 (available from Sugai), a solvent of THF, and a measurement condition of 40° C. In addition, the ratio of T3 form to T2 form (T3 form/T2 form) in the product was measured by $^{29}$Si-NMR spectrum measurement with JEOL ECA500 (500 MHz).

Production Example 1: Production of Intermediate Epoxy Group-Containing Polyorganosilsesquioxane To a 1000 mL flask (reaction vessel) equipped with a thermometer, a stirrer, a reflux condenser, and a nitrogen inlet tube, 277.2 mmol (68.30 g) of 2-(3,4-epoxycyclohexyl) ethyltrimethoxysilane, 3.0 mmol (0.56 g) of phenyltrimethoxysilane, and 275.4 g of acetone were charged under a nitrogen stream, and the temperature was raised to 50° C. To the mixture thus obtained, 7.74 g of 5% potassium carbonate aqueous solution (2.8 mmol as potassium carbonate) was added over 5 minutes, and then 2800.0 mmol (50.40 g) of water was added over 20 minutes. Here, no significant temperature increase occurred during the additions. Thereafter, a polycondensation reaction was performed under a nitrogen stream for 5 hours while the temperature was maintained at 50° C.

Thereafter, at the same time as cooling of the reaction solution, 137.70 g of methyl isobutyl ketone and 100.60 g of 5% saline solution were added. This solution was transferred into a 1 L separatory funnel, and 137.70 g of methyl isobutyl ketone was added again to perform water washing. After the liquid separation, the aqueous layer was taken out, and water washing was performed until the lower layer liquid became neutral. The upper layer liquid was collected, and then the solvent was distilled off from the upper layer liquid under conditions of 1 mmHg and 50° C. to obtain 75.18 g of a colorless transparent liquid product containing 25.04 wt. % of methyl isobutyl ketone (intermediate epoxy group-containing polyorganosilsesquioxane).

The product was analyzed, the number average molecular weight was 2235, and the molecular weight dispersity was 1.54. A ratio of T3 form to T2 form (T3 form/T2 form) calculated based on the $^{29}$Si-NMR spectrum of the product was 11.9.

Figure 2:
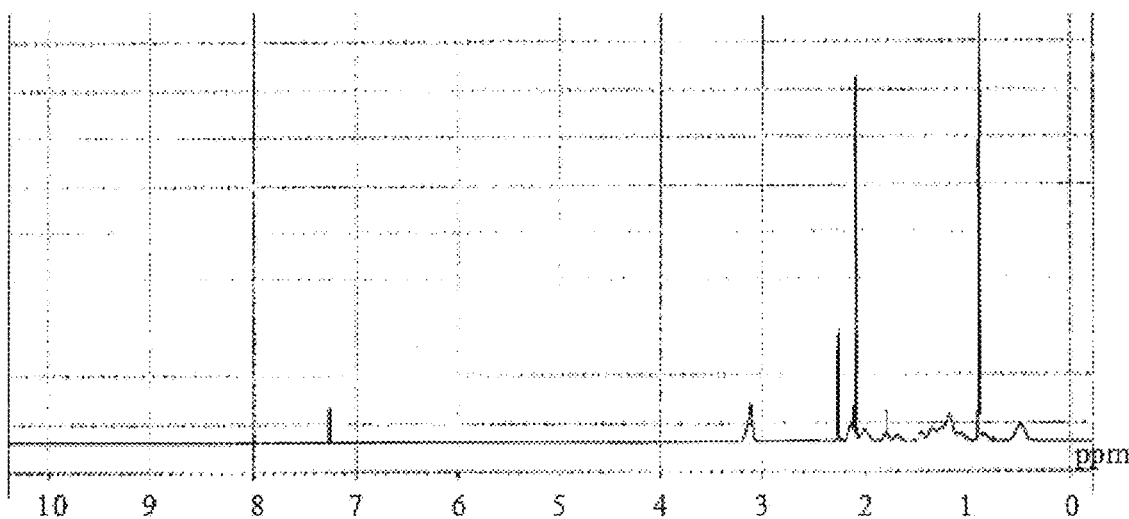
FIG. 2 is a $^1$H-NMR chart of an intermediate epoxy group-containing polyorganosilsesquioxane obtained in Production Example 1.
Figure 3:
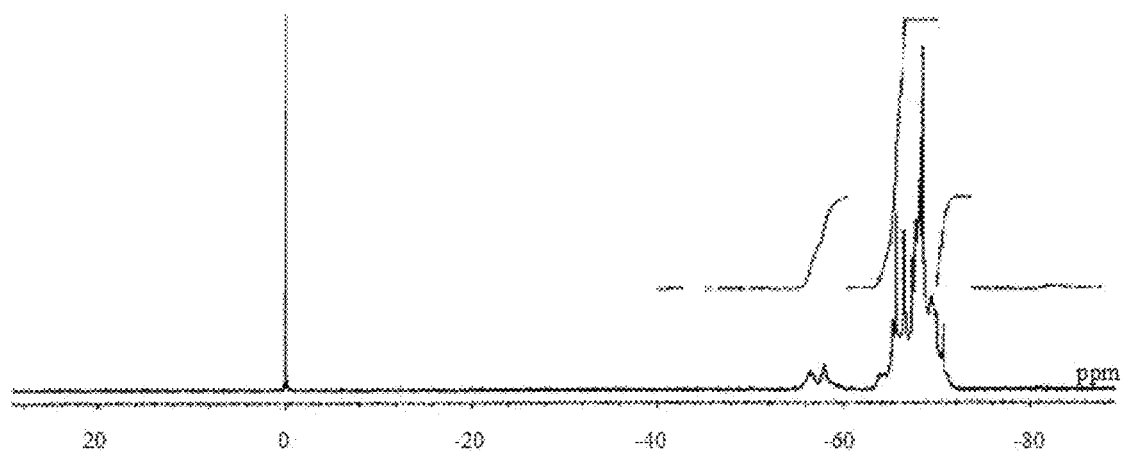
FIG. 3 is a $^{29}$Si-NMR chart of an intermediate epoxy group-containing polyorganosilsesquioxane obtained in Production Example 1.

The $^1$H-NMR chart of the obtained intermediate epoxy group-containing polyorganosilsesquioxane is shown in FIG. 2, and $^{29}$Si-NMR chart is shown in FIG. 3.

Production Example 2: Production of Epoxy Group-Containing Polyorganosilsesquioxane According to an Embodiment of the Present Invention (1)

To a 1000 mL flask (reaction vessel) equipped with a thermometer, a stirrer, a reflux condenser, and a nitrogen inlet tube, a mixture containing the intermediate epoxy group-containing polyorganosilsesquioxane obtained in Production Example 1 (75 g) was charged under a nitrogen stream. Relative to the net content (56.2 g) of the intermediate epoxy group-containing polyorganosilsesquioxane, 100 ppm (5.6 mg) of potassium hydroxide and 2000 ppm (112 mg) of water were added. After the mixture was heated at 80° C. for 18 hours, a sample was taken to measure the molecular weight, and it was found that the number average molecular weight Mn was increased to 6000. Thereafter, the mixture was cooled to room temperature, 300 mL of methyl isobutyl ketone was added, and 300 mL of water was added to repeat water washing to remove alkali components and to concentrate. Then, 74.5 g of a liquid colorless transparent product (epoxy group-containing polyorganosilsesquioxane 1 according to an embodiment of the present invention) containing 25 wt. % of methyl isobutyl ketone was obtained.

The product was analyzed, the number average molecular weight was 6176, and the molecular weight dispersity was 2.31. A ratio of T3 form to T2 form (T3 form/T2 form) calculated based on the $^{29}$Si-NMR spectrum of the product was 50.2.

Figure 4:
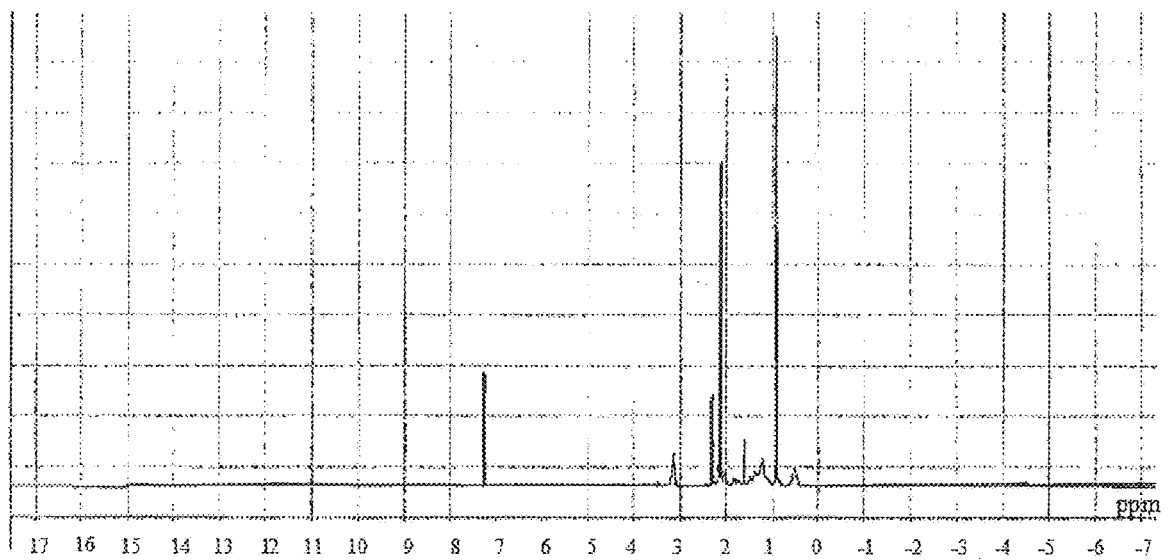
FIG. 4 is a $^1$H-NMR chart of an epoxy group-containing polyorganosilsesquioxane according to an embodiment of the present invention obtained in Production Example 2.
Figure 5:
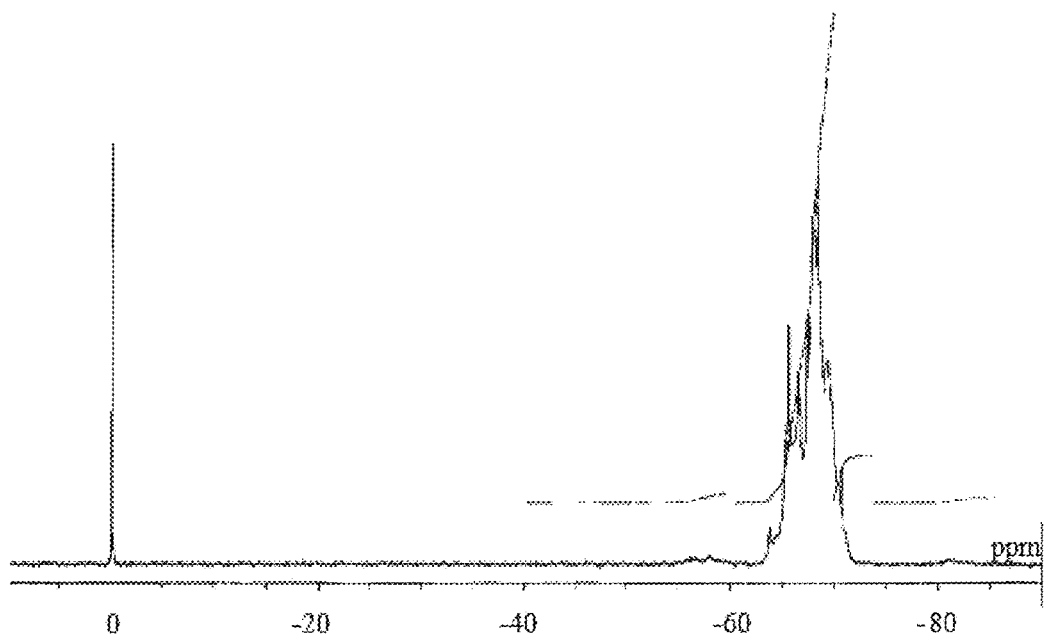
FIG. 5 is a $^{29}$Si-NMR chart of an epoxy group-containing polyorganosilsesquioxane according to an embodiment of the present invention obtained in Production Example 2.

The $^1$H-NMR chart of the obtained epoxy group-containing polyorganosilsesquioxane 1 is shown in FIG. 4, and $^{29}$Si-NMR chart is shown in FIG. 5.

Production Example 3: Production of Epoxy Group-Containing Polyorganosilsesquioxane According to an Embodiment of the Present Invention (2)

To a 1000 mL flask (reaction vessel) equipped with a thermometer, a stirrer, a reflux condenser, and a nitrogen inlet tube, a mixture containing the intermediate epoxy group-containing polyorganosilsesquioxane obtained by the same method as in Production Example 1 (75 g) was charged under a nitrogen stream. Relative to the net content (56.2 g) of the intermediate epoxy group-containing polyorganosilsesquioxane, 100 ppm (5.6 mg) of potassium carbonate and 2000 ppm (112 mg) of water were added. After the mixture was heated at 80° C. for 18 hours, a sample was taken to measure the molecular weight, and it was found that the number average molecular weight Mn was increased to 4800. Thereafter, the mixture was cooled to room temperature, 300 mL of methyl isobutyl ketone was added, and 300 mL of water was added to repeat water washing to remove alkali components and to concentrate. Then, 74.5 g of a liquid colorless transparent product (epoxy group-containing polyorganosilsesquioxane 2 according to an embodiment of the present invention) containing 25 wt. % of methyl isobutyl ketone was obtained.

Production Example 4: Production of Epoxy Group-Containing Polyorganosilsesquioxane According to an Embodiment of the Present Invention (3)

To a 1000 mL flask (reaction vessel) equipped with a thermometer, a stirrer, a reflux condenser, and a nitrogen inlet tube, a mixture containing the intermediate epoxy group-containing polyorganosilsesquioxane obtained by the same method as in Production Example 1 (75 g) was charged under a nitrogen stream. Relative to the net content (56.2 g) of the intermediate epoxy group-containing polyorganosilsesquioxane, 100 ppm (5.6 mg) of potassium carbonate and 2000 ppm (112 mg) of water were added. After the mixture was heated at 80° C. for 3 hours, a sample was taken to measure the molecular weight, and it was found that the number average molecular weight Mn was increased to 3500. Thereafter, the mixture was cooled to room temperature, 300 mL of methyl isobutyl ketone was added, and 300 mL of water was added to repeat water washing to remove alkali components and to concentrate. Then, 74.5 g of a liquid colorless transparent product (epoxy group-containing polyorganosilsesquioxane 3 according to an embodiment of the present invention) containing 25 wt. % of methyl isobutyl ketone was obtained.

The product was analyzed, the number average molecular weight was 3500, and the molecular weight dispersity was 2.14. A ratio of T3 form to T2 form (T3 form/T2 form) calculated based on the $^{29}$Si-NMR spectrum of the product was 21.

Figure 6:
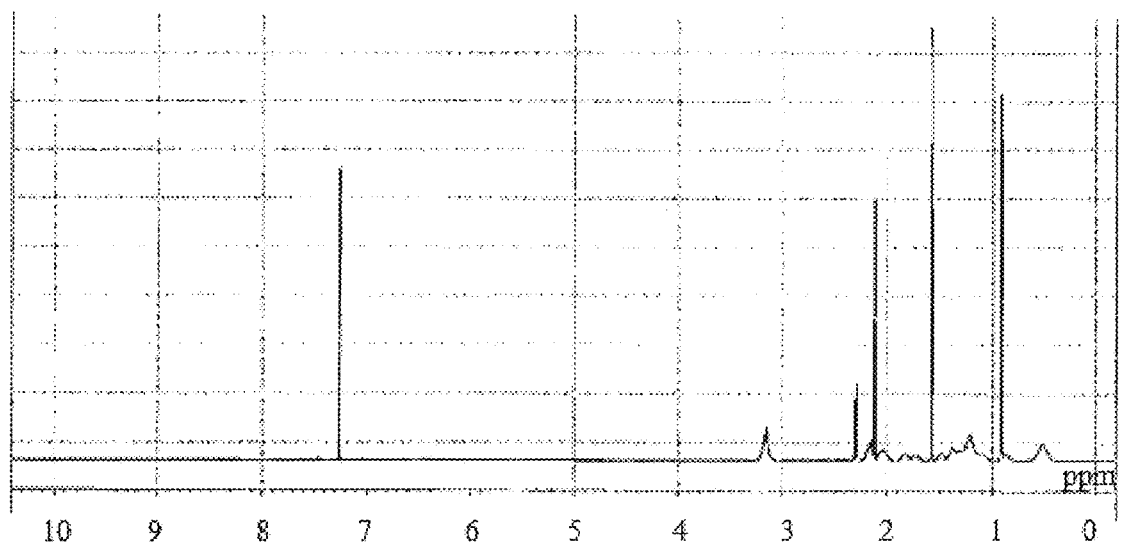
FIG. 6 is a $^1$H-NMR chart of an epoxy group-containing polyorganosilsesquioxane according to an embodiment of the present invention obtained in Production Example 4.
Figure 7:
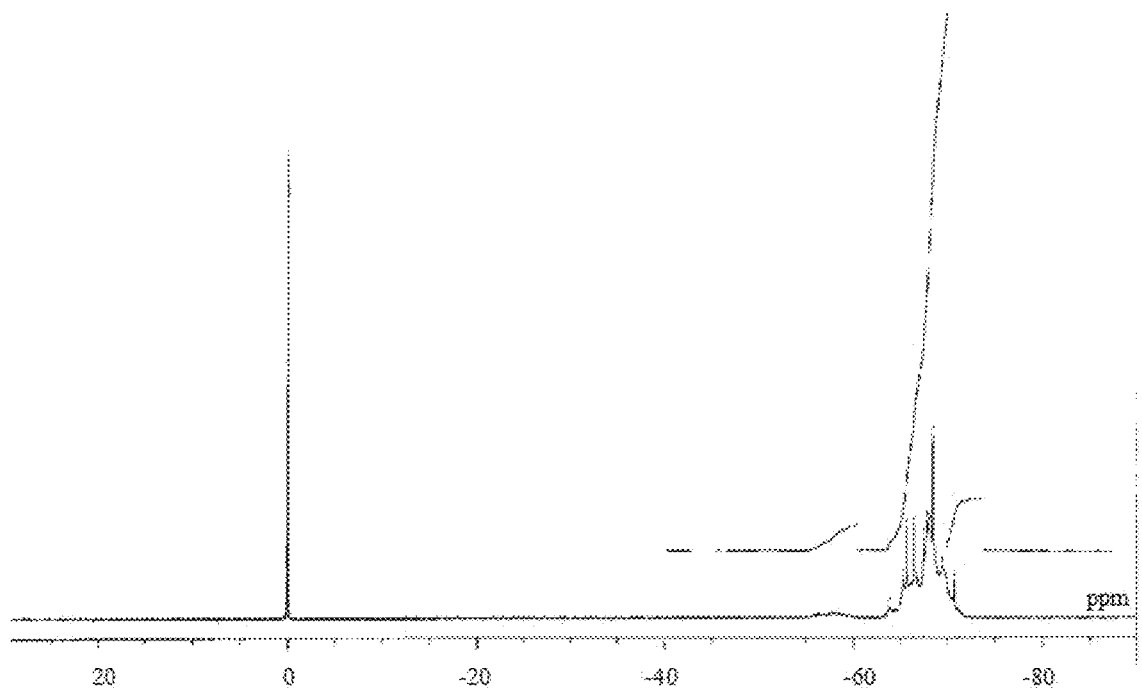
FIG. 7 is a $^{29}$Si-NMR chart of an epoxy group-containing polyorganosilsesquioxane according to an embodiment of the present invention obtained in Production Example 4.

The $^1$H-NMR chart of the obtained epoxy group-containing polyorganosilsesquioxane 3 is shown in FIG. 6, and $^{29}$Si-NMR chart is shown in FIG. 7.

Comparative Production Example 1: Production of Polyorganosilsesquioxane

To a 300 mL flask (reaction vessel) equipped with a thermometer, a stirrer, a reflux condenser, and a nitrogen inlet tube, 161.5 mmol (39.79 g) of 2-(3,4-epoxycyclohexyl)ethyltrimethoxysilane, 9 mmol (1.69 g) of phenyltrimethoxysilane, and 165.9 g of acetone were charged under a nitrogen stream, and the temperature was raised to 50° C. To the mixture thus obtained, 4.70 g of 5% potassium carbonate aqueous solution (1.7 mmol as potassium carbonate) was added over 5 minutes, and then 1700 mmol (30.60 g) of water was added over 20 minutes. Here, no significant temperature increase occurred during the additions. Thereafter, a polycondensation reaction was performed under a nitrogen stream for 4 hours while maintaining the temperature at 50° C.

The product in the reaction solution after the polycondensation reaction was analyzed, the number average molecular weight was 1900, and the molecular weight dispersity was 1.5. A ratio of T3 form to T2 form (T3 form/T2 form) calculated based on the $^{29}$Si-NMR spectrum of the product was 10.3.

Thereafter, the reaction solution was cooled and washed with water until the lower layer liquid became neutral. The upper layer liquid was collected, and then the solvent was distilled off from the upper layer liquid under conditions of 1 mmHg and 40° C. until the solvent amount became 25 wt. % to obtain a colorless transparent liquid product (epoxy group-containing polyorganosilsesquioxane).

Evaluation

Heat Resistance

The cured article of the adhesive layer obtained by heating each of the adhesive composition obtained in Examples and Comparative Examples described below under "curing condition" shown in Tables 1 to 7 was subjected to thermogravimetric analysis by using a thermal analyzer (trade name "TG-DTA 6300", available from Seiko Instruments Inc.) to measure the pyrolysis temperature. Note that, as shown in FIG. 1, the pyrolysis temperature is a temperature at a point where a tangent line of a region with no initial weight loss or with a gradual decrease (the region shown by A in FIG. 1) and a tangent line of the inflection point where a rapid weight loss occurs (the region shown by B in FIG. 1) are crossed. The heat resistance was evaluated based on the following criteria. The results are shown in the "Heat Resistance" row of Tables 1 to 7.
  ○ (Good): Pyrolysis temperature was 260° C. or higher
  x (Poor): Pyrolysis temperature was lower than 260° C.

Crack Resistance

The adhesive sheet obtained in each of Examples and Comparative Examples was subjected heating under "curing condition" shown in Tables 1 to 7 to cure the adhesive layer and cooled, then heated at 250° C. for 30 minutes, and cooled to room temperature. In order to evaluate the number of cracks generated at this time, the 20 mm square range with the center of the glass plate as the apex was divided into 100 total of 2 mm squares, and the number of the 2 mm squares in which no cracks were generated was counted. Evaluation was then performed based on the following criteria. The results are shown in the "Crack resistance" row of Tables 1 to 7.
  ⊚ (Very good): The number of the 2 mm squares in which no cracks were generated was 65 or greater
  ○ (Good): The number of the 2 mm squares in which no cracks were generated was 50 or greater but less than 65
  Δ (Marginal): The number of the 2 mm squares in which no cracks were generated was 1 or greater but less than 50
  x (Poor): Cracks occurred in all of the 2 mm squares Adhesive Properties A razor blade (trade name "single-edged razor blade for trimming", available from Nisshin EM Co., Ltd.) was inserted into an adhesive interface of the laminate obtained in each of Examples and Comparative Examples described below, the adhesive interface of the laminate was observed and evaluated based on the following criteria. The results are shown in the "Adhesive properties" row of Tables 1 to 7.
  ○ (Good): No peeling off occurred in the interface
  Δ (Marginal): There were portions of interfacial peeling off and cohesive failure
  x (Poor): Peeling off occurred in the interface Tight Bonding Properties The adhesive sheet obtained in each of Examples and Comparative Examples below (a silicon plate having an adhesive layer that was stored at room temperature for 24 hours or less or 72 hours after the production) was subjected to heating under "curing condition" shown in Tables 1 to 7 to cure the adhesive layer. For the obtained cured article of the adhesive layer, tight bonding properties to a glass plate was evaluated by Cross-cut tape test (in accordance with JIS K 5400-8.5). Evaluation was then performed based on the following criteria. The results are shown in the "Tight bonding properties (24 hours or less)" row and the "Tight bonding properties (after 72 hours)" row of Tables 1 to 7.
  ○ (Good): No peeling off of the adhesive layer from the silicon wafer was observed
  x (Poor): Peeling off of the adhesive layer from the silicon wafer was observed Degree of Curing The heat treatment of the first step was performed using the adhesive composition obtained in each of Examples and Comparative Examples below under "curing condition" shown in Tables 1 to 7. The degree of curing at the time of heat treatment completion of the first step was determined by measuring, by DSC, the calorific value of the sample at the time of heat treatment completion of the first step and the calorific value of the sample before the heat treatment and calculating based on the following equation. The results are shown in the "Degree of curing" row of Tables 1 to 7.

Degree of curing (%)=[1−(calorific value at the time of heat treatment completion of first step/calorific value before heat treatment)]×100

The numbers of Examples and Comparative Examples below in Tables 1 to 7 are shown in part by weight. Note that the compounded amount of the trade name "SI-150L" was shown in terms of solid content. Furthermore, "−" shown in the compounded amount and curing condition of Tables 1 to 7 indicates that the component was not blended or the curing condition was not employed.

Examples 1 to 15 and Comparative Example 1

Preparation of Anchor Coat Agent

An anchor coat agent was obtained by mixing 50 parts by weight of silane coupling agent shown in "anchor coat agent" of Tables 1 to 3 with 50 parts by weight of propylene glycol monomethyl ether acetate.

Preparation of Adhesive Composition

An adhesive composition was prepared by mixing and dissolving the amounts of the compositions shown in "adhesive composition" of Tables 1 to 3.

Production of Adhesive Sheet

The anchor coat agent shown in Tables 1 to 3 obtained as described above was spin-coated on a silicon plate (size: 2 cm×5 cm; available from SUMCO Corporation; obtained by dicing a silicon wafer having a diameter of 100 mm) and heated at 120° C. for 5 minutes to obtain a silicon plate having a silane coupling agent layer.

On a surface of the silane coupling agent layer of the silicon plate having the silane coupling agent layer, the adhesive composition shown in Tables 1 to 3 obtained as described above was spin-coated, heated at 80° C. for 4 minutes, and then heated at 100° C. for 2 minutes to remove the remained solvent to obtain a silicon plate having the adhesive layer (adhesive layer/anchor coat agent layer/silicon plate). The film thickness of the adhesive layer was from 5 to 6 μm.

Preparation of Laminate

The anchor coat agent shown in Tables 1 to 3 obtained as described above was spin-coated on a glass plate (4 inch, available from SCHOTT Japan Corporation) and heated at 120° C. for 5 minutes to obtain a glass plate having an anchor coat agent layer.

Under reduced pressure, a face of the silane coupling agent layer of the obtained glass plate having the silane coupling agent layer; and a face of the adhesive layer of the silicon plate having the adhesive layer obtained as described above (Production of adhesive sheet) (the silicon plate having the adhesive layer that was stored at room temperature for 24 hours or less or 72 hours after the production) were attached each other, heated at 60° C. while the pressure of 200 g/cm² was applied to adhere, and then cured under "curing condition" of Tables 1 to 3 to obtain a laminate (silicon plate/anchor coat agent layer/adhesive layer/anchor coat agent layer/glass plate).

The evaluation results for the adhesive composition, the adhesive sheet (silicon plate having the adhesive agent), and the laminate obtained in Examples 1 to 15 and Comparative Example 1 are shown in Tables 1 to 3. Note that, for Comparative Example 1, only the heat resistance and the crack resistance were evaluated.

TABLE 1

| | | | Example 1 | Example 2 | Example 3 | Example 4 | Example 5 | Example 6 | Comparative Example 1 |
|---|---|---|---|---|---|---|---|---|---|
| Adhesive composition | Polyorganosilsesquioxane (A) | Comparative Production Example 1 | — | — | — | — | — | — | 100 |
| | | Production Example 4 | 100 | 100 | 100 | 100 | 100 | 100 | — |
| | Polymerization initiator | SI150L | 0.5 | 0.5 | 0.5 | 0.5 | 0.5 | 0.5 | 0.5 |
| | Solvent | PGMEA | 100 | 100 | 100 | 100 | 100 | 100 | 100 |
| Anchor coat agent | Silane coupling agent (D) | KBE-403 | Good | — | — | Good | — | — | Good |
| | | KBM-403 | — | Good | — | — | Good | — | — |
| | | KBM-4803 | — | — | Good | — | — | Good | — |
| | Curing condition | 130° C. → 170° C. | — | — | — | Good | Good | Good | — |
| | | 150° C. → 170° C. | Good | Good | Good | — | — | — | Good |
| | Evaluation | Heat resistance | Good | Good | Good | Good | Good | Good | Good |
| | | Crack resistance | Marginal | Marginal | Marginal | Very good | Very good | Very good | Poor |
| | | Adhesive properties | Good | Good | Good | Good | Good | Good | — |
| | | Tight bonding properties (24 hours or less) | Good | Good | Good | Good | Good | Good | — |
| | | Tight bonding properties (after 72 hours) | Marginal | Marginal | Marginal | Marginal | Marginal | Marginal | — |
| | | Degree of curing | 90% | 90% | 90% | 70% | 70% | 70% | — |

TABLE 2

| | | | Example 7 | Example 8 | Example 9 | Example 10 | Example 11 |
|---|---|---|---|---|---|---|---|
| Adhesive composition | Polyorganosilsesquioxane (A) | Production Example 4 | 50 | 50 | 50 | 50 | 50 |
| | Polymerizable compound (B) | EHPE | 50 | — | — | — | — |
| | | 4004P | — | 50 | — | — | — |

TABLE 2-continued

|  |  |  | Example 7 | Example 8 | Example 9 | Example 10 | Example 11 |
|---|---|---|---|---|---|---|---|
|  |  | 4005P | — | — | 50 | — | — |
|  |  | 4007P | — | — | — | 50 | — |
|  |  | 4010P | — | — | — | — | 50 |
|  | Polymerization initiator | SI150L | 0.5 | 0.5 | 0.5 | 0.5 | 0.5 |
|  | Solvent | PGMEA | 100 | 100 | 100 | 100 | 100 |
| Anchor coat agent | Silane coupling agent (D) | KBE-403 | Good | Good | Good | Good | Good |
|  | Curing condition | 150° C. → 170° C. | Good | Good | Good | Good | Good |
|  | Evaluation | Heat resistance | Good | Good | Good | Good | Good |
|  |  | Crack resistance | Very good | Very good | Very good | Good | Good |
|  |  | Adhesive properties | Good | Good | Good | Good | Good |
|  |  | Tight bonding properties (24 hours or less) | Good | Good | Good | Good | Good |
|  |  | Tight bonding properties (after 72 hours) | Marginal | Marginal | Marginal | Marginal | Marginal |
|  |  | Degree of curing | 90% | 90% | 90% | 90% | 90% |

TABLE 3

|  |  |  | Example 12 | Example 13 | Example 14 | Example 15 |
|---|---|---|---|---|---|---|
| Adhesive composition | Polyorganosilsesquioxane (A) | Production Example 4 | 95 | 95 | 95 | 95 |
|  | Silane coupling agent (D) | KBM-303 | 5 | — | — | — |
|  |  | KBM-403 | — | 5 | — | — |
|  |  | KBE-403 | — | — | 5 | — |
|  |  | KBM-4803 | — | — | — | 5 |
|  | Polymerization initiator | SI150L | 0.5 | 0.5 | 0.5 | 0.5 |
|  | Solvent | PGMEA | 100 | 100 | 100 | 100 |
| Anchor coat agent | Silane coupling agent (D) | KBE-403 | Good | Good | Good | Good |
|  | Curing condition | 150° C. → 170° C. | Good | Good | Good | Good |
|  | Evaluation | Heat resistance | Good | Good | Good | Good |
|  |  | Crack resistance | Good | Very good | Very good | Very good |
|  |  | Adhesive properties | Good | Good | Good | Good |
|  |  | Tight bonding properties (24 hours or less) | Good | Good | Good | Good |
|  |  | Tight bonding properties (after 72 hours) | Marginal | Marginal | Marginal | Marginal |
|  |  | Degree of curing | 90% | 90% | 90% | 90% |

Examples 16 to 19

Preparation of Adhesive Composition

An adhesive composition was prepared by mixing and dissolving the amounts of the compositions shown in "adhesive composition" of Table 4.

Production of Adhesive Sheet

The adhesive composition shown in Table 4 obtained as described above was spin-coated on a silicon plate (size: 2 cm×5 cm; available from SUMCO Corporation; obtained by dicing a silicon wafer having a diameter of 100 mm), heated at 80° C. for 4 minutes, and then heated at 100° C. for 2 minutes to remove the remained solvent to obtain a silicon plate having the adhesive layer (adhesive layer/silicon plate). The film thickness of the adhesive layer was from 5 to 6 μm.

Preparation of Laminate

Under reduced pressure, a glass plate (4 inch, available from SCHOTT Japan Corporation); and a face of the adhesive layer of the silicon plate having the adhesive layer obtained as described above (Production of adhesive sheet) (the silicon plate having the adhesive layer that was stored at room temperature for 24 hours or less or 72 hours after the production) were attached each other, heated at 60° C. while the pressure of 200 g/cm² was applied to adhere, and then cured under "curing condition" of Table 4 to obtain a laminate (silicon plate/adhesive layer/glass plate].

The evaluation results for the adhesive composition, the adhesive sheet (silicon plate having the adhesive agent), and the laminate obtained in Examples 16 to 19 are shown in Table 4.

TABLE 4

| | | | Example 16 | Example 17 | Example 18 | Example 19 |
|---|---|---|---|---|---|---|
| Adhesive composition | Polyorganosilsesquioxane (A) | Production Example 4 | 95 | 95 | 95 | 95 |
| | Silane coupling agent (D) | KBM-303 | 5 | — | — | — |
| | | KBM-403 | — | 5 | — | — |
| | | KBE-403 | — | — | 5 | — |
| | | KBM-4803 | — | — | — | 5 |
| | Polymerization initiator | SI150L | 0.5 | 0.5 | 0.5 | 0.5 |
| | Solvent | PGMEA | 100 | 100 | 100 | 100 |
| | Curing condition | 150° C. → 170° C. | Good | Good | Good | Good |
| | Evaluation | Heat resistance | Good | Good | Good | Good |
| | | Crack resistance | Good | Very good | Very good | Very good |
| | | Adhesive properties | Good | Good | Good | Good |
| | | Tight bonding properties (24 hours or less) | Good | Good | Good | Good |
| | | Tight bonding properties (after 72 hours) | Marginal | Marginal | Marginal | Marginal |
| | | Degree of curing | 90% | 90% | 90% | 90% |

Examples 20 to 26

Anchor coat agents and adhesive compositions were prepared in the same manner as in Examples 1 to 15, except for employing the compositions, the amounts, and the curing conditions shown in Table 5, to obtain adhesive sheets (silicon plates having the adhesive layer (adhesive layer/anchor coat agent layer/silicon plate)); and laminates (silicon plate/anchor coat agent layer/adhesive layer/anchor coat agent layer/glass plate).

The evaluation results for the adhesive composition, the adhesive sheet (silicon plate having the adhesive agent), and the laminate obtained in Examples 20 to 26 are shown in Table 5.

TABLE 5

| | | | Example 20 | Example 21 | Example 22 | Example 23 | Example 24 | Example 25 | Example 26 |
|---|---|---|---|---|---|---|---|---|---|
| Adhesive composition | Polyorganosilsesquioxane (A) | Production Example 4 | 100 | 100 | 100 | 50 | 50 | 95 | 95 |
| | Polymerizable compound (B) | EHPE | — | — | — | 50 | — | — | — |
| | | 4005P | — | — | — | — | 50 | — | — |
| | Silane coupling agent (D) | KBE-403 | — | — | — | — | — | 5 | — |
| | | KBM-4803 | — | — | — | — | — | — | 5 |
| | Polymerization initiator | SI150L | 0.5 | 0.45 | 0.45 | 0.45 | 0.45 | 0.45 | 0.45 |
| | Polymerization stabilizer (C) | SI aid | — | 0.05 | 0.05 | 0.05 | 0.05 | 0.05 | 0.05 |
| | | PEP36 | 0.5 | — | 0.5 | 0.5 | 0.5 | 0.5 | 0.5 |
| | Solvent | PGMEA | 100 | 100 | 100 | 100 | 100 | 100 | 100 |
| Anchor coat agent | Silane coupling agent (D) | KBE-403 | Good | Good | Good | Good | Good | Good | Good |
| | Curing condition | 150° C. → 170° C. | Good | Good | Good | Good | Good | Good | Good |
| | Evaluation | Heat resistance | Good | Good | Good | Good | Good | Good | Good |
| | | Crack resistance | Good | Good | Good | Very good | Very good | Very good | Very good |
| | | Adhesive properties | Good | Good | Good | Good | Good | Good | Good |
| | | Tight bonding properties (24 hours or less) | Good | Good | Good | Good | Good | Good | Good |
| | | Tight bonding properties (after 72 hours) | Good | Good | Good | Good | Good | Good | Good |
| | | Degree of curing | 90% | 90% | 90% | 90% | 90% | 90% | 90% |

Examples 27 to 30

Adhesive compositions were prepared in the same manner as in Examples 16 to 19, except for employing the compositions, the amounts, and the curing conditions shown in Table 6, to obtain adhesive sheets (silicon plates having the adhesive layer (adhesive layer/silicon plate)); and laminates (silicon plate/adhesive layer/glass plate).

The evaluation results for the adhesive composition, the adhesive sheet (silicon plate having the adhesive agent), and the laminate obtained in Examples 27 to 30 are shown in Table 6.

TABLE 6

|  |  |  | Example 27 | Example 28 | Example 29 | Example 30 |
|---|---|---|---|---|---|---|
| Adhesive composition | Polyorganosilsesquioxane (A) | Production Example 4 | 47.5 | 47.5 | 47.5 | 47.5 |
|  | Polymerizable compound (B) | EHPE | 47.5 | — | 47.5 | — |
|  |  | 4004P | — | 47.5 | — | 47.5 |
|  | Silane coupling agent (D) | KBE-403 | 5 | 5 | — | — |
|  |  | KBM-4803 | — | — | 5 | 5 |
|  | Polymerization initiator | SI150L | 0.45 | 0.45 | 0.45 | 0.45 |
|  | Polymerization stabilizer (C) | SI aid | 0.05 | 0.05 | 0.05 | 0.05 |
|  |  | PEP36 | 0.5 | 0.5 | 0.5 | 0.5 |
|  | Solvent | PGMEA | 100 | 100 | 100 | 100 |
|  | Curing condition |  | 150° C. → 170° C. | Good | Good | Good |
|  | Evaluation | Heat resistance | Good | Good | Good | Good |
|  |  | Crack resistance | Very good | Very good | Very good | Very good |
|  |  | Adhesive properties | Good | Good | Good | Good |
|  |  | Tight bonding properties (24 hours or less) | Good | Good | Good | Good |
|  |  | Tight bonding properties (after 72 hours) | Good | Good | Good | Good |
|  |  | Degree of curing | 90% | 90% | 90% | 90% |

Examples 31 to 34

Anchor coat agents and adhesive compositions were prepared in the same manner as in Examples 1 to 15, except for employing the compositions, the amounts, and the curing conditions shown in Table 7, to obtain adhesive sheets (silicon plates having the adhesive layer (adhesive layer/anchor coat agent layer/silicon plate)); and laminates (silicon plate/anchor coat agent layer/adhesive layer/anchor coat agent layer/glass plate).

The evaluation results for the adhesive composition, the adhesive sheet (silicon plate having the adhesive agent), and the laminate obtained in Examples 31 to 34 are shown in Table 7.

TABLE 7

|  |  |  | Example 31 | Example 32 | Example 33 | Example 34 |
|---|---|---|---|---|---|---|
| Adhesive composition | Polyorganosilsesquioxane (A) | Production Example 4 | 47.5 | 47.5 | 47.5 | 47.5 |
|  | Polymerizable compound (B) | EHPE | 47.5 | 47.5 | 47.5 | 47.5 |

TABLE 7-continued

|  |  |  | Example 31 | Example 32 | Example 33 | Example 34 |
|---|---|---|---|---|---|---|
|  | Silane coupling agent (D) | KBE-403 | 5 | — | 5 | — |
|  |  | KBM-4803 | — | 5 | — | 5 |
|  | Polymerization initiator | SI150L | 0.45 | 0.45 | 0.45 | 0.45 |
|  | Polymerization stabilizer (C) | SI aid | 0.05 | 0.05 | 0.05 | 0.05 |
|  |  | PEP36 | 0.5 | 0.5 | 0.5 | 0.5 |
|  | Solvent | PGMEA | 100 | 100 | 100 | 100 |
| Anchor coat agent | Silane coupling agent (D) | KBE-403 | Good | Good | Good | Good |
|  | Curing condition | 130° C. → 170° C. | — | — | Good | Good |
|  |  | 150° C. → 170° C. | Good | Good | — | — |
|  | Evaluation | Heat resistance | Good | Good | Good | Good |
|  |  | Crack resistance | Very good | Very good | Very good | Very good |
|  |  | Adhesive properties | Good | Good | Good | Good |
|  |  | Tight bonding properties (24 hours or less) | Good | Good | Good | Good |
|  |  | Tight bonding properties (after 72 hours) | Good | Good | Good | Good |
|  |  | Degree of curing | 90% | 90% | 70% | 70% |

Note that the abbreviations in Tables 1 to 7 shows the following compounds.

Polyorganosilsesquioxane (A)

Comparative Production Example 1: the polyorganosilsesquioxane obtained in Comparative Production Example 1

Production Example 4: the epoxy group-containing polyorganosilsesquioxane 3 obtained in Production Example 4

Polymerizable Compound (B)

EHPE: 1,2-epoxy-4-(2-oxiranyl)cyclohexane adduct of 2,2-bis(hydroxymethyl)-1-butanol (trade name "EHPE3150", available from Daicel Corporation); weight average molecular weight: 2400; epoxy equivalent weight: 177

4004P: glycidyl etherified modified product of a phenol-formaldehyde polycondensation product or alkyl (C=1-9) phenol-formaldehyde polycondensation product modified by 2-methylepichlorohydrin or epichlorohydrin (trade name "jER 4004P", available from Mitsubishi Chemical Corporation); weight average molecular weight: 5000; epoxy equivalent weight: 840 to 975

4005P: glycidyl etherified modified product of a phenol-formaldehyde polycondensation product or alkyl (C=1-9) phenol-formaldehyde polycondensation product modified by 2-methylepichlorohydrin or epichlorohydrin (trade name "jER 4005P", available from Mitsubishi Chemical Corporation); weight average molecular weight: 6200; epoxy equivalent weight: 950 to 1200

4007P: glycidyl etherified modified product of a phenol-formaldehyde polycondensation product or alkyl (C=1-9) phenol-formaldehyde polycondensation product modified by 2-methylepichlorohydrin or epichlorohydrin (trade name "jER 4007P", available from Mitsubishi Chemical Corporation); weight average molecular weight: 20000; epoxy equivalent weight: 2000 to 2500

4010P: glycidyl etherified modified product of a phenol-formaldehyde polycondensation product or alkyl (C=1-9) phenol-formaldehyde polycondensation product modified by 2-methylepichlorohydrin or epichlorohydrin (trade name "jER 4010P", available from Mitsubishi Chemical Corporation); weight average molecular weight: 45000; epoxy equivalent weight: 3800 to 4600

Polymerization Stabilizer (C)

SI aid: (4-hydroxyphenyl)dimethylsulfonium methylsulfite (trade name "San-Aid SI aid", available from Sanshin Chemical Industry Co., Ltd.)

PEP-36: 3,9-bis(2,6-di-t-butyl-4-methylphenoxy)-2,4,8,10-tetraoxa-3,9-diphosphaspiro[5.5]undecane (trade name "ADK STAB PEP-36", available from Adeka Corporation)

Silane Coupling Agent (D)

KBM-303: 2-(3,4-epoxycyclohexyl)ethyltrimethoxysilane (trade name "KBM-303", available from Shin-Etsu Chemical Co., Ltd.)

KBM-403: 3-glycidoxypropyltrimethoxysilane (trade name "KBM-403", available from Shin-Etsu Chemical Co., Ltd.)

KBE-403: 3-glycidoxypropyltriethoxysilane (trade name "KBE-403", available from Shin-Etsu Chemical Co., Ltd.)

KBM-4803: 3-glycidoxyoctyltriethoxysilane (trade name "KBM-4803", available from Shin-Etsu Chemical Co., Ltd.)

Polymerization Initiator

SI-150L: antimony-based sulfonium salt (trade name "SI-150L", available from Sanshin Chemical Industry Co., Ltd.), thermal curing time at 130° C. for a composition obtained by adding 1 part by weight per 100 parts by weight of CEL-LOXIDE 2021P (available from Daicel Corporation): 5.4 minutes Solvent PGMEA: propylene glycol monomethyl ether acetate Variations of embodiments of the present invention described above are additionally described below.

[1] A curable composition for adhesive agents, the curable composition containing a polyorganosilsesquioxane (A) having a constituent unit represented by Formula (1) below:

[Chemical Formula 40]

[R¹SiO₃/₂]     (1)

in Formula (1), R¹ represents an ionic polymerizable functional group-containing group;
a constituent unit represented by Formula (1):

[Chemical Formula 41]

[RᵃSiO₃/₂]     (I)

in Formula (I), Rᵃ represents an ionic polymerizable functional group-containing group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom;
a constituent unit represented by Formula (II):

[Chemical Formula 42]

[Rᵇ Si₂/₂(ORᶜ)]     (II)

in Formula (II), Rᵇ represents an ionic polymerizable functional group-containing group, a substituted or unsubstituted aryl group, a substituted or unsubstituted aralkyl group, a substituted or unsubstituted cycloalkyl group, a substituted or unsubstituted alkyl group, a substituted or unsubstituted alkenyl group, or a hydrogen atom, and Rᶜ represents a hydrogen atom or an alkyl group having from 1 to 4 carbons; and;
a constituent unit represented by Formula (4):

[Chemical Formula 43]

[R¹SiO₂/₂(ORᶜ)]     (4)

in Formula (4), R¹ is synonymous with R¹ in Formula (1), and Rᶜ is synonymous with Rᶜ in Formula (II); wherein
a molar ratio of the constituent unit represented by Formula (1) to the constituent unit represented by Formula (II), [(the constituent unit represented by Formula (I))/(the constituent unit represented by Formula (II))] is from 20 to 500,
and a proportion of the constituent unit represented by Formula (1) and the constituent unit represented by Formula (4) is from 55 to 100 mol % relative to a total amount (100 mol %) of siloxane constituent units,
a number average molecular weight is from 2500 to 50000; and
a molecular weight dispersity (weight average molecular weight/number average molecular weight) is from 1.0 to 4.0.

[2] The curable composition for adhesive agents described in [1] above, where the ionic polymerizable functional group is at least one type selected from the group consisting of an epoxy group, an oxetane group, a vinyl ether group, and a vinylphenyl group.

[3] The curable composition for adhesive agents described in [1] or [2] above, where the ionic polymerizable functional group is an epoxy group.

[4] The curable composition for adhesive agents described in any one of [1] to [3] above, where R¹ is a group represented by Formula (1a) below:

[Chemical Formula 44]

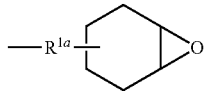     (1a)

in Formula (1a), R¹ᵃ represents a linear or branched alkylene group (preferably an ethylene group or a trimethylene group and more preferably an ethylene group);
a group represented by Formula (1b) below:

[Chemical Formula 45]

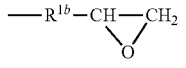     (1b)

in Formula (1b), R¹ᵇ represents a linear or branched alkylene group (preferably an ethylene group or a trimethylene group and more preferably a trimethylene group);
a group represented by Formula (1c) below:

[Chemical Formula 46]

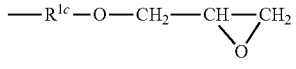     (1c)

in Formula (1c), R¹ᶜ represents a linear or branched alkylene group (preferably an ethylene group or a trimethylene group and more preferably a trimethylene group); or
a group represented by Formula (1d) below:

[Chemical Formula 47]

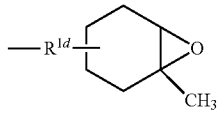     (1d)

in Formula (1d), R¹ᵈ represents a linear or branched alkylene group (preferably an ethylene group or a trimethylene group and more preferably an ethylene group).

[5] The curable composition for adhesive agents described in any one of [1] to [4] above, where R¹ is a group represented by Formula (1a) above in which R¹ is an ethylene group (in particular, 2-(3',4'-epoxycyclohexyl)ethyl group).

[6] The curable composition for adhesive agents described in any one of [1] to [5] above, where the polyorganosilsesquioxane (A) further contains a constituent unit represented by Formula (2) below:

[Chemical Formula 48]

$$[R^2SiO_{3/2}] \quad (2)$$

in Formula (2), $R^2$ represents a substituted or unsubstituted aryl group, a substituted or unsubstituted aralkyl group, a substituted or unsubstituted cycloalkyl group, a substituted or unsubstituted alkyl group, or a substituted or unsubstituted alkenyl group.

[7] The curable composition for adhesive agents described in [6] above, where $R^2$ is a substituted or unsubstituted aryl group (preferably a phenyl group).

[8] The curable composition for adhesive agents described in any one of [1] to [7] above, where a lower limit of the ratio of the constituent unit (T3 form) represented by Formula (I) above to the constituent unit (T2 form) represented by Formula (II) above (T3 form/T2 form) is 21 (preferably 23 and more preferably 25).

[9] The curable composition for adhesive agents described in any one of [1] to [8] above, where an upper limit of the ratio (T3 form/T2 form) is 100 (preferably 50 and more preferably 40).

[10] The curable composition for adhesive agents described in any one of [1] to [9] above, where the proportion (total amount) of the constituent unit represented by Formula (1) above and the constituent unit represented by Formula (4) above relative to the total amount (100 mol %) of siloxane constituent units of the polyorganosilsesquioxane (A) is from 65 to 100 mol % (preferably from 80 to 99 mol %).

[11] The curable composition for adhesive agents described in any one of [1] to [10] above, where the proportion (total amount) of the constituent unit represented by Formula (2) above and the constituent unit represented by Formula (5) above relative to the total amount (100 mol %) of siloxane constituent units of the polyorganosilsesquioxane (A) is from 0 to 70 mol % (preferably from 0 to 60 mol %, more preferably from 0 to 40 mol %, and particularly preferably from 1 to 15 mol %).

[12] The curable composition for adhesive agents described in any one of [1] to [11] above, where the proportion (total amount) of the constituent unit represented by Formula (1) above, the constituent unit represented by Formula (2) above, the constituent unit represented by Formula (4) above, and the constituent unit represented by Formula (5) above relative to the total amount (100 mol %) of siloxane constituent units of the polyorganosilsesquioxane (A) is from 60 to 100 mol % (preferably from 70 to 100 mol % and more preferably from 80 to 100 mol %).

[13] The curable composition for adhesive agents described in any one of [1] to [12] above, where the number average molecular weight (Mn) of the polyorganosilsesquioxane (A) is from 2800 to 10000 (preferably from 3000 to 8000).

[14] The curable composition for adhesive agents described in any one of [1] to [13] above, where the molecular weight dispersity (Mw/Mn) of the polyorganosilsesquioxane (A) is from 1.1 to 3.0 (preferably from 1.2 to 2.5).

[15] The curable composition for adhesive agents described in any one of [1] to [14] above, where a 5% weight loss temperature ($T_{d5}$) in air atmosphere is 330° C. or higher (for example, from 330 to 450° C., preferably 340° C. or higher, and more preferably 350° C. or higher).

[16] The curable composition for adhesive agents described in any one of [1] to [15] above, where the content (blended amount) of the polyorganosilsesquioxane (A) is 70 wt. % or greater and less than 100 wt. % (preferably from 80 to 99.8 wt. % and more preferably from 90 to 99.5 wt. %) relative to a total amount (100 wt. %) of the curable composition for adhesive agents excluding the solvent.

[17] The curable composition for adhesive agents described in any one of [1] to [16] above, the proportion of the polyorganosilsesquioxane (A) to a total amount (100 wt. %) of the polymerizable compounds contained in the curable composition for adhesive agents is from 30 to 100 wt. % (preferably from 35 to 98 wt. % and more preferably from 40 to 95 wt. %).

[18] The curable composition for adhesive agents described in any one of [1] to [17] above, further containing a polymerization initiator.

[19] The curable composition for adhesive agents described in [18] above, wherein the polymerization initiator is a cationic polymerization initiator or an anionic polymerization initiator.

[20] The curable composition for adhesive agents described in [19] above, where the cationic polymerization initiator is a polymerization initiator that achieves a thermal curing time at 130° C. of 3.5 minutes or longer (for example, from 3.5 to 7.0 minutes and preferably from 4.5 to 6.0 minutes) for a composition obtained by adding 1 part by weight of the cationic polymerization initiator per 100 parts by weight of 3,4-epoxycyclohexylmethyl(3',4'-epoxy)cyclohexanecarboxylate.

[21] The curable composition for adhesive agents described in [19] or [20] above, where the anionic polymerization initiator is a polymerization initiator that achieves a thermal curing time (in accordance with JIS K 5909:1994) at 130° C. of 3.5 minutes or longer for a composition obtained by adding 1 part by weight of the anionic polymerization initiator per 100 parts by weight of bisphenol A diglycidylether.

[22] The curable composition for adhesive agents described in any one of [18] to [21] above, where the polymerization initiator is a cationic polymerization initiator (particularly preferably a thermal cationic polymerization initiator and most preferably an arylsulfonium salt).

[23] The curable composition for adhesive agents described in any one of [18] to [22] above, where a content (blended amount) of the polymerization initiator is from 0.01 to 3.0 parts by weight (preferably from 0.05 to 3.0 parts by weight, more preferably from 0.1 to 1.0 part by weight, and particularly preferably from 0.3 to 0.8 parts by weight) per 100 parts by weight of the polyorganosilsesquioxane (A) (in the case where the polymerizable compound (B) described below and/or the silane coupling agent (D) described below is contained, the total amount of the polyorganosilsesquioxane (A) and the polymerizable compound (B) and/or the silane coupling agent (D)).

[24] The curable composition for adhesive agents described in any one of [1] to [23] above, further containing a compound (B) except the polyorganosilsesquioxane (A), the compound (B) having an ionic polymerizable functional group (hereinafter, also simply referred to as "polymerizable compound (B)").

[25] The curable composition for adhesive agents described in [24] above, where the ionic polymerizable functional group of the compound (B) is at least one type selected from the group consisting of an epoxy ring, an oxetane ring, a vinyl ether group, and a vinylphenyl group (preferably an epoxy group).

[26] The curable composition for adhesive agents described in [24] or [25] above, where the number of the ionic polymerizable functional group contained in a molecule of the polymerizable compound (B) is from 1 to 50 (preferably from 1 to 30 and more preferably from 2 to 20).

[27] The curable composition for adhesive agents described in any one of [24] to [26] above, where a molecular weight of the polymerizable compound (B) (in the case of high molecular weight compound, weight average molecular weight) is from 200 to 500000 (preferably from 300 to 100000).

[28] The curable composition for adhesive agents described in any one of [24] to [27] above, where the ionic polymerizable functional group of the polymerizable compound (B) is from 100 to 100000 (preferably from 150 to 50000).

[29] The curable composition for adhesive agents described in any one of [24] to [28] above, where the polymerizable compound (B) having an epoxy ring is at least one type selected from the group consisting of alicyclic epoxy compounds, aromatic epoxy compounds, and aliphatic epoxy compounds (preferably alicyclic epoxy compounds).

[30] The curable composition for adhesive agents described in [29] above, where the alicyclic epoxy compound is at least one type selected from the group consisting of (1) a compound having an epoxy group (referred to as an "alicyclic epoxy group") formed from two adjacent carbon atoms and an oxygen atom that constitute an alicyclic ring in a molecule; (2) a compound in which an epoxy group is directly bonded to an alicyclic ring with a single bond; and (3) a compound having an alicyclic ring and a glycidyl ether group in a molecule (a glycidyl ether type epoxy compound).

[31] The curable composition for adhesive agents described in [30] above, the compound (1) having an alicyclic epoxy group in the molecule is a compound represented by Formula (i) below:

[Chemical Formula 49]

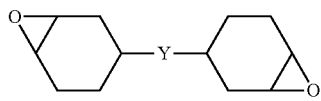
(i)

in Formula (i) above, Y represents a single bond or a linking group (a divalent group having one or more atoms).

[32] The curable composition for adhesive agents described in [31] above, where the alicyclic epoxy compound represented by Formula (i) above is at least one type selected from the group consisting of (3,4,3',4'-diepoxy) bicyclohexyl, 2,2-bis(3,4-epoxycyclohexyl)propane, 1,2-bis(3,4-epoxycyclohexyl)ethane, 2,3-bis(3,4-epoxycyclohexyl) oxirane, bis(3,4-epoxycyclohexylmethyl)ether, and compounds represented by Formulas (i-1) to (i-10) below:

[Chemical Formula 50]

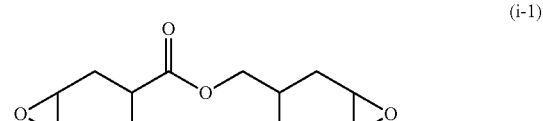
(i-1)

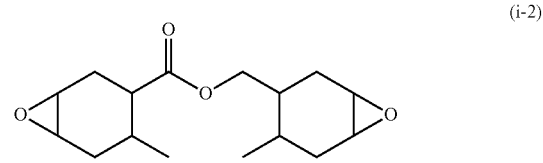
(i-2)

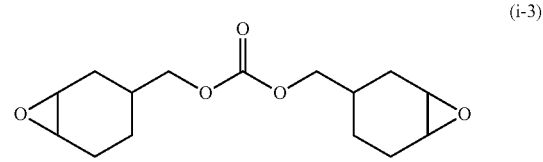
(i-3)

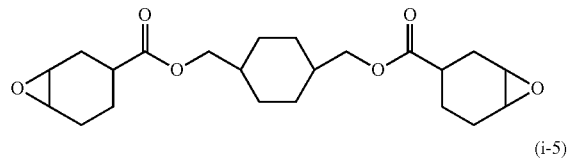
(i-4)

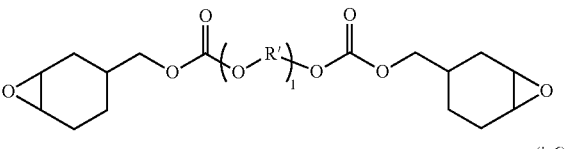
(i-5)

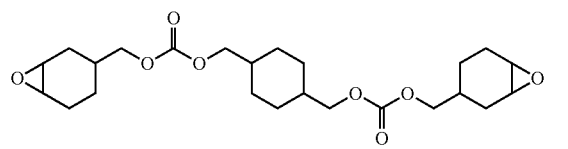
(i-6)

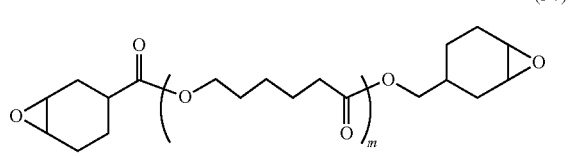
(i-7)

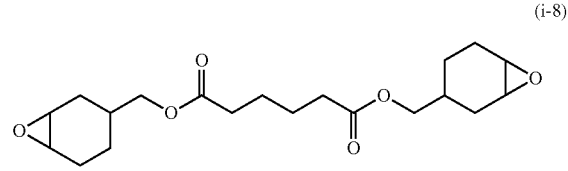
(i-8)

[Chemical Formula 51]

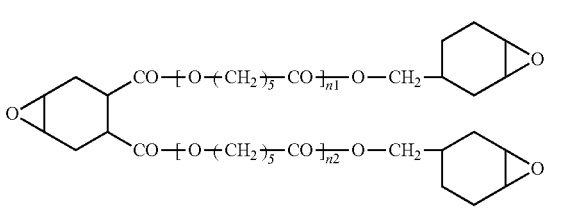
(i-9)

(i-10)

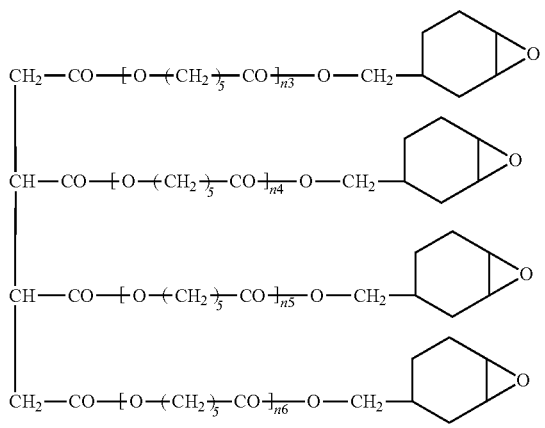

in Formulas (i-5) and (i-7) above, 1 and m each represent an integer of 1 to 30; R' in Formula (i-5) above represents an alkylene group having from 1 to 8 carbons; and in Formulas (i-9) and (i-10) above, n1 to n6 each represent an integer of 1 to 30.

[33] The curable composition for adhesive agents described in any one of [30] to [32] above, where the compound (2) in which an epoxy group is directly bonded to an alicyclic ring with a single bond is a compound represented by Formula (ii) below:

[Chemical Formula 52]

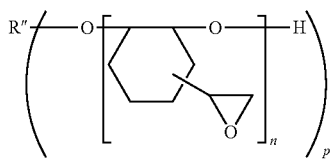
(ii)

in Formula (ii), R'' is a group resulting from elimination of p hydroxyl groups (—OH) from a structural formula of a p-hydric alcohol (p-valent organic group), where p and n each represent a natural number, and in the case where p is 2 or greater, n in each group in parentheses (in the outer parentheses) may be the same or different.

[34] The curable composition for adhesive agents described in any one of [24] to [33] above, where the polymerizable compound (B) is a compound having an epoxy ring (preferably an alicyclic epoxy compound or an aromatic epoxy compound; more preferably a compound in which an epoxy group is directly bonded to an alicyclic ring through a single bond, an epi-bis type glycidyl ether type epoxy resin, or a novolac alkyl type glycidyl ether type epoxy resin; and particularly preferably a compound represented by Formula (ii) above, a bisphenol A-type epoxy resin, a bisphenol F-type epoxy resin, or a glycidyl etherified modified product of a phenol-formaldehyde polycondensation product or $C_{1-9}$ alkylphenol-formaldehyde polycondensation product modified by 2-methylepichlorohydrin or epichlorohydrin.

[35] The curable composition for adhesive agents described in any one of [24] to [34] above, where the content (blended amount) of the polymerizable compound (B) is from 15 to 65 wt. % (preferably from 20 to 60 wt. % and more preferably from 30 to 55 wt. %) relative to the total amount (100 wt. %; the total amount of the curable compound) of the polyorganosilsesquioxane (A) and the polymerizable compound (B).

[36] The curable composition for adhesive agents described in any one of [24] to [35] above, where the content (blended amount) of the polymerizable compound (B) having an epoxy ring is from 10 to 70 wt. % (preferably from 15 to 65 wt. % and more preferably from 25 to 60 wt. %) relative to the total amount (100 wt. %; the total amount of the polymerizable compound) of the polyorganosilsesquioxane (A) and the polymerizable compound (B).

[37] The curable composition for adhesive agents described in any one of [1] to [36] above, further containing a polymerization stabilizer (C).

[38] The curable composition for adhesive agents described in [37] above, where the polymerization stabilizer (C) is at least one type selected from the group consisting of hindered amine-based compounds, sulfonium sulfate-based compounds, and phosphite-based compounds (preferably sulfonium sulfate-based compounds and phosphite-based compounds).

[39] The curable composition for adhesive agents described in [37] or [38] above, where a content (blended amount) of the polymerization stabilizer (C) is 0.005 parts by weight or greater (preferably from 0.01 to 10 parts by weight and more preferably from 0.02 to 1 part by weight) per 100 parts by weight of the polyorganosilsesquioxane (A) (in the case where the polymerizable compound (B) is contained, the total amount of the polyorganosilsesquioxane (A) and the polymerizable compound (B)).

[40] The curable composition for adhesive agents described in any one of [37] to [39] above, where, in the case where the polymerization stabilizer (C) and the polymerization initiator are contained in the curable composition for adhesive agents, the content (blended amount) of the polymerization stabilizer (C) is 1 part by weight or greater (preferably from 3 to 200 parts by weight and particularly preferably from 5 to 150 parts by weight) per 100 parts by weight of the polymerization initiator.

[41] The curable composition for adhesive agents described in any one of [1] to [40] above, further containing a silane coupling agent (D).

[42] The curable composition for adhesive agents described in [41] above, where the silane coupling agent (D) contains a compound represented by Formula (X) below:

[Chemical Formula 53]

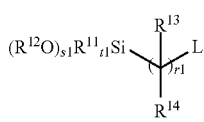
(X)

in Formula (X), r1 represents an integer of 4 to 20, L represents a group containing at least one group selected from the group consisting of an epoxy group, an oxetanyl group, and a vinyl ether group, $R^{11}$ and $R^{12}$ each represent a hydrocarbon group that may have a substituent, s1 represents an integer of 1 to 3, t1 represents an integer of 0 to 2, s1+t1 is 3, and $R^{13}$ and $R^{14}$ each represent a hydrogen atom or a hydrocarbon group that may have a substituent.

[43] The curable composition for adhesive agents described in [42] above, where, in Formula (X) above, r1 is an integer of 5 to 15 (preferably an integer of 6 to 12).

[44] The curable composition for adhesive agents described in [42] or [43] above, where the hydrocarbon group that may have a substituent is a linear or branched alkyl group having from 1 to 10 carbons.

[45] The curable composition for adhesive agents described in any one of [42] to [44] above, where the silane coupling agent (D) contains at least one type of an epoxy group-containing silane compound selected from the group consisting of compounds represented by Formula (X1) below:

[Chemical Formula 54]

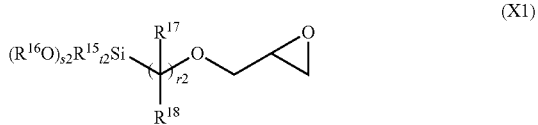

in Formula (X1), r2 represents an integer of 4 to 20, $R^{15}$ and $R^{16}$ each represent a hydrocarbon group that may have a substituent, s2 represents an integer of 1 to 3, t2 represents an integer of 0 to 2, s2+t2 is 3, and $R^{17}$ and $R^{18}$ each represent a hydrogen atom or a hydrocarbon group that may have a substituent; and
compounds represented by Formula (X2) below:

[Chemical Formula 55]

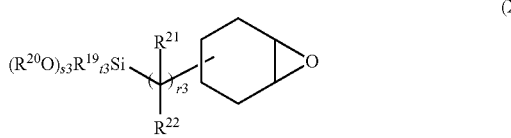

in Formula (X2), r3 represents an integer of 4 to 20, $R^{19}$ and $R^{20}$ each represent a hydrocarbon group that may have a substituent, s3 represents an integer of 1 to 3, t3 represents an integer of 0 to 2, s3+t3 is 3, and $R^{21}$ and $R^{22}$ each represent a hydrogen atom or a hydrocarbon group that may have a substituent.

[46] The curable composition for adhesive agents described in [45] above, where, in Formula (X1) above, r2 is an integer of 5 to 15 (preferably an integer of 6 to 12).

[47] The curable composition for adhesive agents described in [45] or [46] above, where the compound represented by Formula (X1) above is at least one type selected from the group consisting of 6-glycidoxyhexyltrimethoxysilane, 6-glycidoxyhexylmethyldimethoxysilane, 6-glycidoxyhexyltriethoxysilane, 6-glycidoxyhexylmethyldiethoxysilane, 8-glycidoxyoctyltrimethoxysilane, 8-glycidoxyoctylmethyldimethoxysilane, 8-glycidoxyoctyltriethoxysilane, and 8-glycidoxyoctylmethyldiethoxysilane.

[48] The curable composition for adhesive agents described in any one of [45] to [47] above, where, in Formula (X2) above, r3 is an integer of 5 to 15 (preferably an integer of 6 to 12).

[49] The curable composition for adhesive agents described in any one of [45] to [48] above, where the compound represented by Formula (X2) above is at least one type selected from the group consisting of 6-(3,4-epoxycyclohexyl)hexyltrimethoxysilane, 6-(3,4-epoxycyclohexyl)hexylmethyldimethoxysilane, 6-(3,4-epoxycyclohexyl)hexyltriethoxysilane, 6-(3,4-epoxycyclohexyl)hexylmethyldiethoxysilane, 8-(3,4-epoxycyclohexyl)octyltrimethoxysilane, 8-(3,4-epoxycyclohexyl)octylmethyldimethoxysilane, 8-(3,4-epoxycyclohexyl)octyltriethoxysilane, and 8-(3,4-epoxycyclohexyl)octylmethyldiethoxysilane.

[50] The curable composition for adhesive agents described in any one of [41] to [49] above, where the used amount of the silane coupling agent (D) is from 0 to 10 parts by weight per 100 parts by weight of the polymerizable compound contained in the curable composition for adhesive agents (in the case where the polyorganosilsesquioxane (A) or the polymerizable compound (B) is contained, the total amount of the polyorganosilsesquioxane (A) and the polymerizable compound (B)) (the upper limit thereof is preferably 9 parts by weight, particularly preferably 7 parts by weight, and most preferably 6 parts by weight; the lower limit thereof is preferably 0.005 parts by weight and particularly preferably 0.01 parts by weight).

[51] The curable composition for adhesive agents described in any one of [42] to [50] above, where the content (blended amount) of the silane coupling agent of the compound represented by Formula (X) is from 0.01 to 10 parts by weight (preferably from 0.1 to 7 parts by weight and more preferably from 0.5 to 6 parts by weight) per 100 parts by weight of the polyorganosilsesquioxane (A) (in the case where the polymerizable compound (B) is contained, the total amount of the polyorganosilsesquioxane (A) and the polymerizable compound (B)).

[52] A cured article of the curable composition for adhesive agents described in any one of [1] to [51] above.

[53] A cured article obtained by subjecting the curable composition for adhesive agents described in any one of [1] to [51] above to heat treatment in which a curing temperature is changed stepwisely, the heat treatment being a heat treatment in which a degree of curing at a time of heat treatment completion of a first step is 85% or less and the degree of curing is made greater than 85% by heat treatment of a second step or later.

[54] The cured article described in [53] above, where the degree of curing at the time of heat treatment completion of the first step is from 50 to 85% (preferably from 55 to 85% and more preferably from 60 to 80%)

[55] The cured article described in [53] or [54] above, where the degree of curing is made 90% or greater (preferably 95% or greater) by the heat treatment of the second step or later.

[56] The cured article described in any one of [52] to [55] above, where the pyrolysis temperature is 200° C. or higher (for example, from 200 to 500° C., preferably 260° C. or higher, and more preferably 300° C. or higher).

[57] An adhesive sheet comprising a substrate and an adhesive layer on at least one face of the substrate, the adhesive layer being a layer of the curable composition for adhesive agents described in any one of [1] to [51] above.

[58] An adhesive sheet comprising a substrate and, on at least one face of the substrate, an adhesive layer and an anchor coat layer containing a silane coupling agent (D), the adhesive layer being provided on a surface of the anchor coat layer, the adhesive layer being a layer of the curable composition for adhesive agents described in any one of [1] to [51] above.

[59] The adhesive sheet described in [58] above, where a content (blended amount) of the silane coupling agent (D) in the anchor coat layer is 90 wt. % or greater (preferably 95 wt. % or greater) relative to the weight (100 wt. %) of the anchor coat layer.

[60] The adhesive sheet described in [58] or [59] above, where the content (blended amount) of the polyorganosilsesquioxane (A) in the curable composition for adhesive agents is 70 wt. % or greater (preferably 80 wt. % or greater and more preferably 90 wt. % or greater) relative to the total amount (100 wt. %) of the curable composition for adhesive agents excluding the solvent.

[61] The adhesive sheet described in any one of [57] to [60] above, where a thickness of the substrate is from 1 to 10000 μm.

[62] The adhesive sheet described in any one of [57] to [61] above, where a thickness of the adhesive layer is from 0.1 to 10000 μm.

[63] The adhesive sheet described in any one of [58] to [62] above, where a thickness of the anchor coat layer is from 0.001 to 10000 μm.

[64] The adhesive sheet described in any one of [58] to [63] above, where the silane coupling agent (D) contains a compound represented by Formula (X) below:

[Chemical Formula 56]

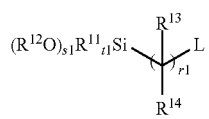

(X)

in Formula (X), r1 represents an integer of 4 to 20, L represents a group containing at least one group selected from the group consisting of an epoxy group, an oxetanyl group, and a vinyl ether group, $R^{11}$ and $R^{12}$ each represent a hydrocarbon group that may have a substituent, s1 represents an integer of 1 to 3, t1 represents an integer of 0 to 2, s1+t1 is 3, and $R^{13}$ and $R^{14}$ each represent a hydrogen atom or a hydrocarbon group that may have a substituent.

[65] The adhesive sheet described in any one of [58] to [64] above, where the silane coupling agent (D) contains at least one type of an epoxy group-containing silane compound selected from the group consisting of compounds represented by Formula (X1) below:

[Chemical Formula 57]

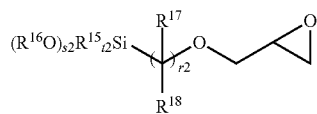

(X1)

in Formula (X1), r2 represents an integer of 4 to 20, $R^{15}$ and $R^{16}$ each represent a hydrocarbon group that may have a substituent, s2 represents an integer of 1 to 3, t2 represents an integer of 0 to 2, s2+t2 is 3, and $R^{17}$ and $R^{18}$ each represent a hydrogen atom or a hydrocarbon group that may have a substituent; and compounds represented by Formula (X2) below:

[Chemical Formula 58]

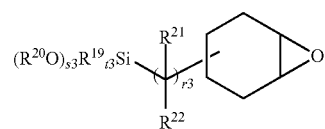

(X2)

in Formula (X2), r3 represents an integer of 4 to 20, $R^{19}$ and $R^{20}$ each represent a hydrocarbon group that may have a substituent, s3 represents an integer of 1 to 3, t3 represents an integer of 0 to 2, s3+t3 is 3, and $R^{21}$ and $R^{22}$ each represent a hydrogen atom or a hydrocarbon group that may have a substituent.

[66] A laminate, where an adhered layer is adhered on the adhesive layer of the adhesive sheet described in any one of [57] to [65] above.

[67] A laminate formed from three or more layers, the laminate comprising two adhered layers and an adhesive layer between the adhered layers, and the adhesive layer being a layer of a cured article of the curable composition for adhesive agents described in any one of [1] to [51] above.

[68] The laminate described in [66] or [67] above, where a thickness of the adhered layer is from 1 to 100000 μm.

[69] The laminate described in any one of [66] to [68] above, where a thickness of the adhesive layer is from 0.1 to 10000 μm.

[70] A device having the laminate described in any one of [66] to [69] above.

INDUSTRIAL APPLICABILITY

The curable composition for adhesive agents according to an embodiment of the present invention cures at a low temperature and can form a cured article having excellent heat resistance, crack resistance, and adhesive properties and tight bonding properties for adhereds. Therefore, the curable composition is useful as an adhesive agent used for laminating semiconductors, for adhering electronic components, or the like.

REFERENCE SIGNS LIST

A Region with almost no weight change
B Region with rapid decrease of weight

The invention claimed is:

1. An adhesive layer comprising a curable composition, the curable composition comprising a polyorganosilsesquioxane comprising:
a constituent unit represented by Formula (I):

[$R^a SiO_{3/2}$] (I)

wherein $R^a$ is selected from:
an unsubstituted phenyl group;
a group represented by Formula (1a):

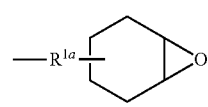

(1a)

wherein $R^{1a}$ represents an ethylene group; and
a group represented by Formula (1d):

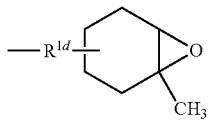 (1d)

wherein $R^{1d}$ represents an ethylene group;
wherein at least one constituent unit represented by Formula (I) has $R^a$ as the group represented by Formula (1a) or the group represented by Formula (1d);
a constituent unit represented by Formula (II):

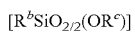 (II)

wherein $R^b$ is selected from:
an unsubstituted phenyl group;
a group represented by Formula (1a):

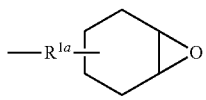 (1a)

wherein $R^{1a}$ represents an ethylene group; and
a group represented by Formula (1d):

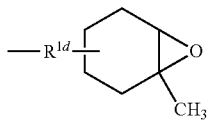 (1d)

wherein $R^{1d}$ represents an ethylene group; and
$R^c$ represents a hydrogen atom or an alkyl group having from 1 to 4 carbons; and
wherein at least one constituent unit represented by Formula (II) has $R^b$ as the group represented by Formula (1a) or the group represented by Formula (1d);
wherein a molar ratio of the constituent unit represented by Formula (I) to the constituent unit represented by Formula (II), (the constituent unit represented by Formula (I))/(the constituent unit represented by Formula (II)), is from 20 to 21,
wherein a proportion of the constituent unit represented by Formula (I) having $R^a$ as the group represented by Formula (1a) or the group represented by Formula (1d) and the constituent unit represented by Formula (II) having $R^b$ as the group represented by Formula (1a) or the group represented by Formula (1d) is from 95 to 99 mol % relative to a total amount (100 mol %) of siloxane constituent units,
wherein a proportion of the constituent unit represented by Formula (I) having $R^a$ as an unsubstituted phenyl group and the constituent unit represented by Formula (II) having $R^b$ as an unsubstituted phenyl group is from 1 to 5 mol % relative to a total amount (100 mol %) of siloxane constituent units,
wherein a number average molecular weight is from 3000 to 8000,
wherein a molecular weight dispersity, (weight average molecular weight/number average molecular weight), is from 2.14 to 2.5,
wherein a content of the polyorganosilsesquioxane is 90 wt. % or greater but less than 100 wt. %, relative to a total amount of the curable composition excluding a solvent, and
the curable composition further comprises a polymerization stabilizer,
wherein the polymerization stabilizer comprises a sulfonium sulfate-based compound.

2. The adhesive layer according to claim 1, the curable composition further comprising a polymerization initiator.

3. The adhesive layer according to claim 1, the curable composition further comprising a compound having an ionic polymerizable functional group except the polyorganosilsesquioxane.

4. The adhesive layer according to claim 3, wherein the ionic polymerizable functional group of the compound is at least one selected from the group consisting of an epoxy ring, an oxetane ring, a vinyl ether group, and a vinylphenyl group.

5. The adhesive layer according to claim 1, the curable composition further comprising a silane coupling agent.

6. The adhesive layer according to claim 5, wherein the silane coupling agent contains a compound represented by Formula (X):

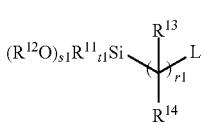 (X)

in Formula (X), r1 represents an integer from 4 to 20, L represents a group containing at least one group selected from the group consisting of an epoxy group, an oxetanyl group, and a vinyl ether group, $R^{11}$ and $R^{12}$ each represent a hydrocarbon group that may have a substituent, s1 represents an integer from 1 to 3, t1 represents an integer from 0 to 2, s1+t1 is 3, and $R^{13}$ and $R^{14}$ each represent a hydrogen atom or a hydrocarbon group that may have a substituent.

7. The adhesive layer according to claim 5, wherein the silane coupling agent contains at least one of an epoxy group-containing silane compound selected from the group consisting of compounds represented by Formula (X1):

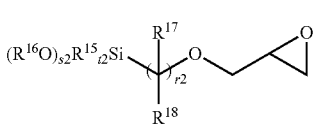 (X1)

in Formula (X1), r2 represents an integer from 4 to 20, $R^{15}$ and $R^{16}$ each represent a hydrocarbon group that may have a substituent, s2 represents an integer from 1 to 3, t2 represents an integer from 0 to 2, s2+t2 is 3, and $R^{17}$ and $R^{18}$ each represent a hydrogen atom or a hydrocarbon group that may have a substituent; and compounds represented by Formula (X2):

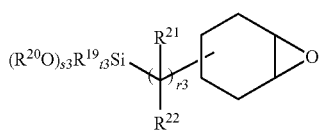

in Formula (X2), r3 represents an integer from 4 to 20, $R^{19}$ and $R^{20}$ each represent a hydrocarbon group that may have a substituent, s3 represents an integer from 1 to 3, t3 represents an integer from 0 to 2, s3+t3 is 3, and $R^{21}$ and $R^{22}$ each represent a hydrogen atom or a hydrocarbon group that may have a substituent.

8. A cured article of the adhesive layer according to claim 1.

9. A cured article obtained by subjecting the adhesive layer according to claim 1 to heat treatment in which a curing temperature is changed stepwisely, the heat treatment being a heat treatment in which a degree of curing at a time of heat treatment completion of a first step is 85% or less and the degree of curing at a time of heat treatment completion of a second step or later is made greater than 85%.

10. An adhesive sheet comprising a substrate and an adhesive layer on at least one face of the substrate, the adhesive layer being the adhesive layer according to claim 1.

11. An adhesive sheet comprising a substrate and, on at least one face of the substrate, an adhesive layer and an anchor coat layer containing a silane coupling agent, the adhesive layer being provided on a surface of the anchor coat layer, the adhesive layer being the adhesive layer according to claim 1.

12. The adhesive sheet according to claim 11 wherein the silane coupling agent contains a compound represented by Formula (X):

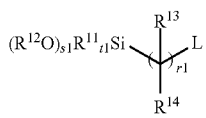

in Formula (X), r1 represents an integer of 4 to 20, L represents a group containing at least one group selected from the group consisting of an epoxy group, an oxetanyl group, and a vinyl ether group, $R^{11}$ and $R^{12}$ each represent a hydrocarbon group that may have a substituent, s1 represents an integer of 1 to 3, t1 represents an integer of 0 to 2, s1+t1 is 3, and $R^{13}$ and $R^{14}$ each represent a hydrogen atom or a hydrocarbon group that may have a substituent.

13. The adhesive sheet according to claim 11, wherein the silane coupling agent contains at least one of an epoxy group-containing silane compound selected from the group consisting of compounds represented by Formula (X1):

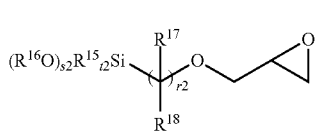

in Formula (X1), r2 represents an integer from 4 to 20, $R^{15}$ and $R^{16}$ each represent a hydrocarbon group that may have a substituent, s2 represents an integer from 1 to 3, t2 represents an integer from 0 to 2, s2+t2 is 3, and $R^{17}$ and $R^{18}$ each represent a hydrogen atom or a hydrocarbon group that may have a substituent; and compounds represented by Formula (X2):

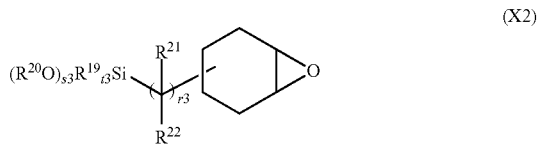

in Formula (X2), r3 represents an integer from 4 to 20, $R^{19}$ and $R^{20}$ each represent a hydrocarbon group that may have a substituent, s3 represents an integer from 1 to 3, t3 represents an integer from 0 to 2, s3+t3 is 3, and $R^{21}$ and $R^{22}$ each represent a hydrogen atom or a hydrocarbon group that may have a substituent.

14. A laminate, wherein an adherend layer is adhered on the adhesive layer of the adhesive sheet according to claim 10.

15. A laminate formed from three or more layers,
the laminate comprising two adherend layers and an adhesive layer between the adherend layers, and
the adhesive layer being a layer of a cured article of the adhesive layer according to claim 1.

16. A device comprising the laminate according to claim 14.

17. A method for producing an adhesive layer, the method comprising using a curable composition comprising a polyorganosilsesquioxane comprising:
a constituent unit represented by Formula (I):

$$[R^{a}SiO_{3/2}] \qquad (I)$$

wherein $R^a$ is selected from:
an unsubstituted phenyl group;
a group represented by Formula (1a):

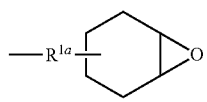

wherein $R^{1a}$ represents an ethylene group; and
a group represented by Formula (1d):

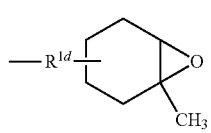

herein $R^{1d}$ represents an ethylene group;
wherein at least one constituent unit represented by Formula (I) has $R^a$ as the group represented by Formula (1a) or the group represented by Formula (1d);
a constituent unit represented by Formula (II):

$$[R^{b}SiO_{2/2}(OR^{c})] \qquad (II)$$

wherein $R^b$ is selected from:
an unsubstituted phenyl group;
a group represented by Formula (1a):

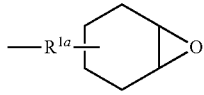

(1a)

wherein $R^{1a}$ represents an ethylene group; and
a group represented by Formula (1d):

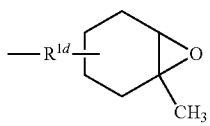

(1d)

wherein $R^{1d}$ represents an ethylene group, and $R^c$ represents a hydrogen atom or an alkyl group having from 1 to 4 carbons; and wherein at least one constituent unit represented by Formula (II) has $R^b$ as the group represented by Formula (1a) or the group represented by Formula (1d);

wherein a molar ratio of the constituent unit represented by Formula (I) to the constituent unit represented by Formula (II), (the constituent unit represented by Formula (I))/(the constituent unit represented by Formula (II)), is from 20 to 21, wherein a proportion of the constituent unit represented by Formula (I) having $R^a$ as the group represented by Formula (1a) or the group represented by Formula (1d) and the constituent unit represented by Formula (II) having $R^b$ as the group represented by Formula (1a) or the group represented by Formula (1d) is from 95 to 99 mol % relative to a total amount (100 mol %) of siloxane constituent units, wherein a proportion of the constituent unit represented by Formula (I) having $R^a$ as an unsubstituted phenyl group and the constituent unit represented by Formula (II) having $R^b$ as an unsubstituted phenyl group is from 1 to 5 mol % relative to a total amount (100 mol %) of siloxane constituent units, wherein a number average molecular weight is from 3000 to 8000, wherein a molecular weight dispersity, (weight average molecular weight/number average molecular weight), is from 2.14 to 2.5, wherein a content of the polyorganosilsesquioxane is 90 wt. % or greater but less than 100 wt. %, relative to a total amount of the curable composition excluding a solvent, and the curable composition further comprises a polymerization stabilizer, wherein the polymerization stabilizer comprises a sulfonium sulfate-based compound.

* * * * *